(12) United States Patent  
Shinohara et al.

(10) Patent No.: US 6,474,827 B2  
(45) Date of Patent: Nov. 5, 2002

(54) IMAGE DISPLAY APPARATUS

(75) Inventors: Masayuki Shinohara; Shigeru Aoyama, both of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/765,824

(22) Filed: Jan. 19, 2001

(65) Prior Publication Data

US 2001/0002165 A1 May 31, 2001

Related U.S. Application Data

(62) Division of application No. 08/729,145, filed on Oct. 11, 1996, now Pat. No. 6,231,200.

(30) Foreign Application Priority Data

Oct. 13, 1995 (JP) .............................................. 7-291857

(51) Int. Cl.$^7$ ................................................. G02F 1/13
(52) U.S. Cl. ............................. 362/31; 362/26; 349/62; 349/65; 349/95
(58) Field of Search ........................... 362/31, 26, 339, 362/330; 349/62, 65, 5, 61, 95, 109

(56) References Cited

U.S. PATENT DOCUMENTS

| 5,159,478 A | | 10/1992 | Akiyama et al. | |
| 5,506,701 A | * | 4/1996 | Ichikawa | 359/15 |
| 5,528,720 A | * | 6/1996 | Winston et al. | 385/146 |
| 5,561,538 A | | 10/1996 | Kato et al. | |
| 5,682,265 A | * | 10/1997 | Farn et al. | 359/571 |

FOREIGN PATENT DOCUMENTS

| JP | 60-194428 | 10/1985 |
| JP | 62-69284 | 4/1987 |
| JP | 02-118518 | 5/1990 |
| JP | 05-249318 | 9/1993 |
| JP | 7-199116 | 12/1993 |
| JP | 06-160831 | 6/1994 |
| JP | 06-208112 | 7/1994 |
| JP | 06-313860 | 11/1994 |
| JP | 06-317794 | 11/1994 |
| JP | 07-056138 | 3/1995 |
| JP | 07-092316 | 4/1995 |
| JP | 08-271879 | 10/1996 |

* cited by examiner

*Primary Examiner*—Thomas M. Sember  
(74) *Attorney, Agent, or Firm*—Beyer Weaver & Thomas LLP

(57) ABSTRACT

An image display apparatus with improved brightness incorporates a surface light source device having a light conducting plate with a light source a light disposed adjacent to one of its side surfaces. At least one pattern is formed on the upper light emitting surface of the light conducting plate and/or the lower surface. The pattern is provided such that the sum of average slope angles of the light emitting surface and the opposite surface on a first sectional surface which is perpendicular to both the light incident surface and the light emitting surface is greater than the sum of average slope angles of the light emitting surface and the opposite surface on a second sectional surface which is parallel to the light incident side surface.

16 Claims, 48 Drawing Sheets

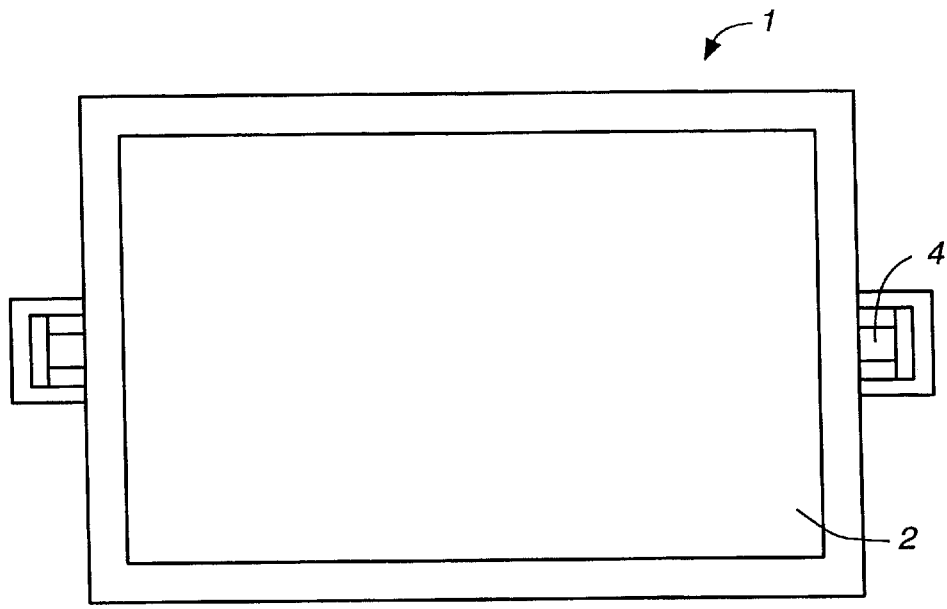
FIG._1A
*(PRIOR ART)*
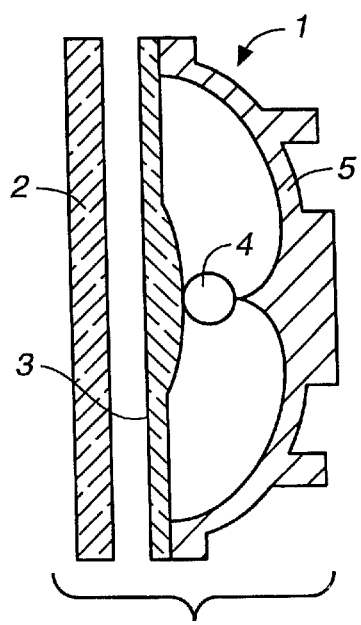
FIG._1B
*(PRIOR ART)*

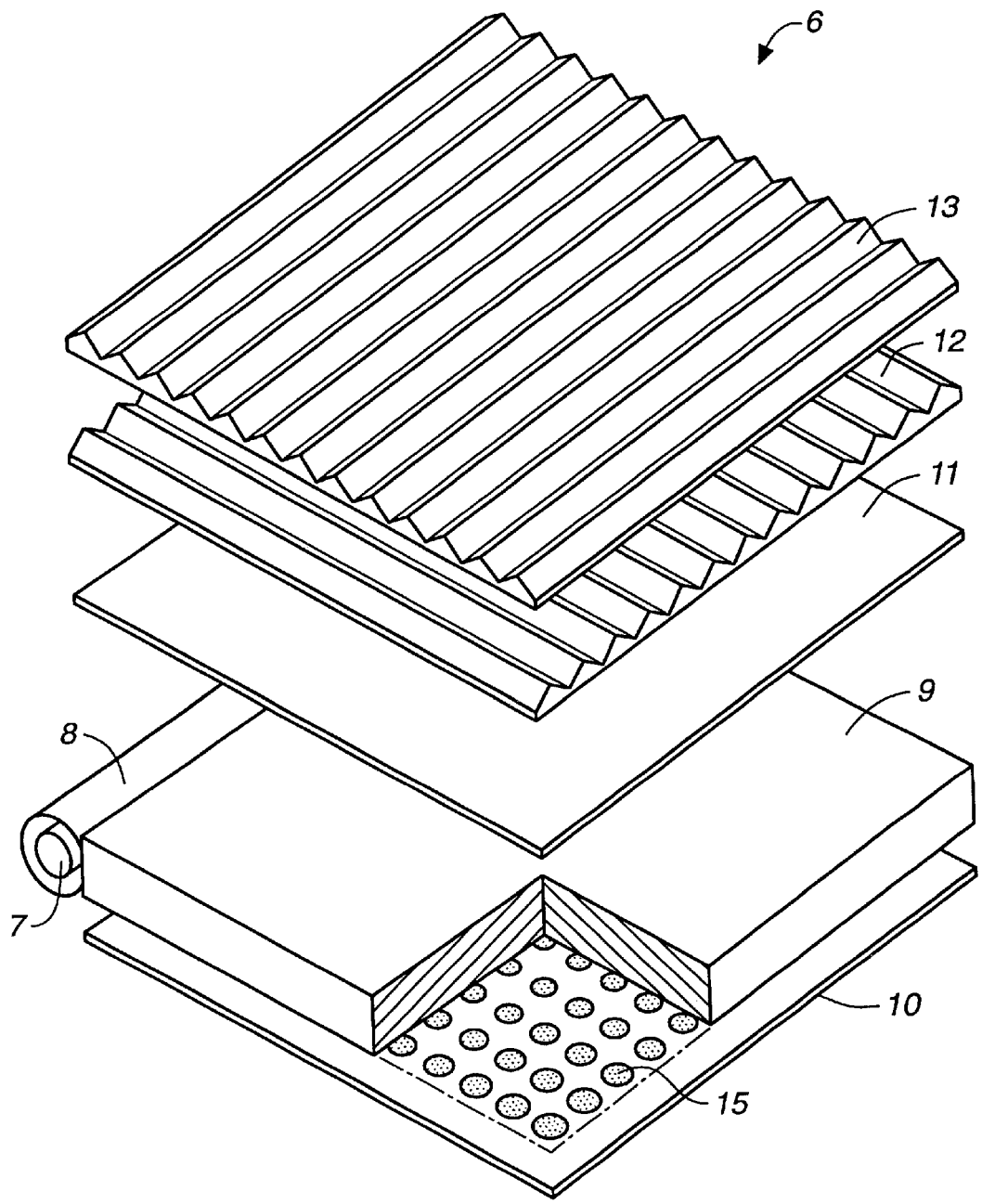
FIG._2
*(PRIOR ART)*

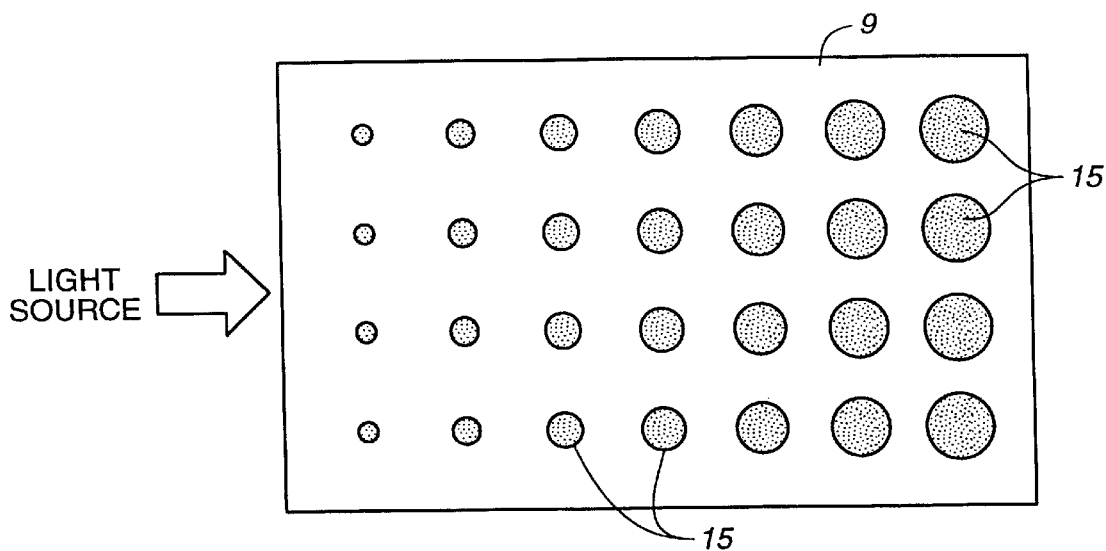
FIG._3A
(PRIOR ART)
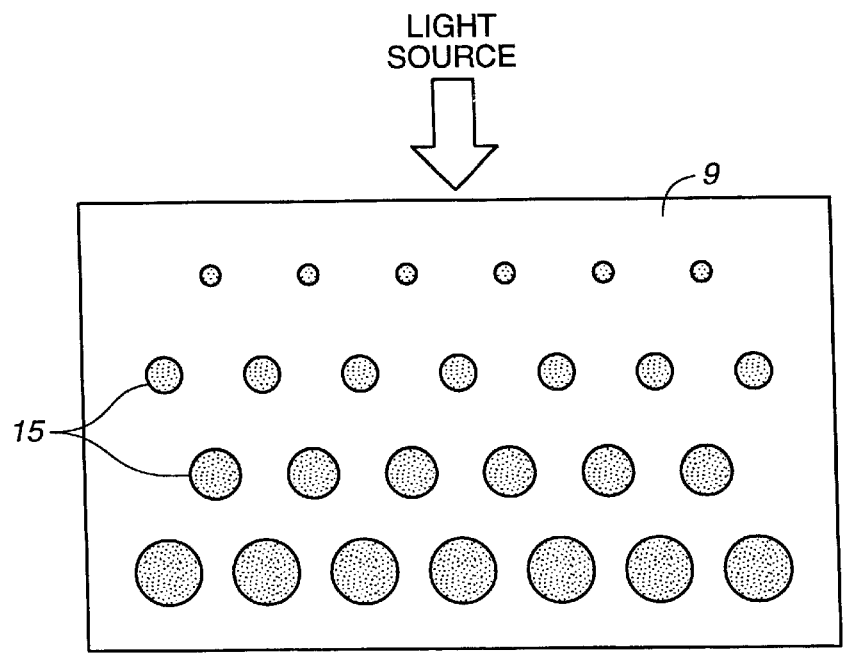
FIG._3B
(PRIOR ART)

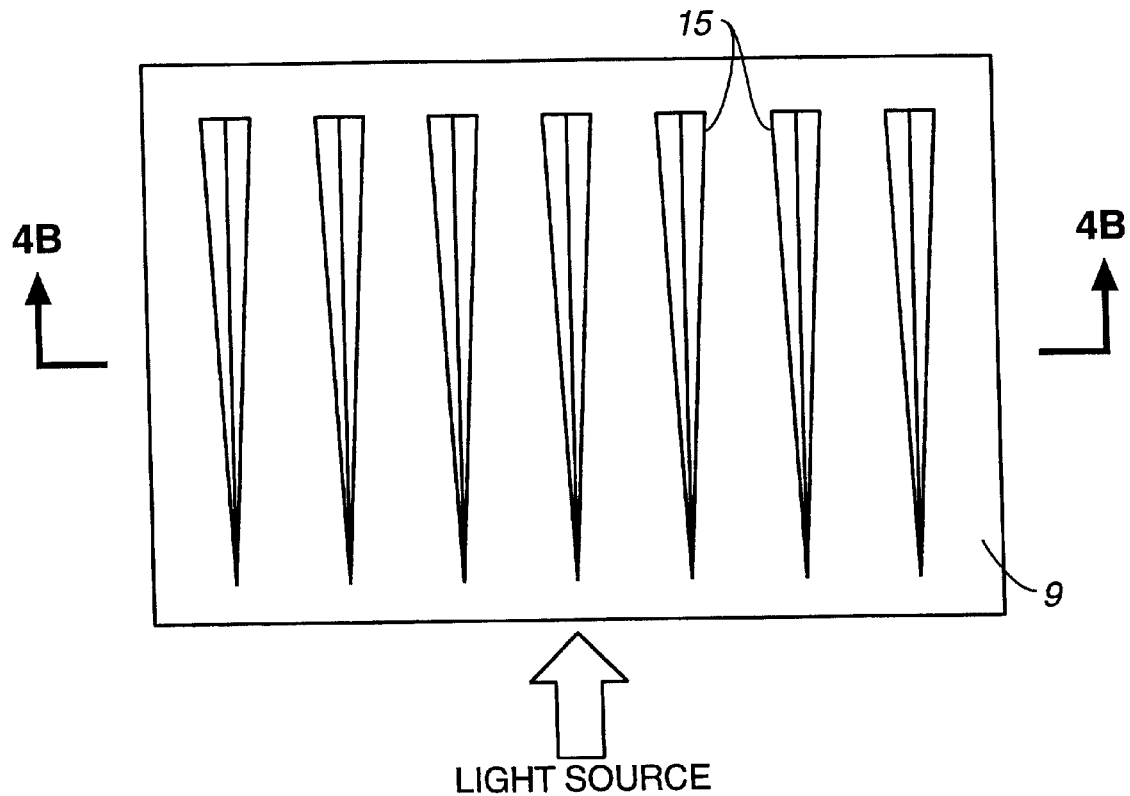
FIG._4A
(PRIOR ART)
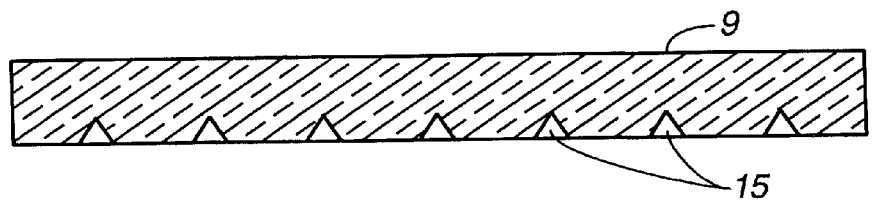
FIG._4B
(PRIOR ART)

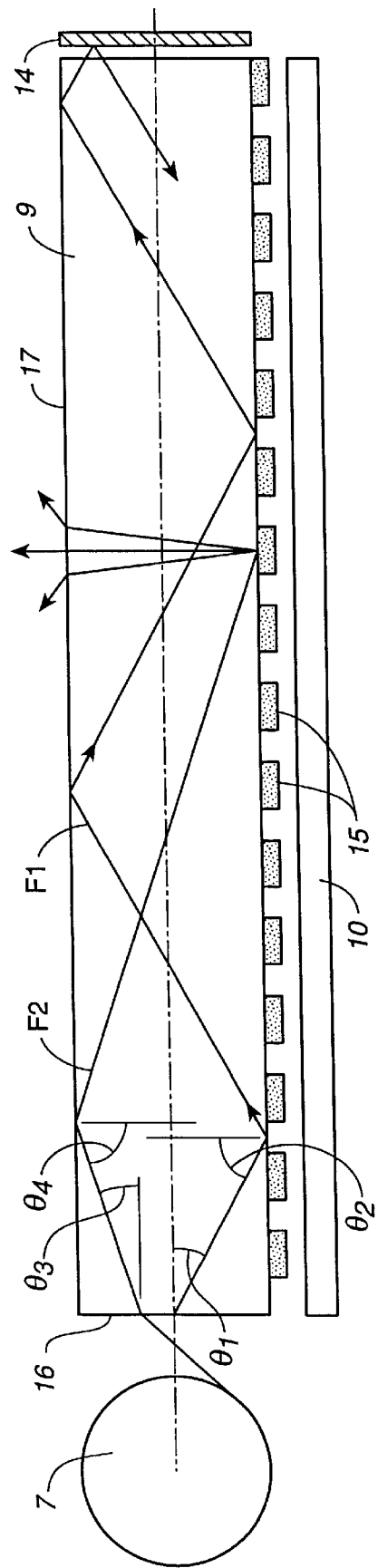
FIG._5
*(PRIOR ART)*

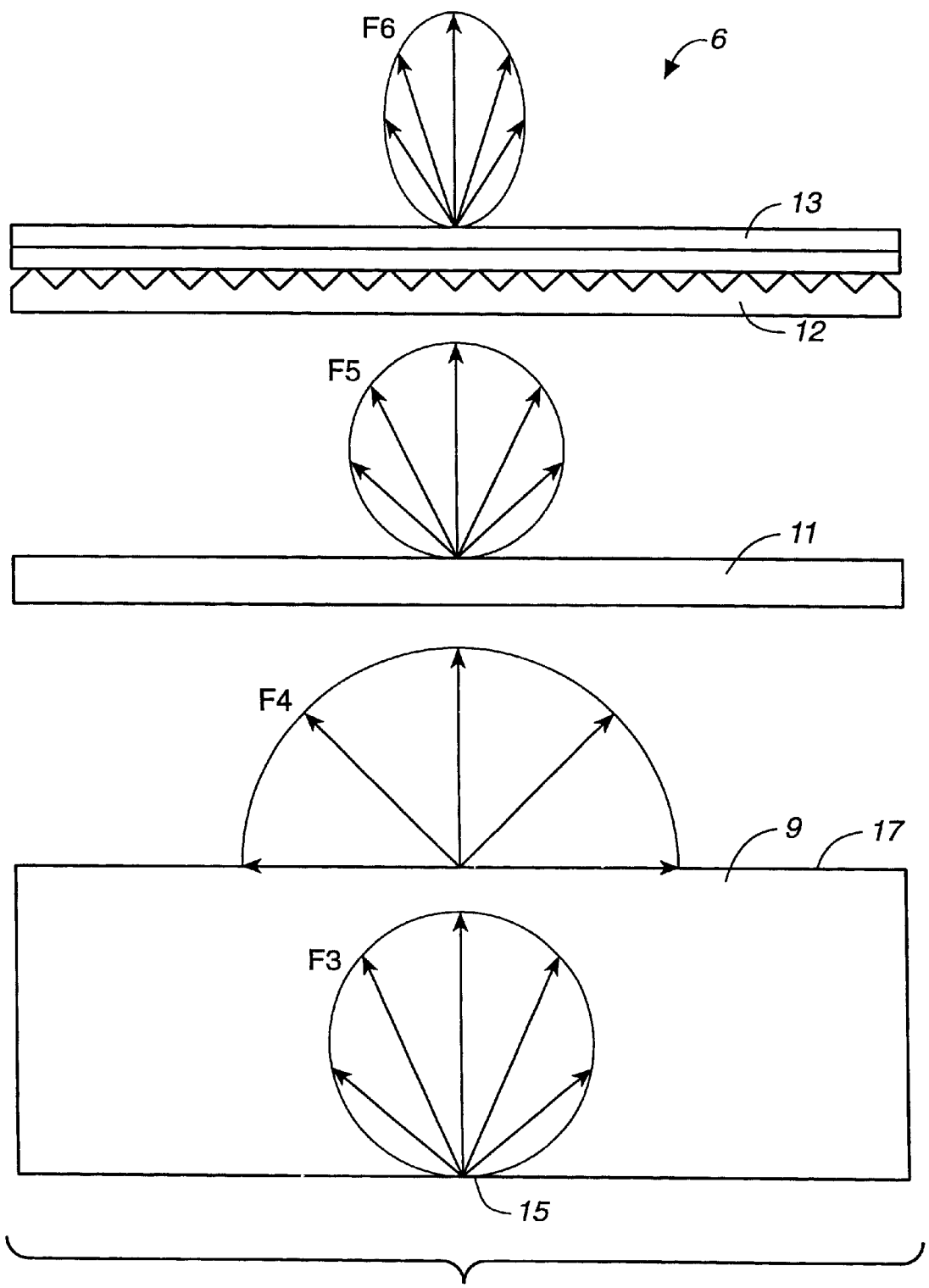
FIG._6
*(PRIOR ART)*

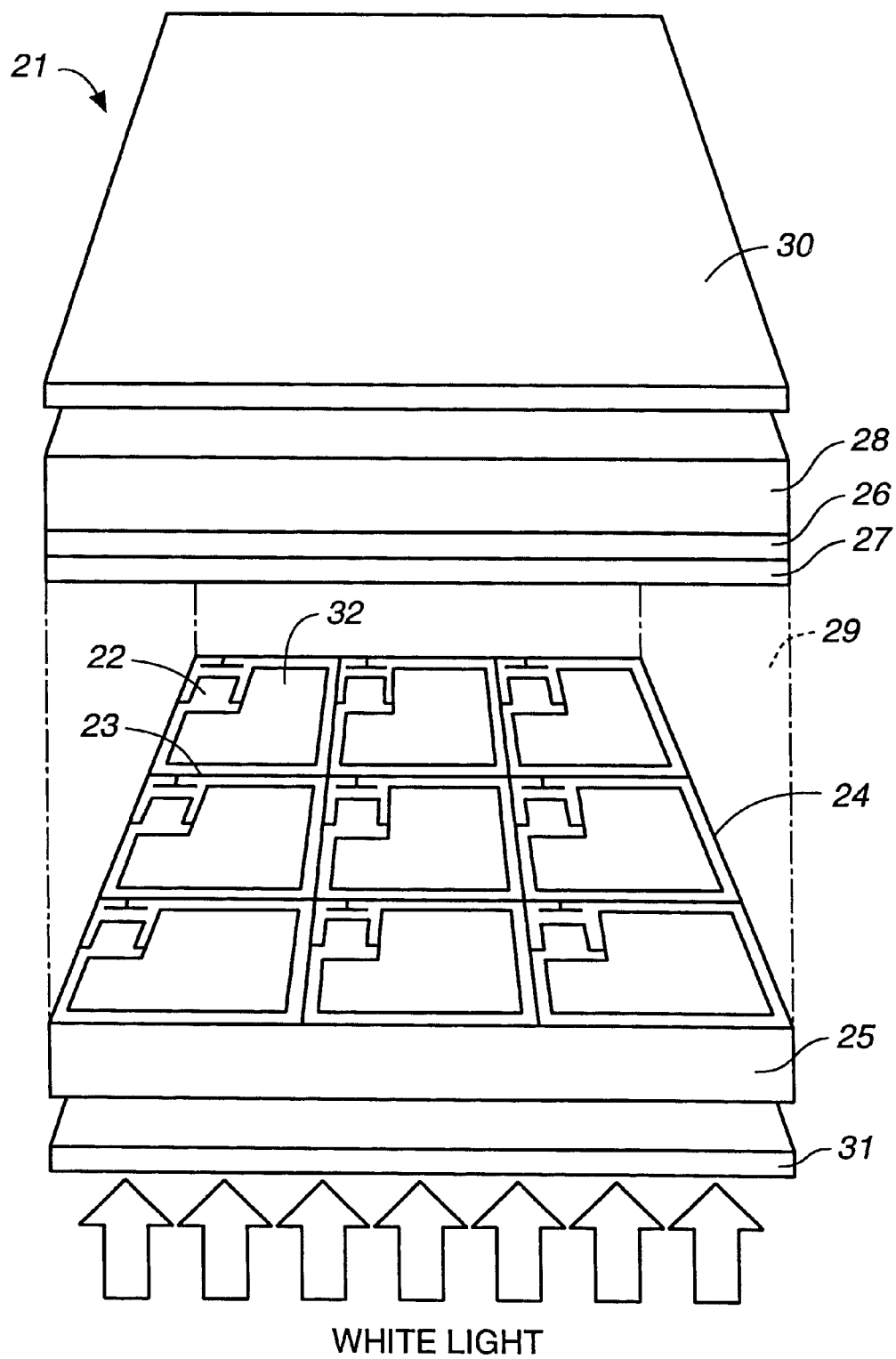
FIG._7
*(PRIOR ART)*

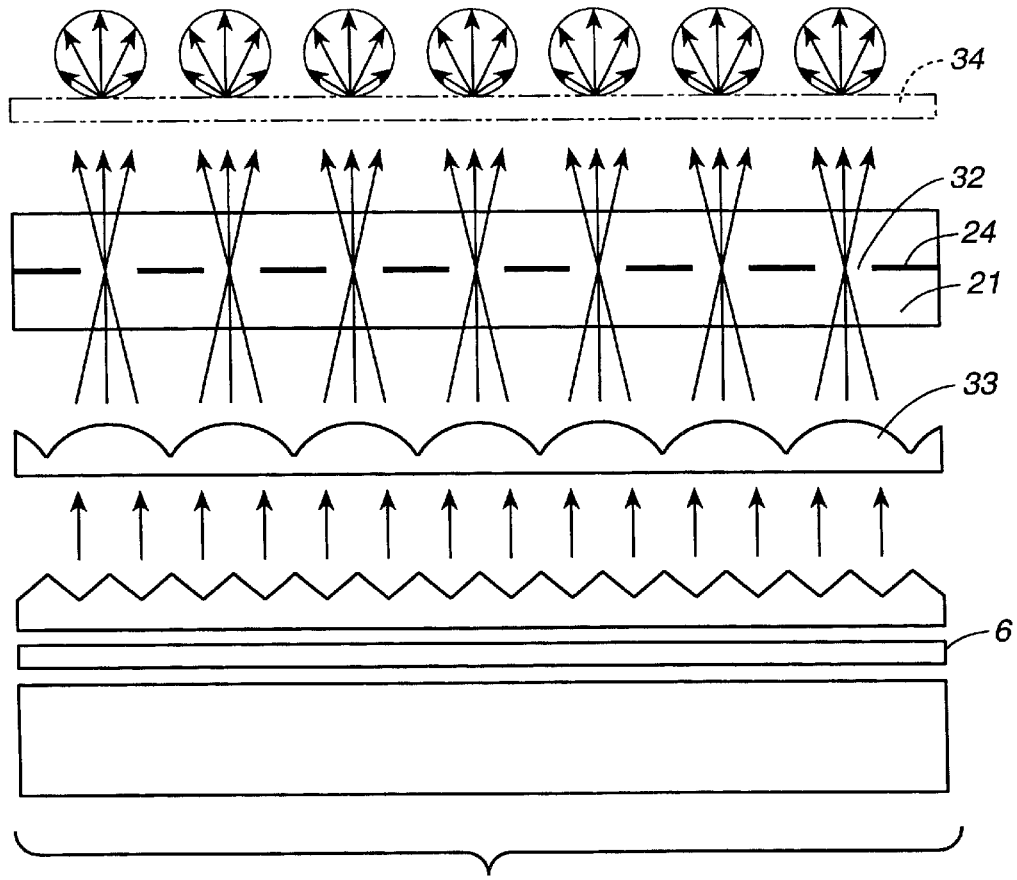
FIG._8
(PRIOR ART)
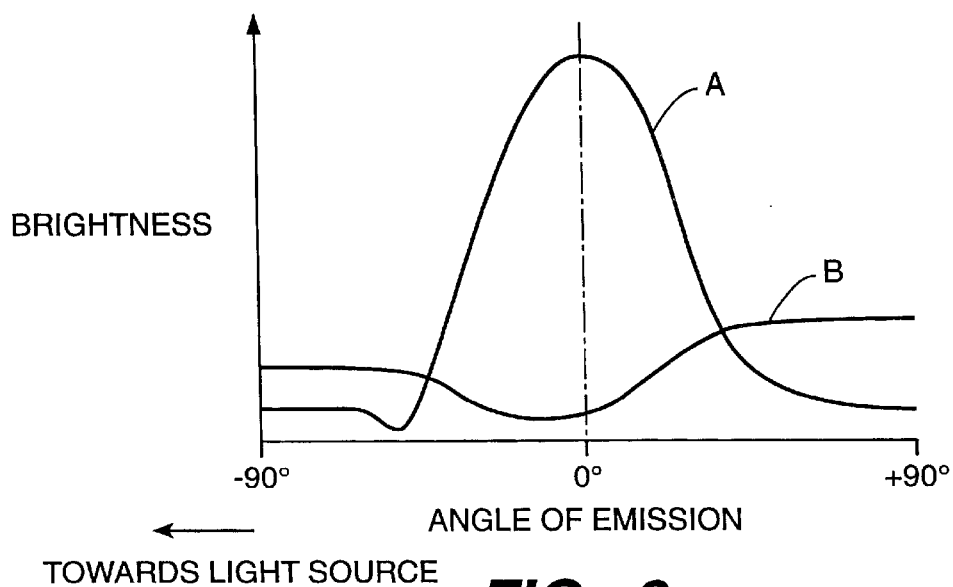
FIG._9
(PRIOR ART)

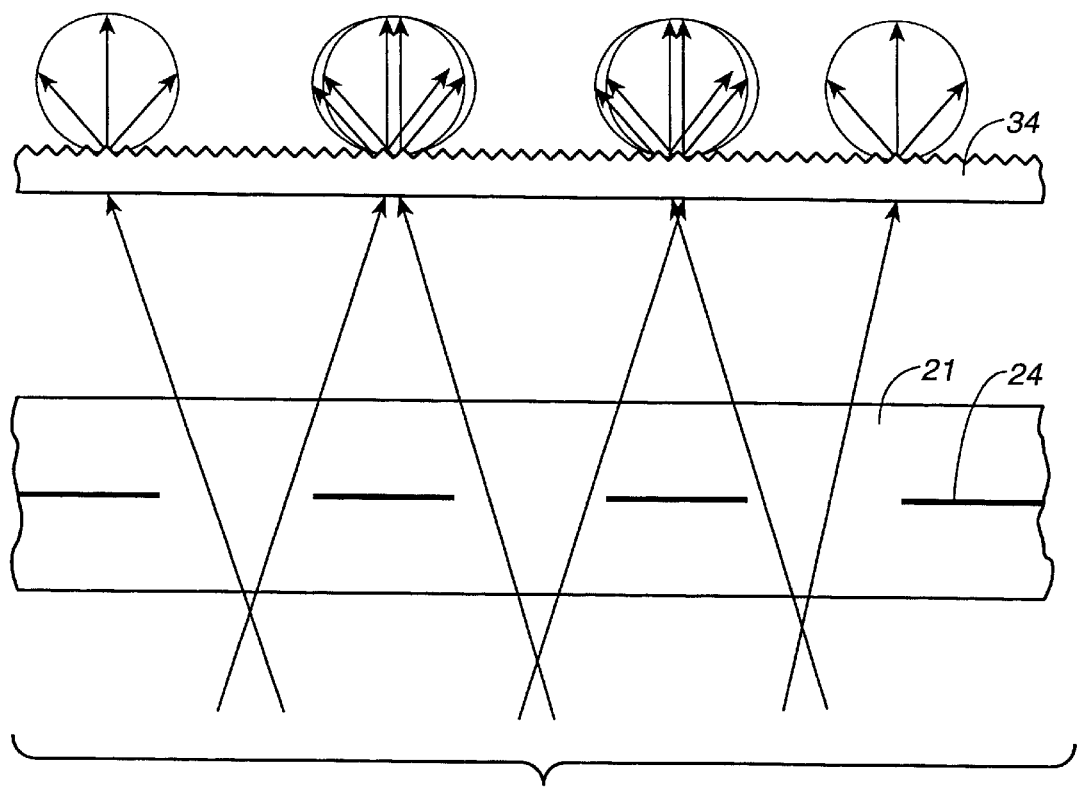
FIG._10
*(PRIOR ART)*
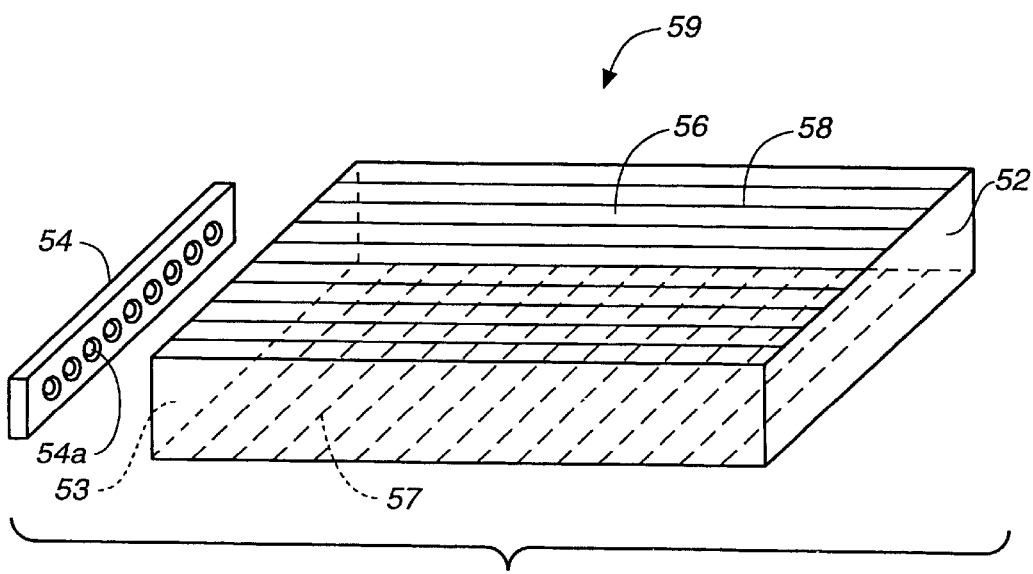
FIG._16

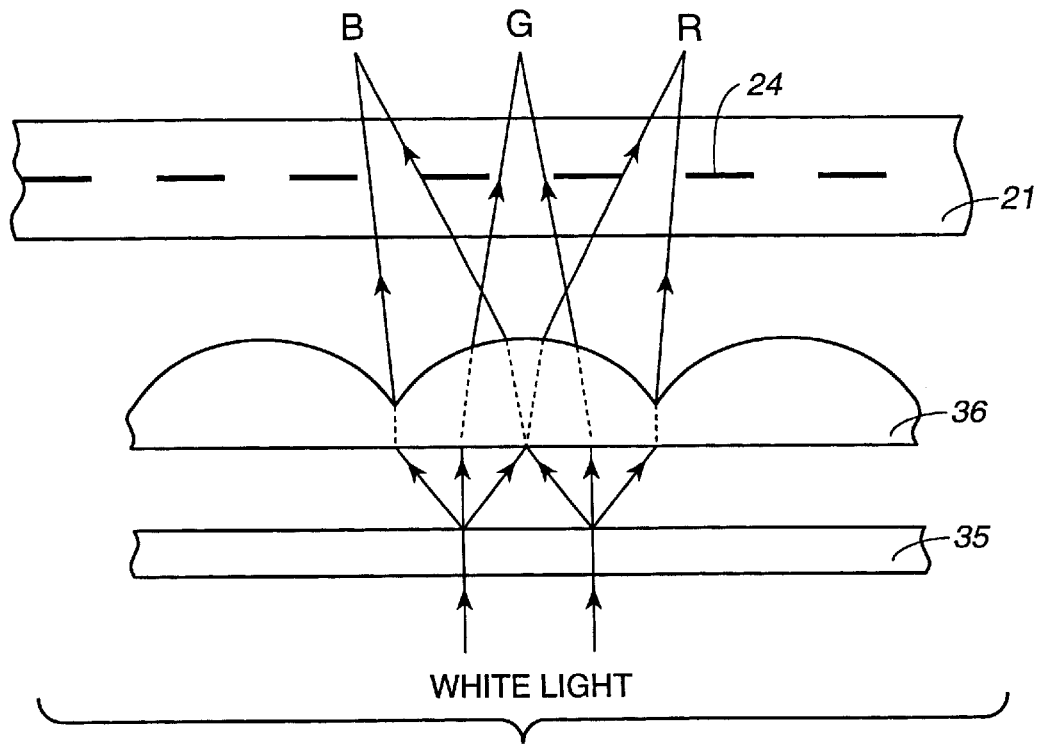
FIG._11
*(PRIOR ART)*
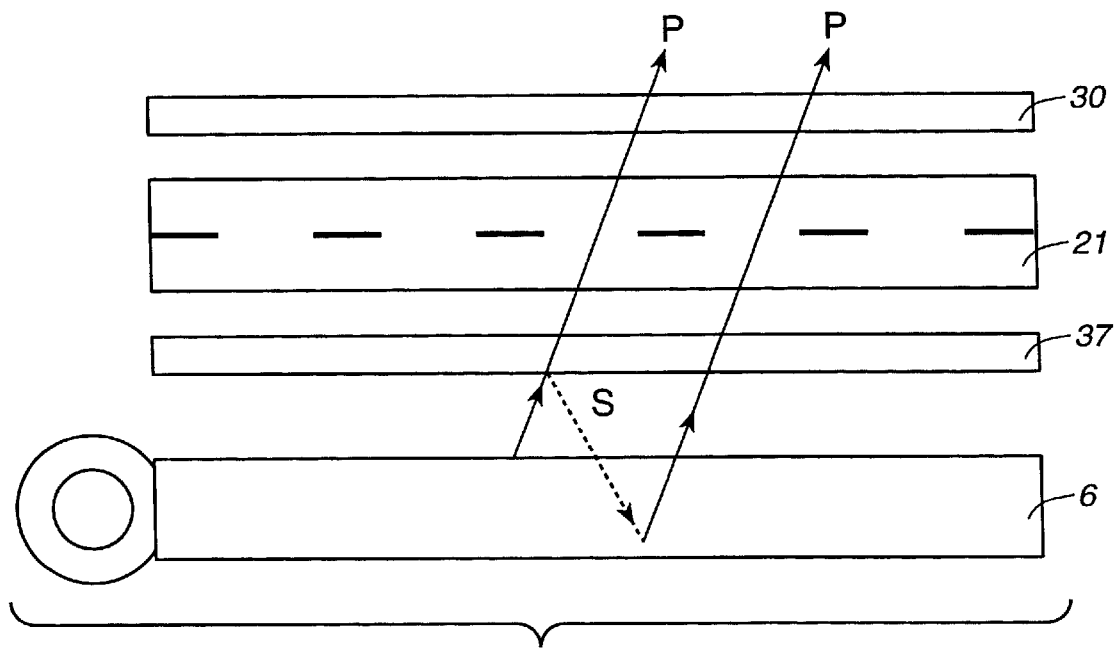
FIG._12
*(PRIOR ART)*

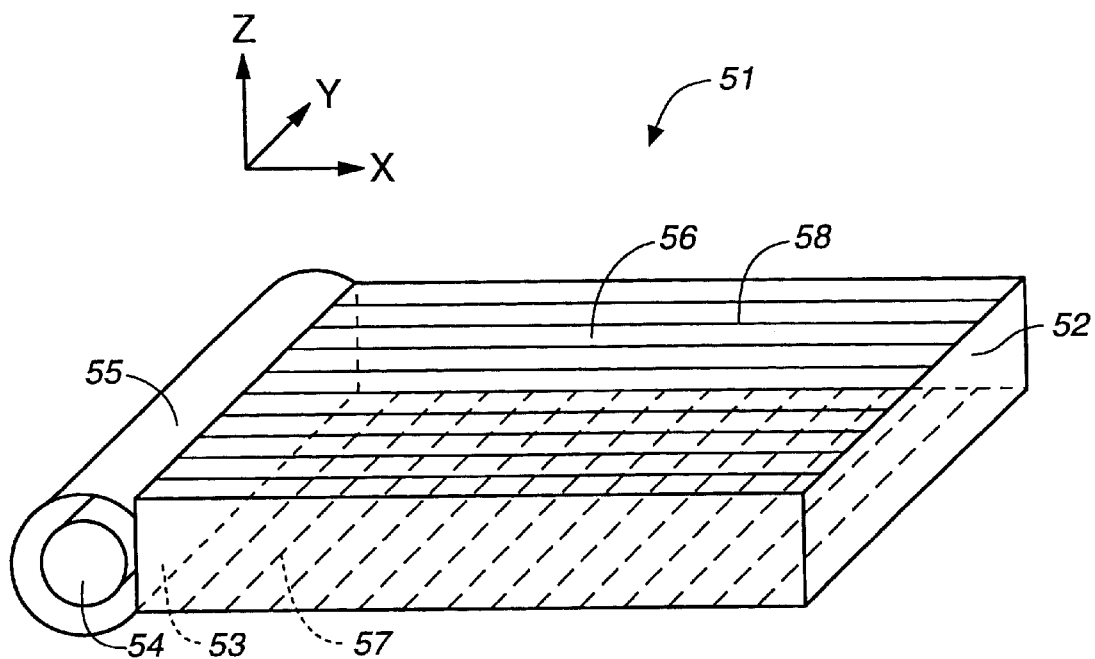
FIG._13
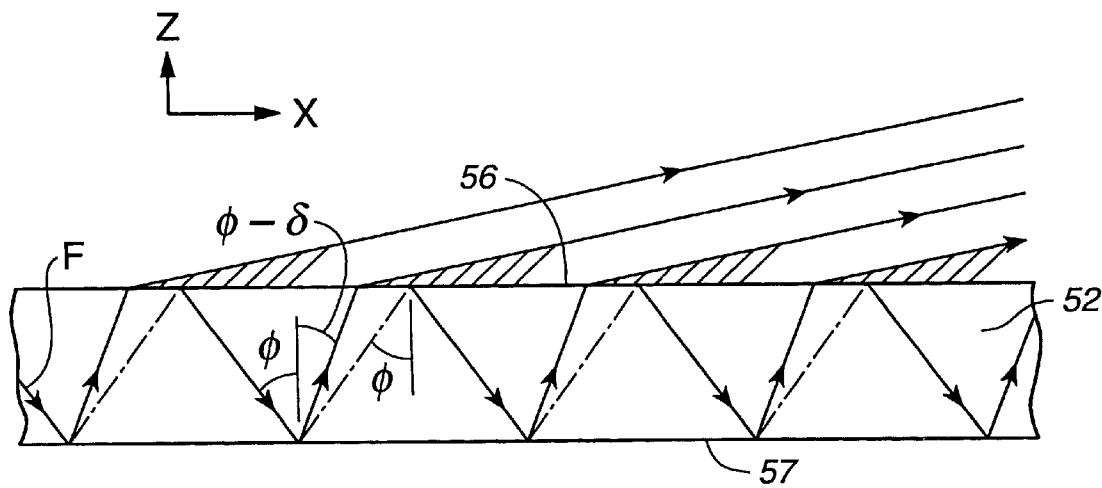
FIG._14

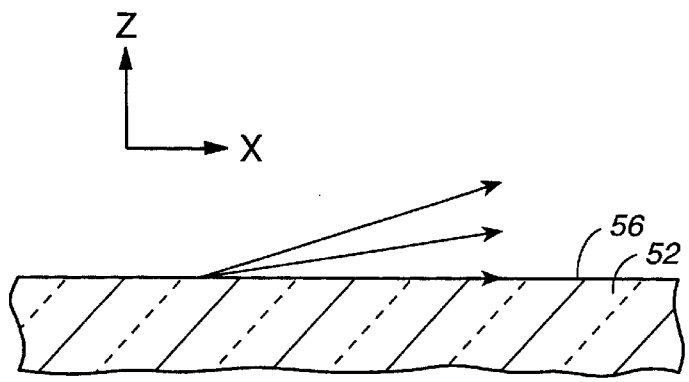
FIG._15A
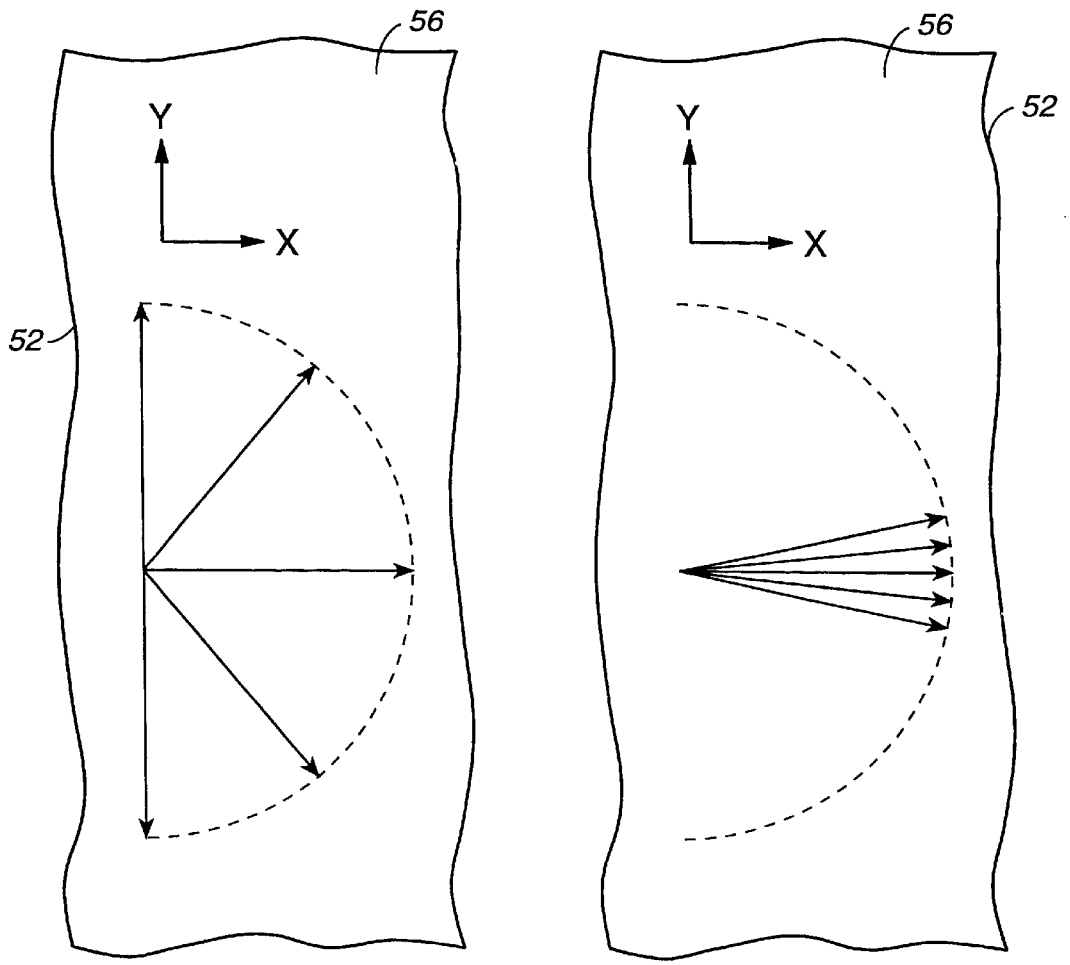
FIG._15B  FIG._15C

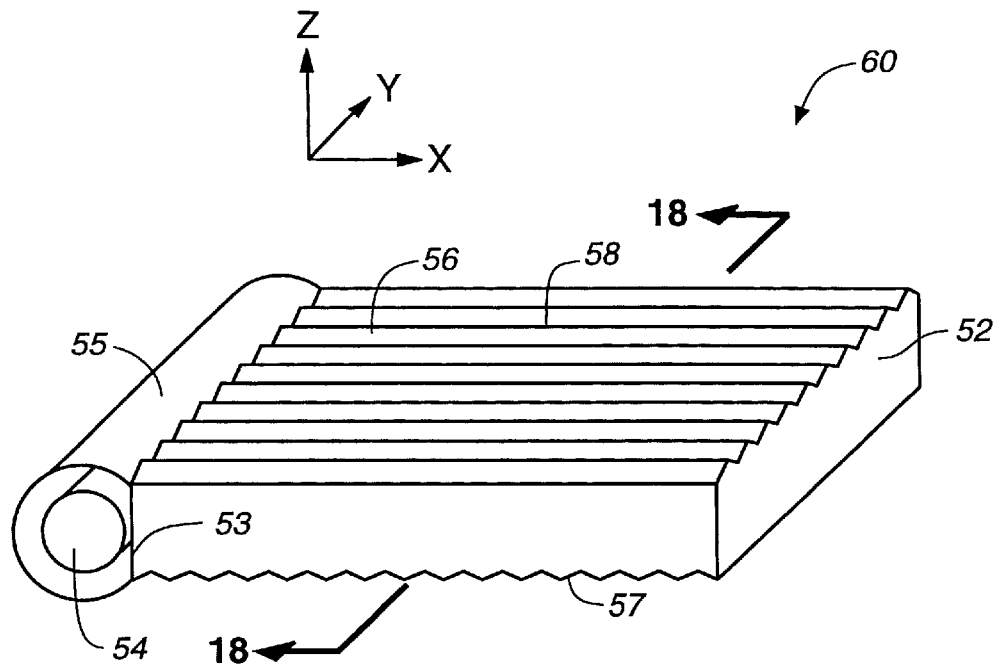
FIG._17
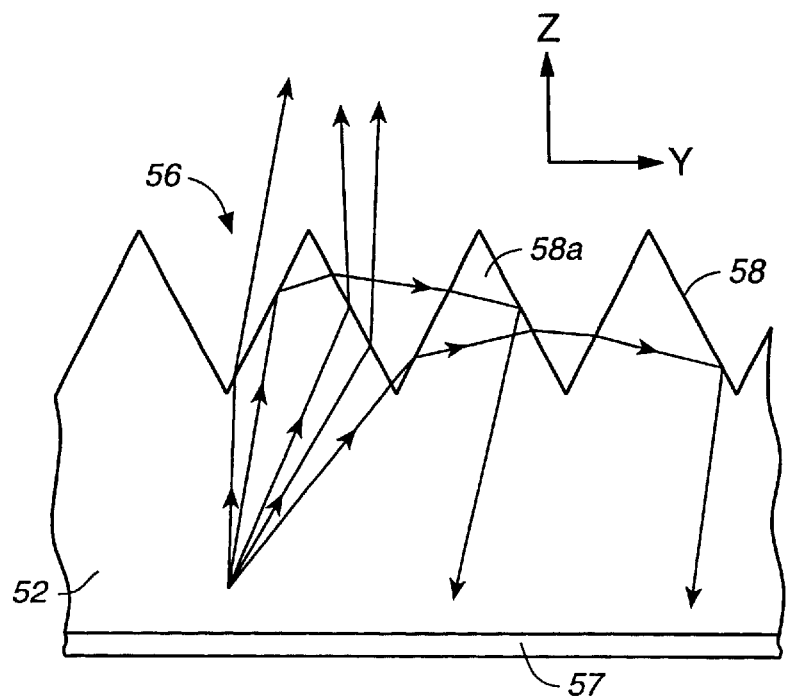
FIG._18

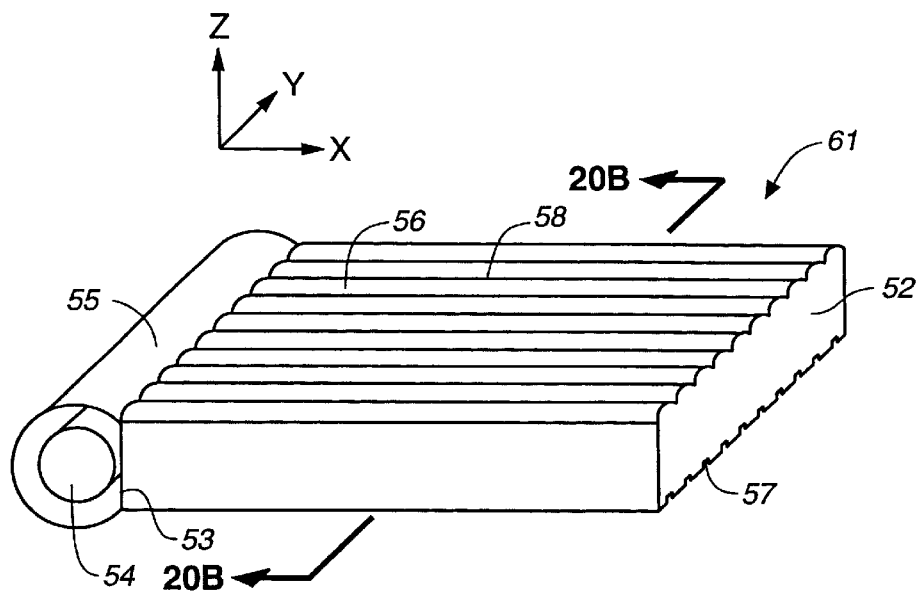
FIG._19
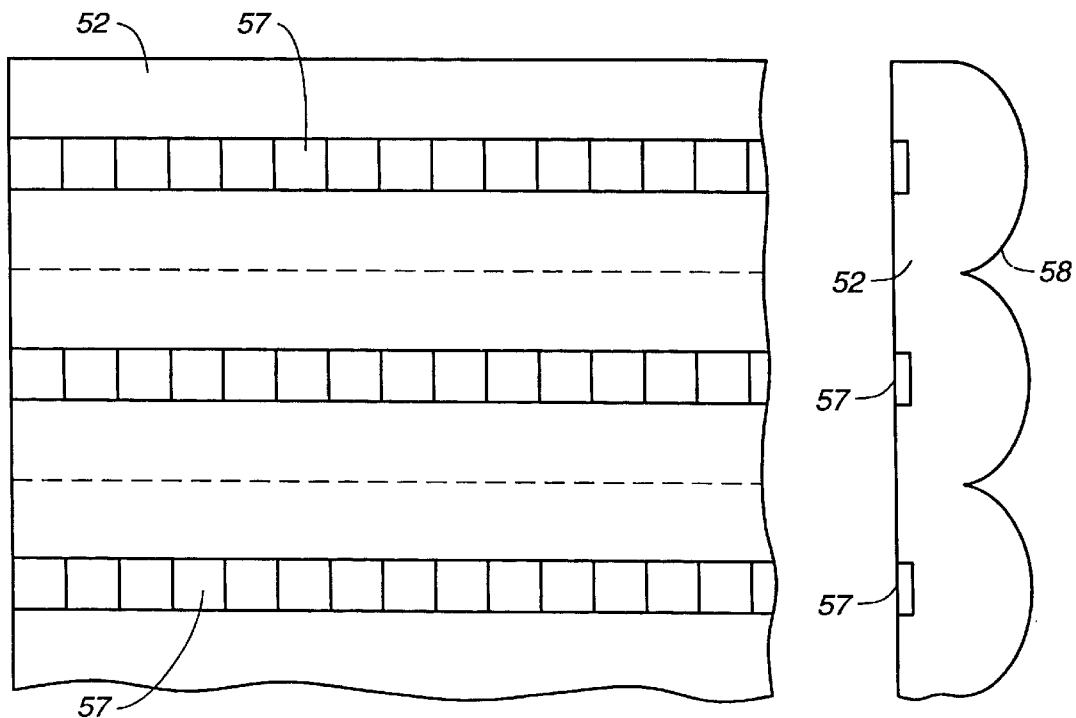
FIG._20A  FIG._20B

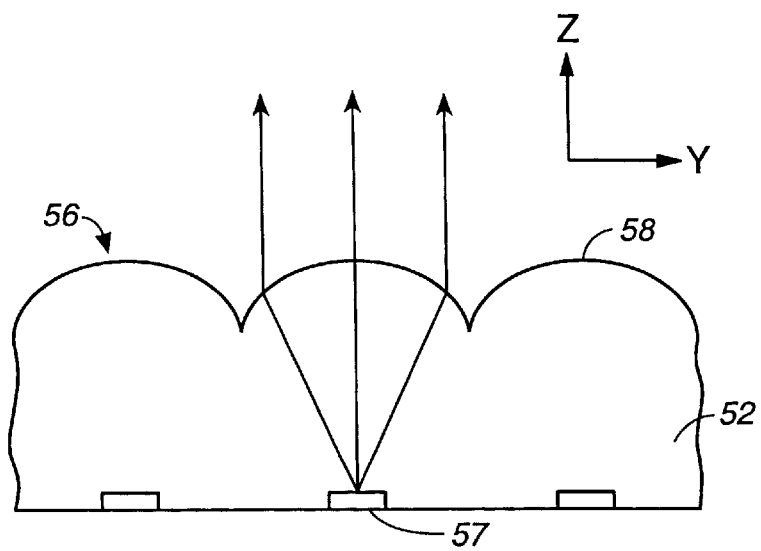
FIG._21
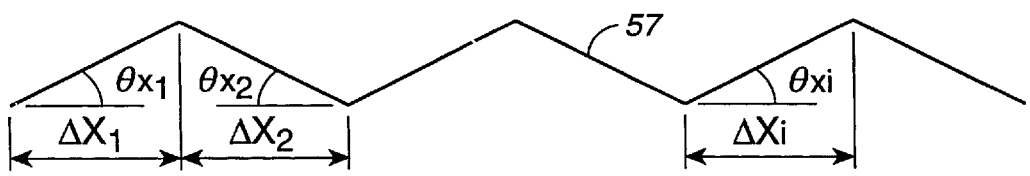
FIG._22A
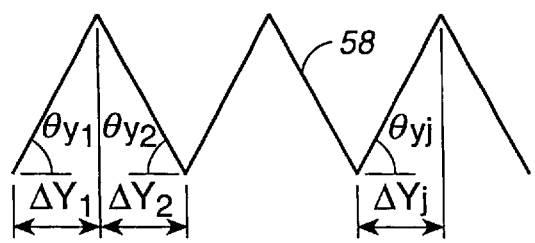
FIG._22B

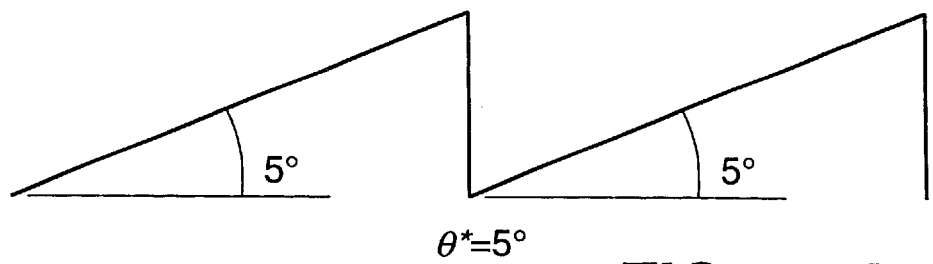
$\theta^* = 5°$
FIG._23A
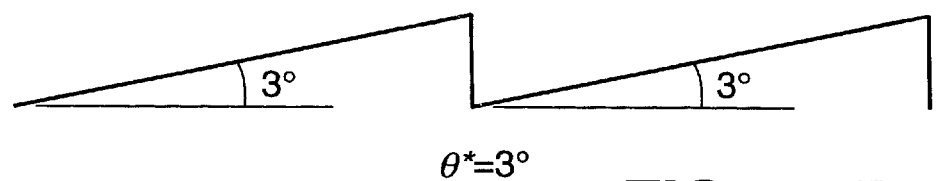
$\theta^* = 3°$
FIG._23B
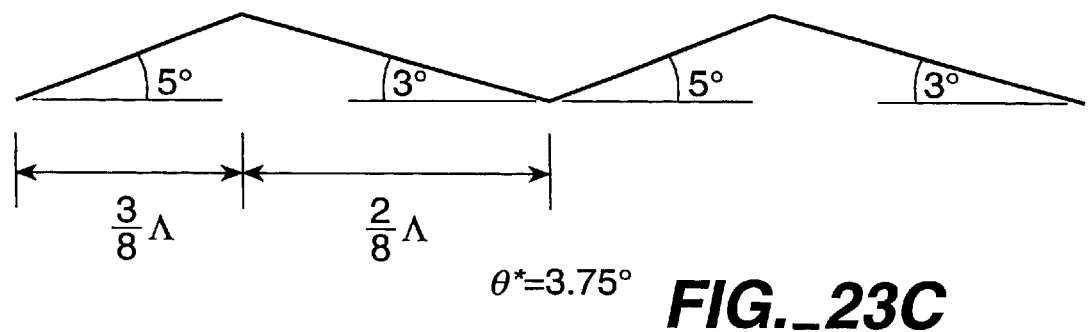
$\theta^* = 3.75°$
FIG._23C
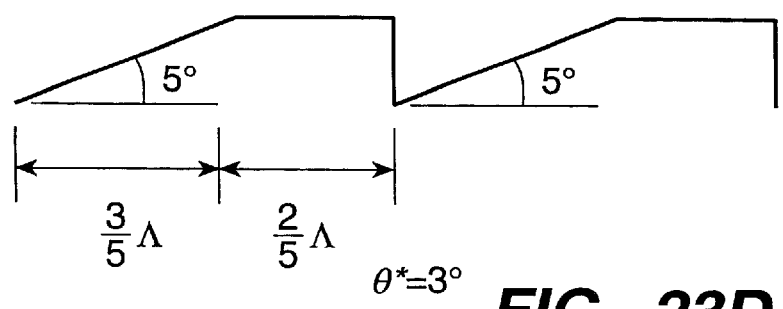
$\theta^* = 3°$
FIG._23D

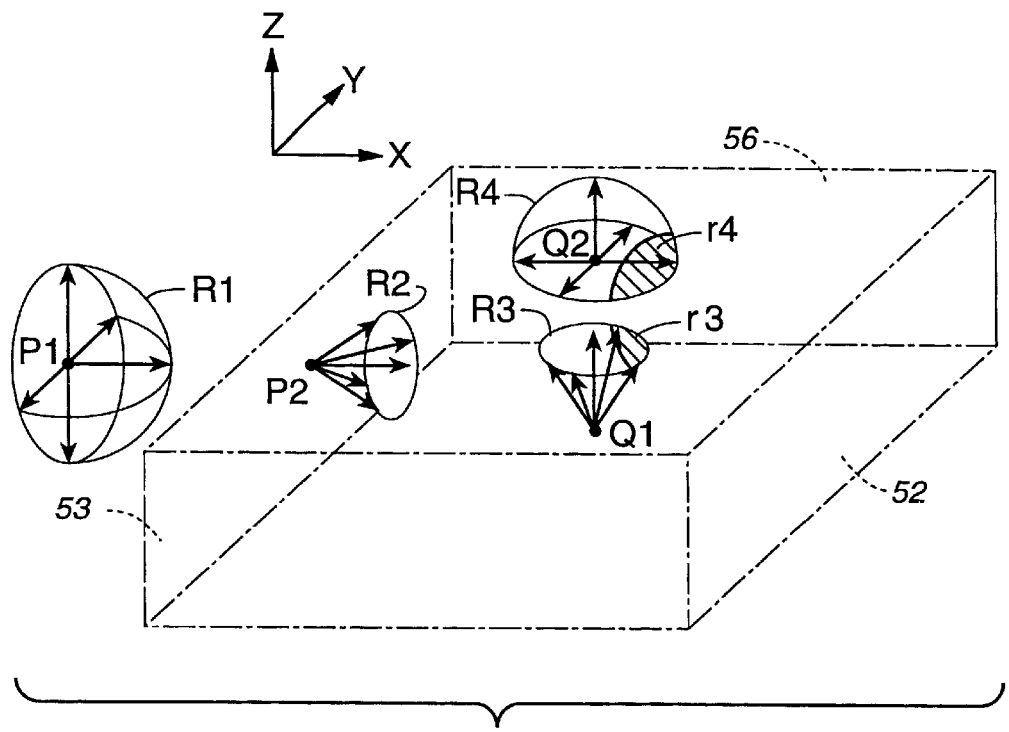
FIG._24
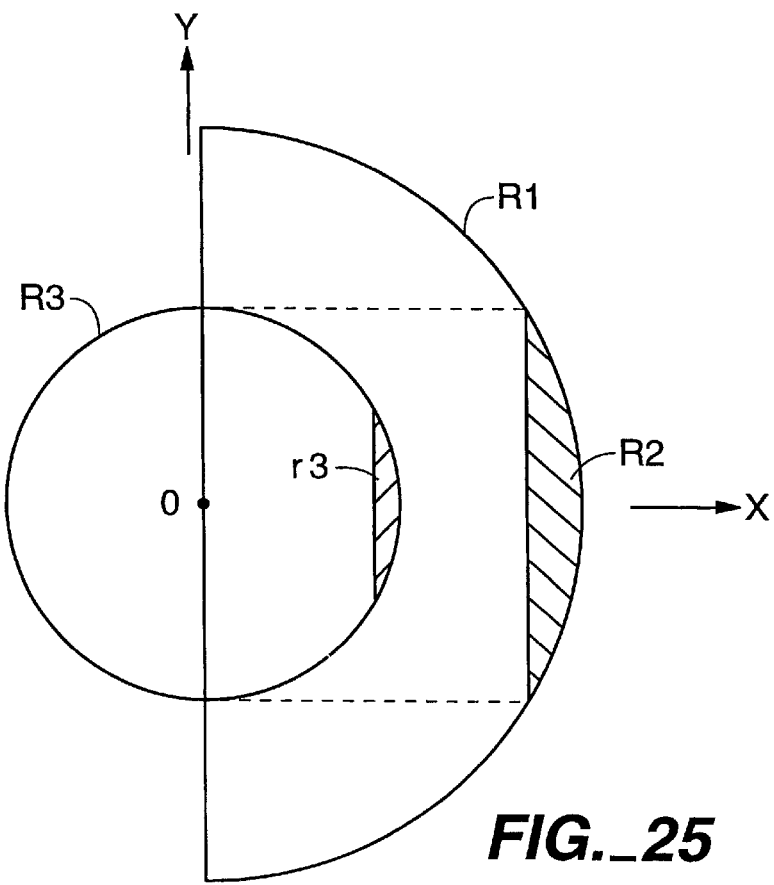
FIG._25

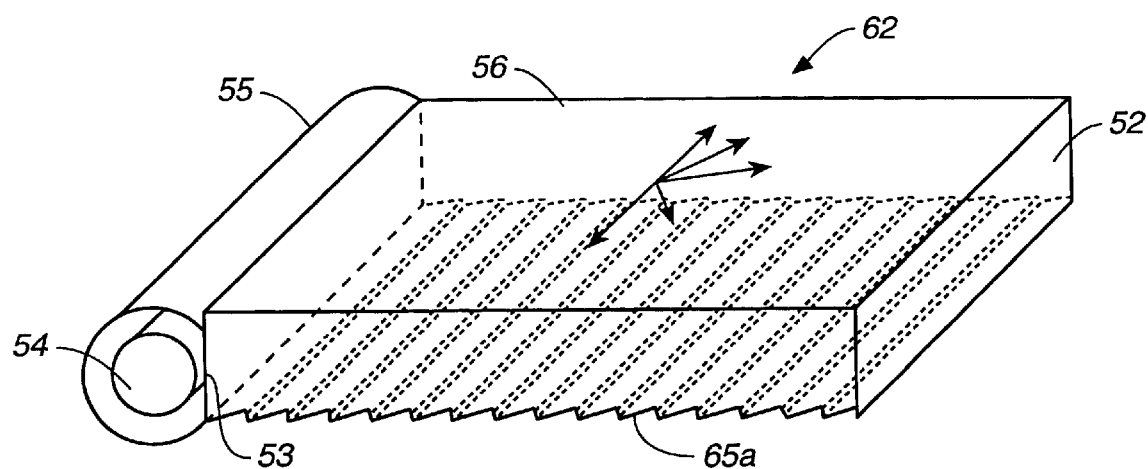
FIG._26
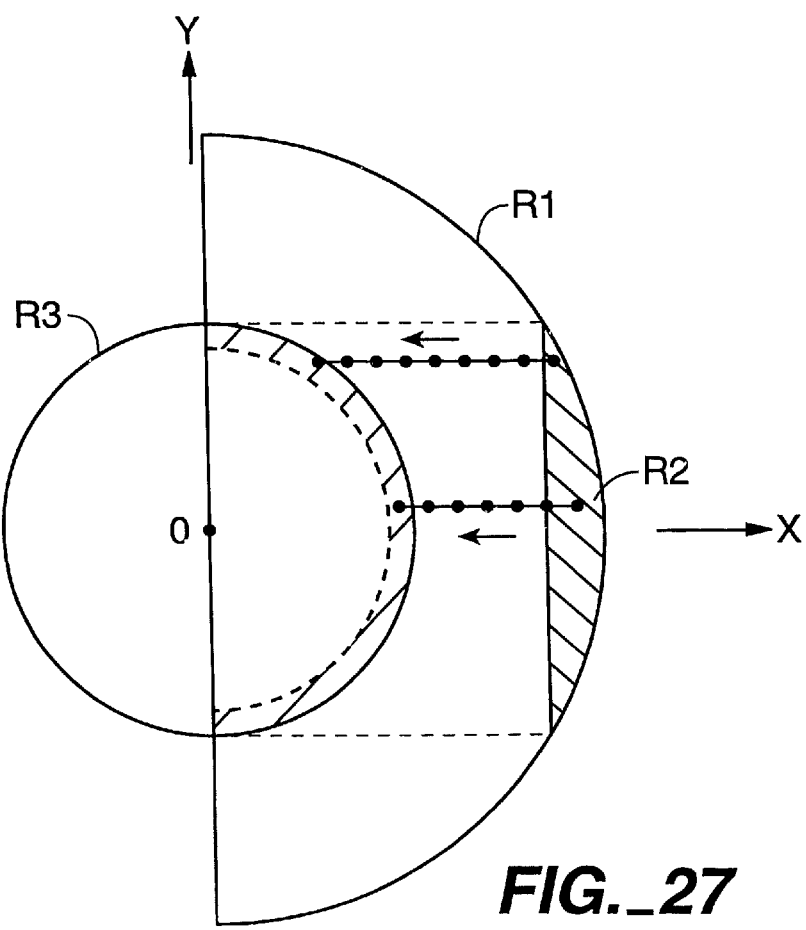
FIG._27

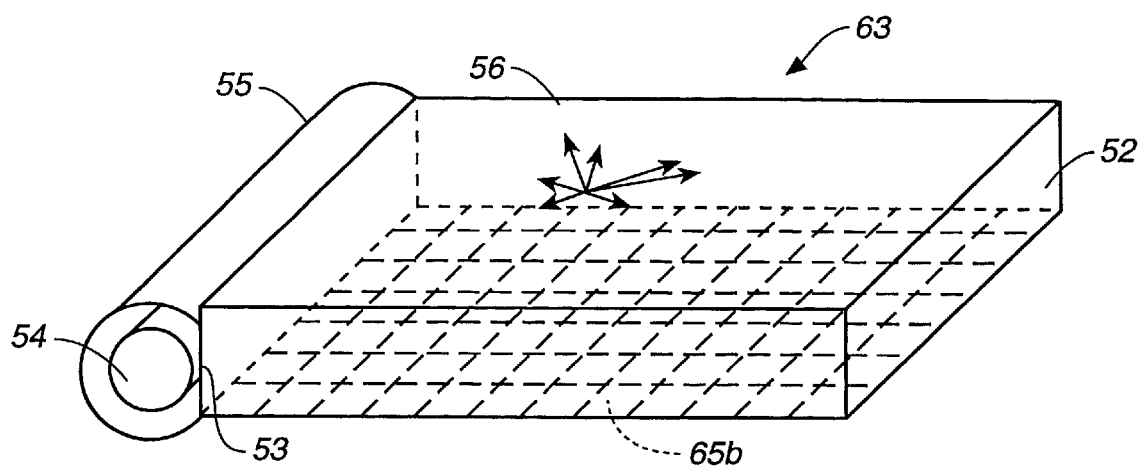
FIG._28
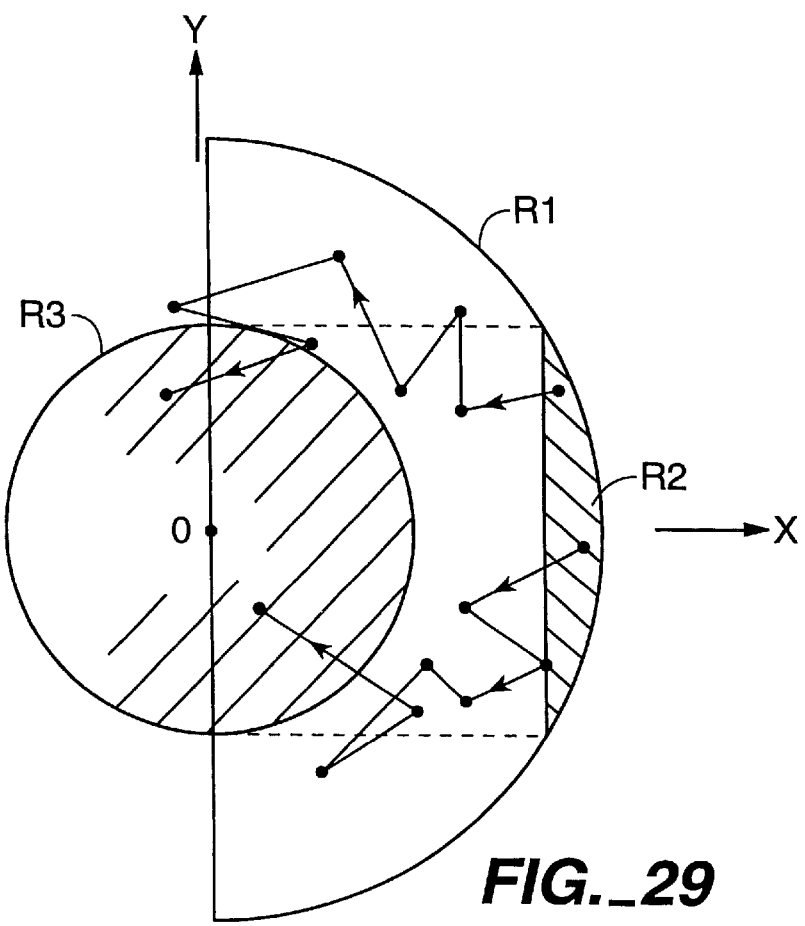
FIG._29

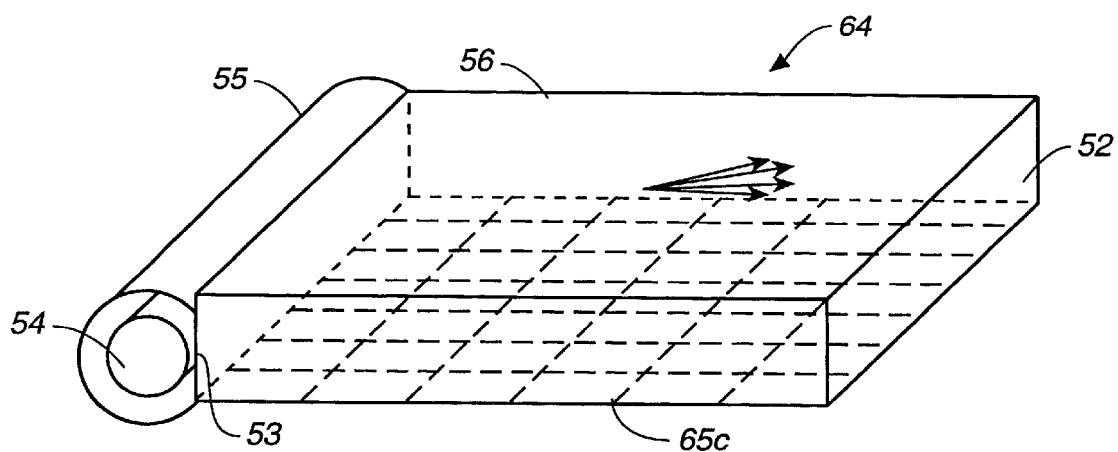
FIG._30
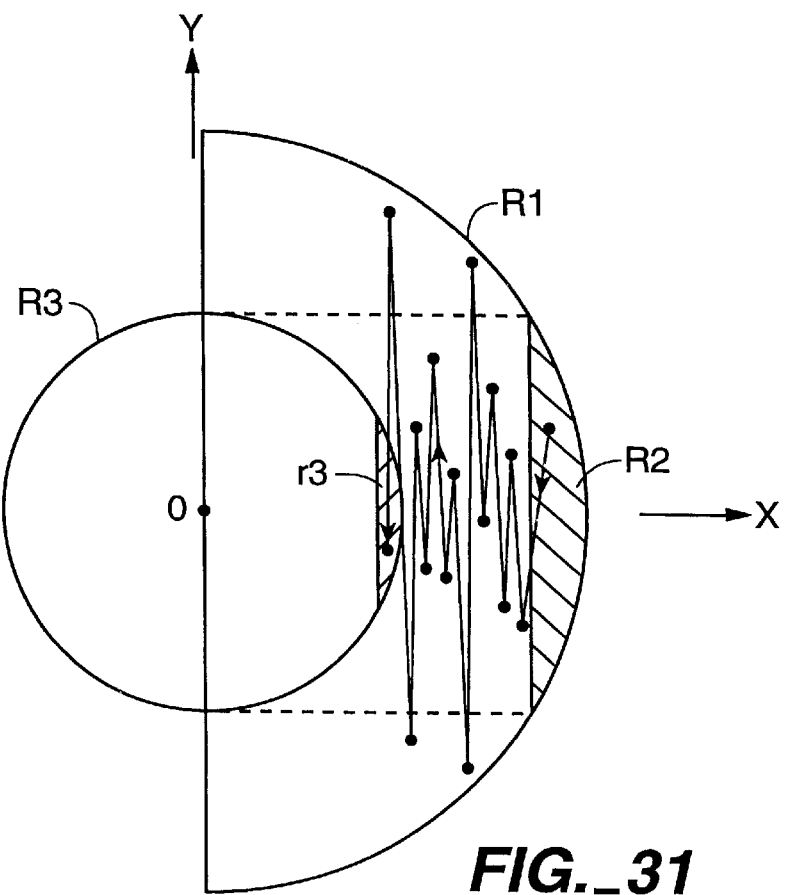
FIG._31

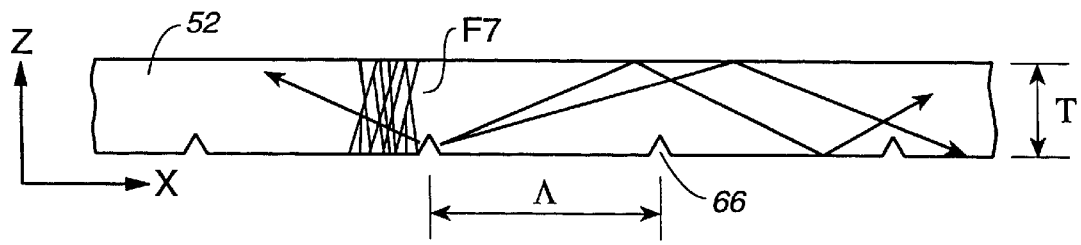
FIG._32A
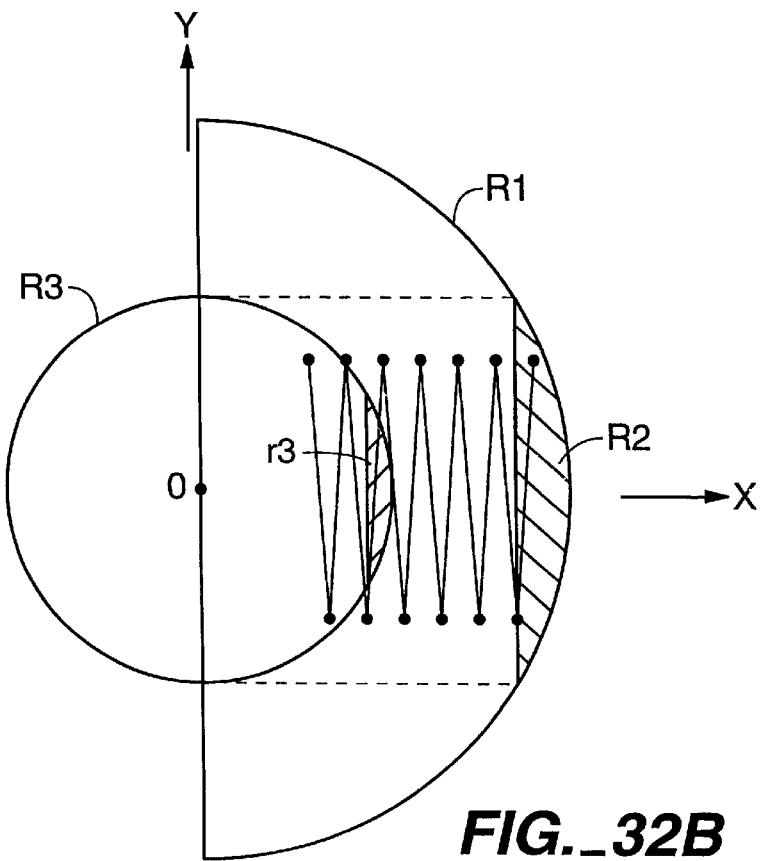
FIG._32B

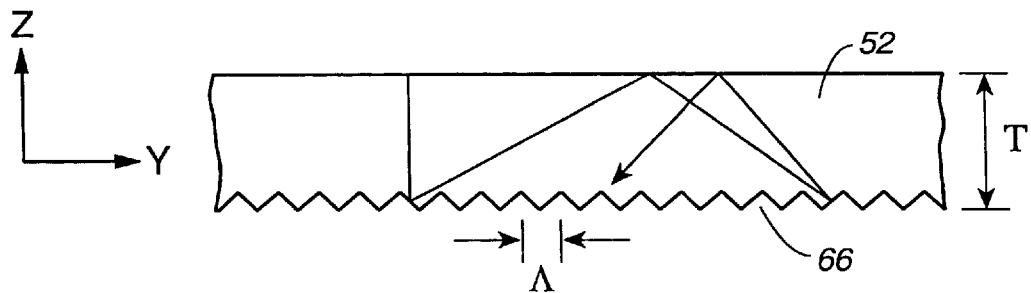
FIG._33
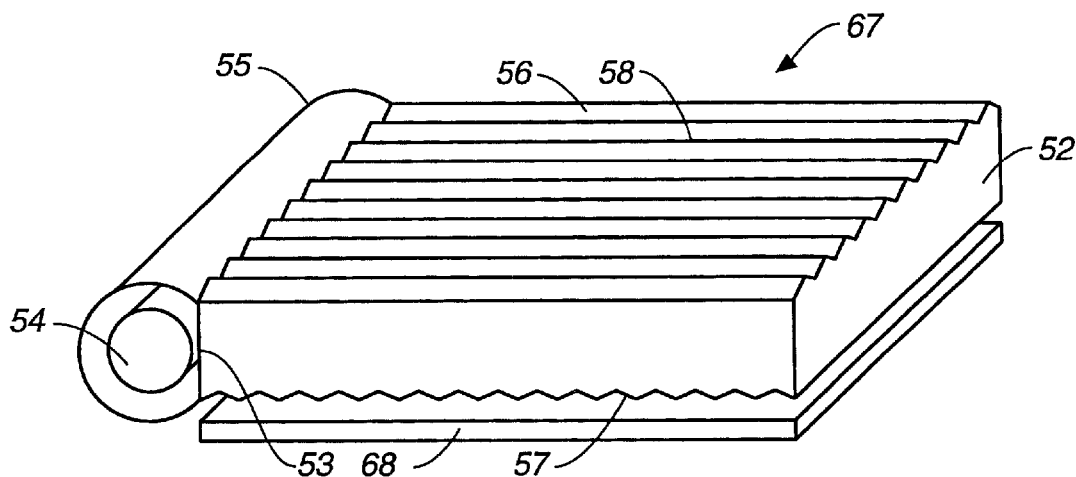
FIG._34
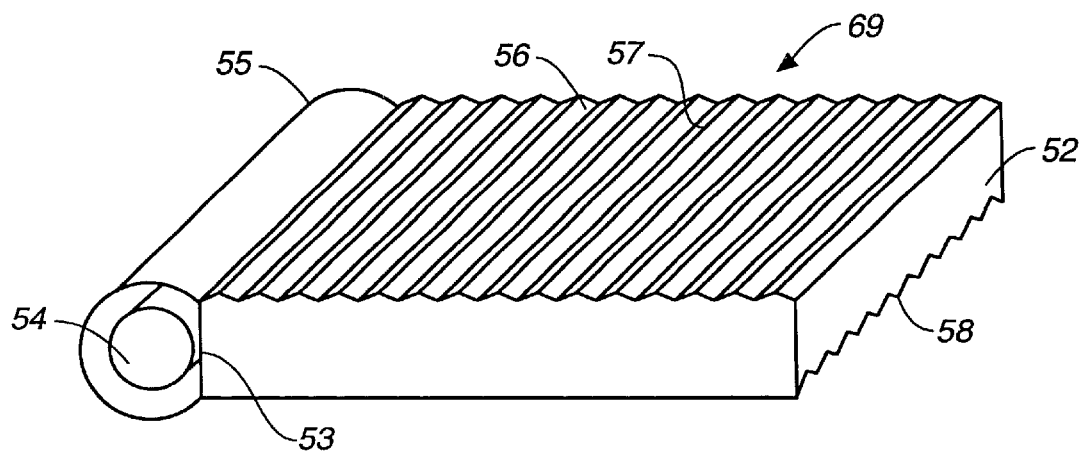
FIG._35

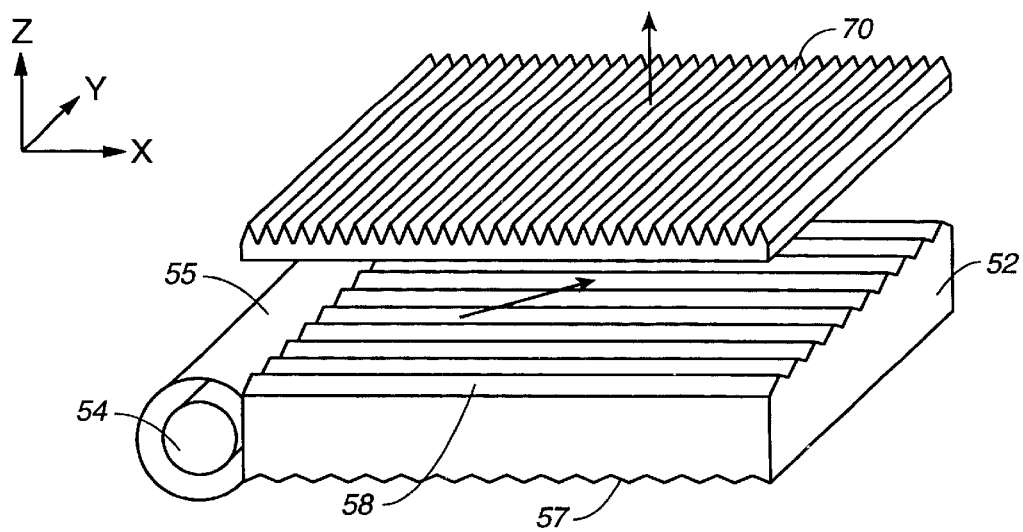
FIG._36
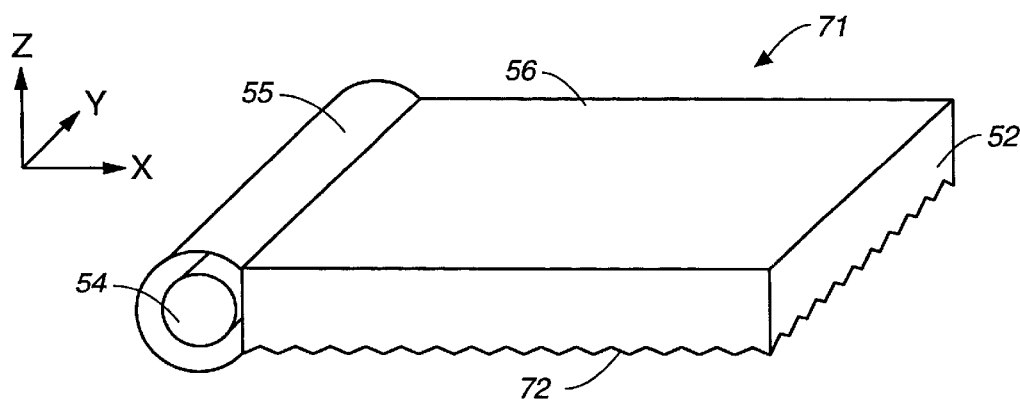
FIG._37
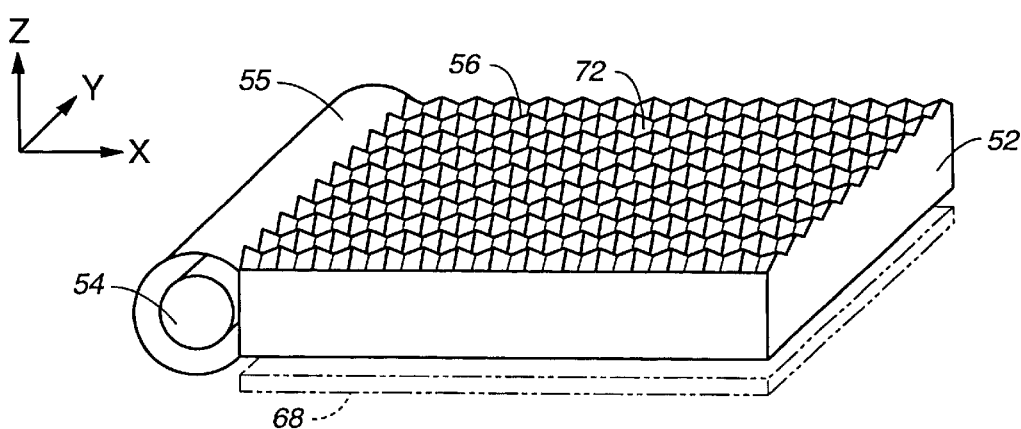
FIG._38

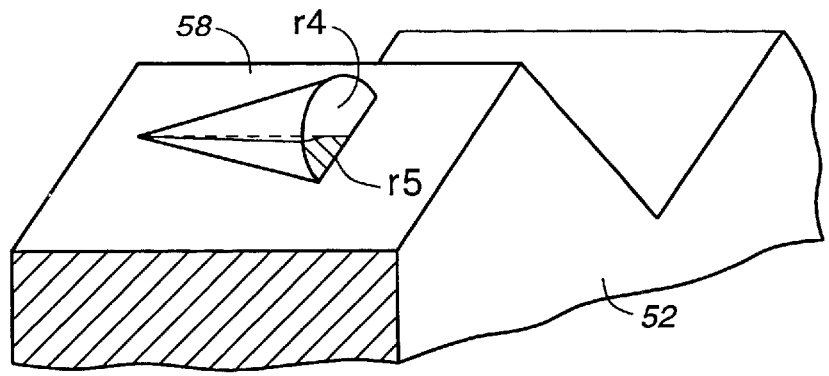
FIG._39A
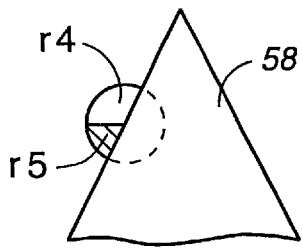
FIG._39B
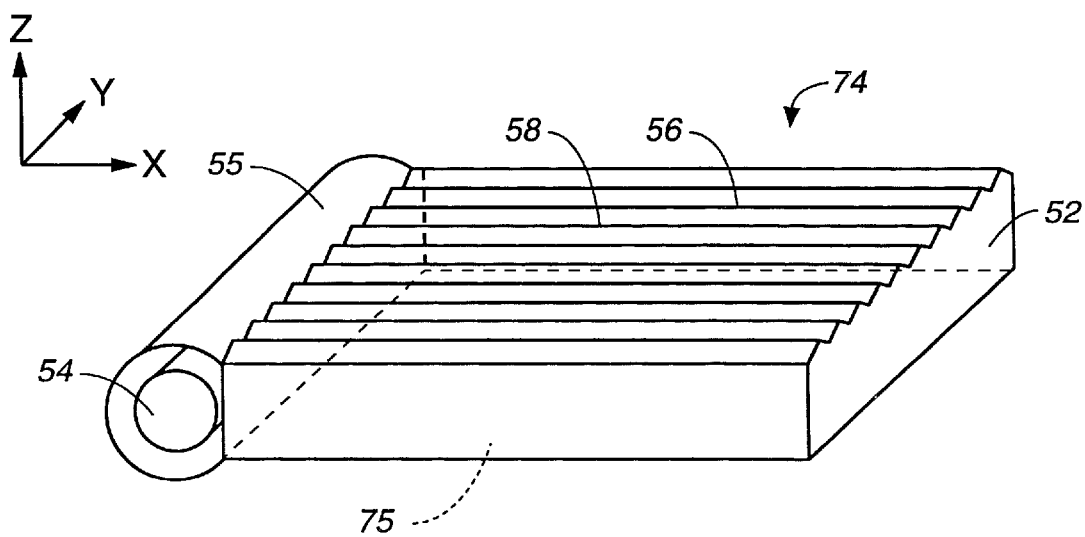
FIG._40

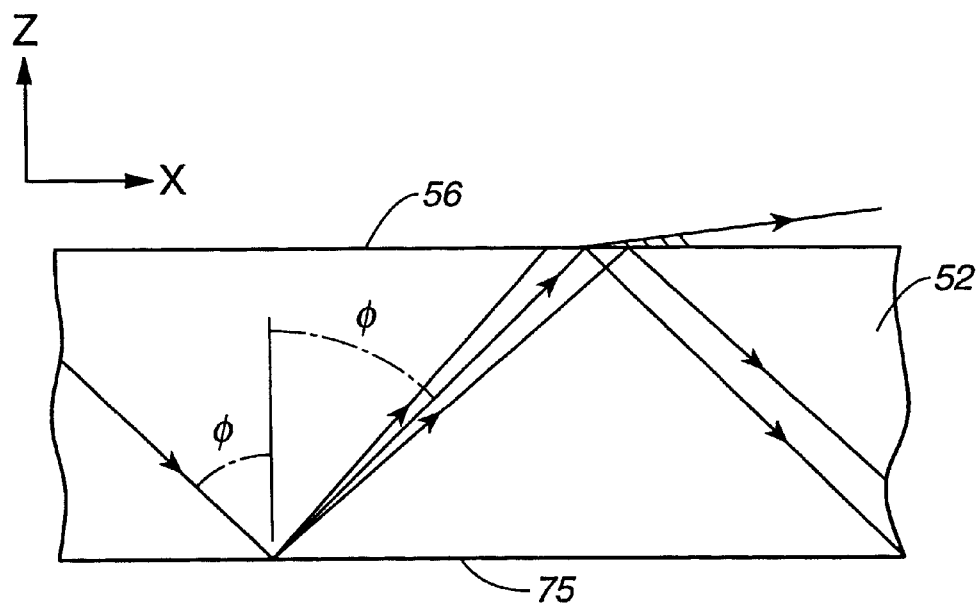
FIG._41
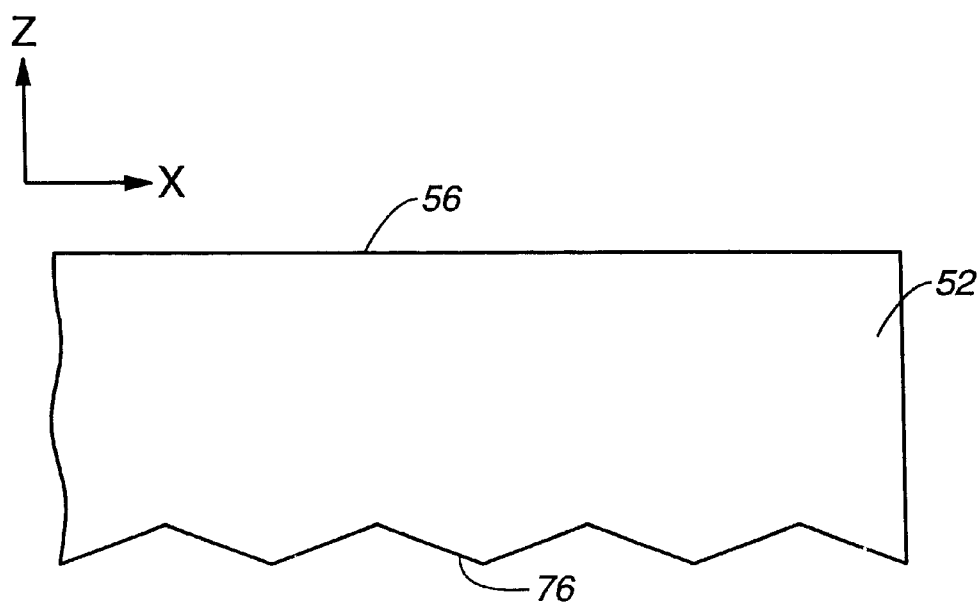
FIG._42

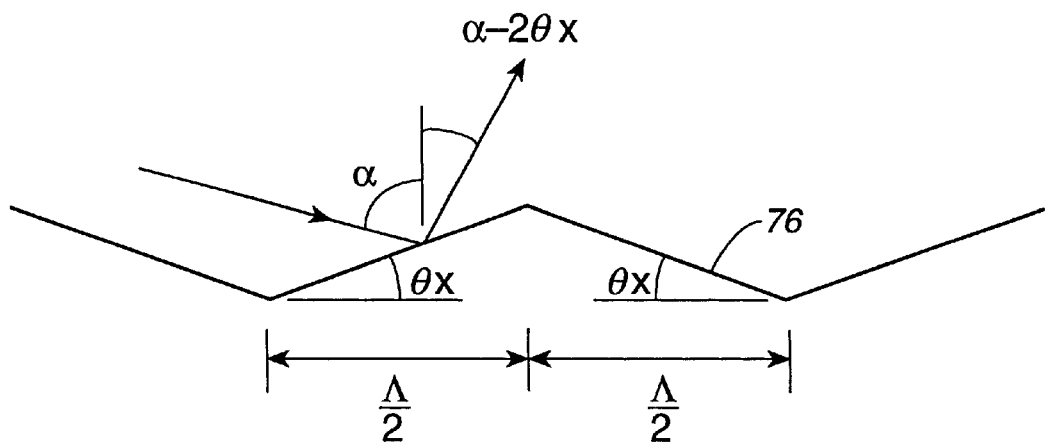
FIG._43
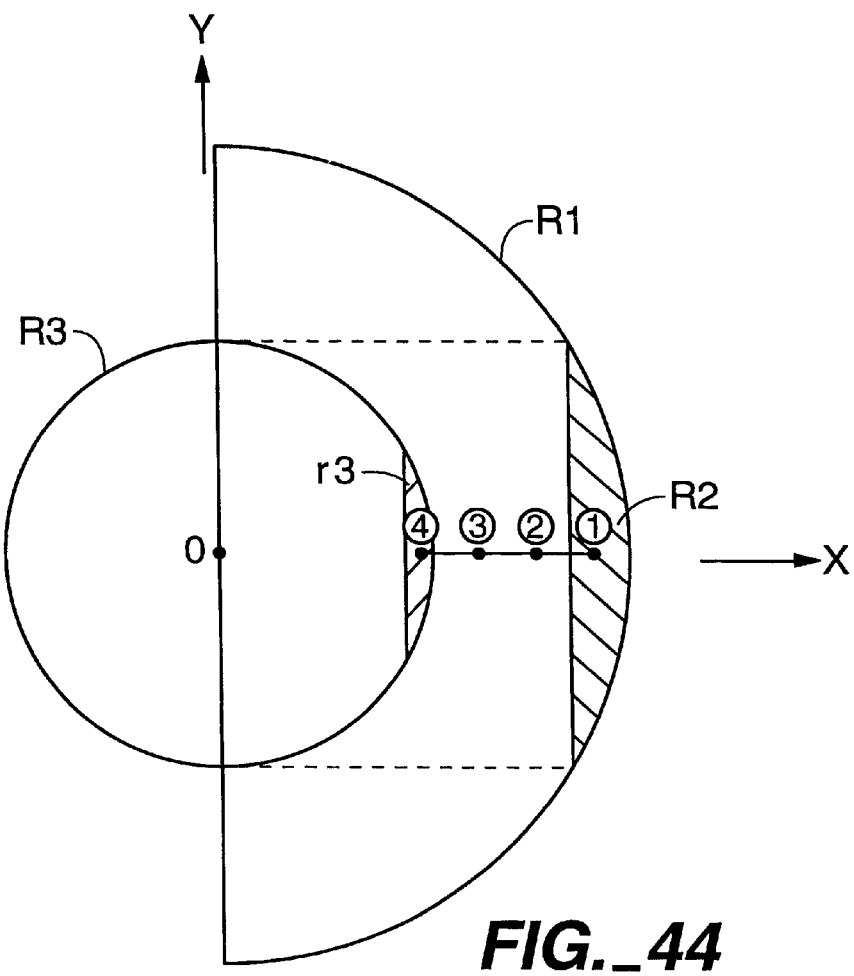
FIG._44

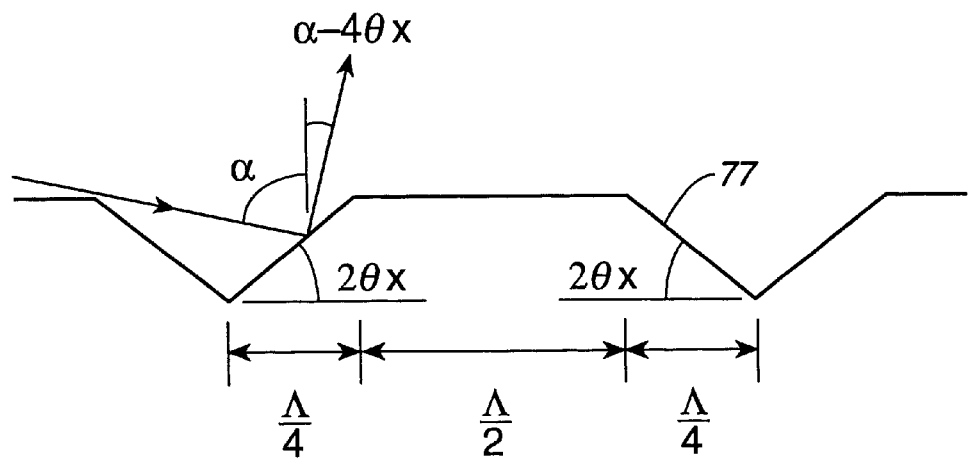
FIG._45
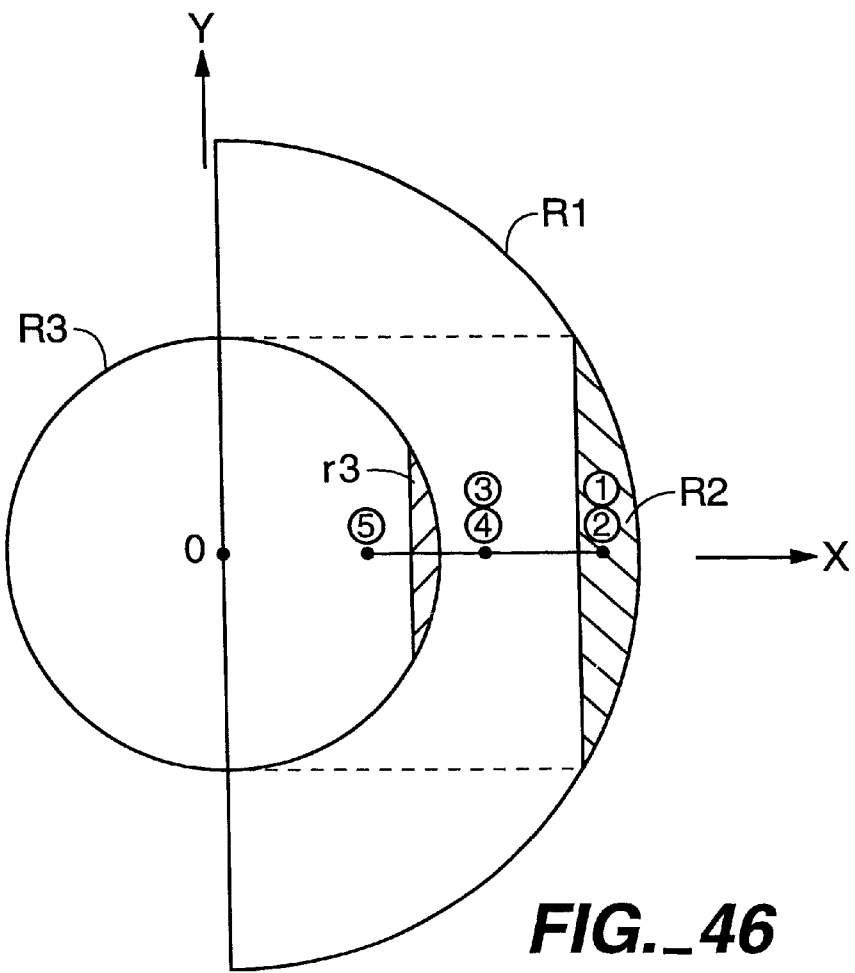
FIG._46

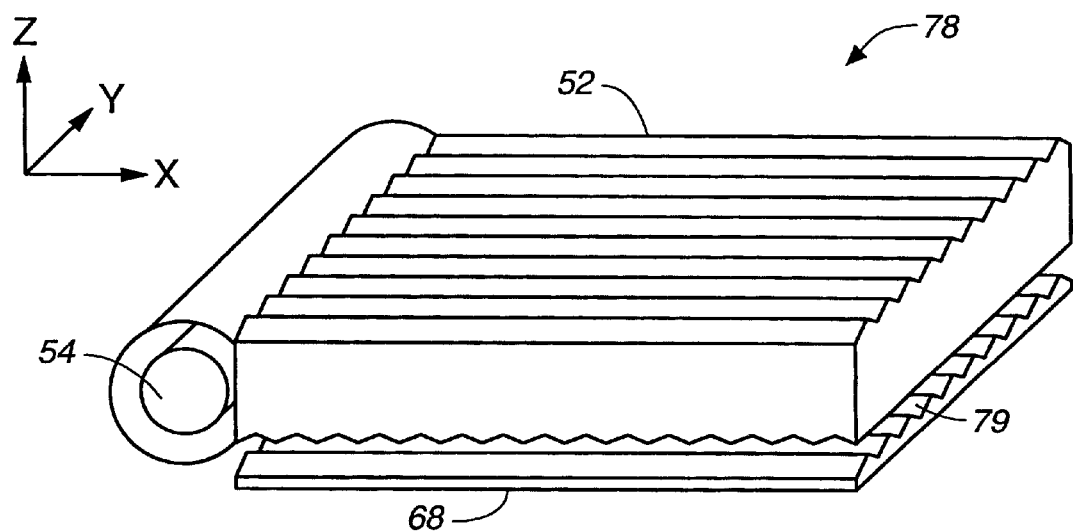
FIG._47
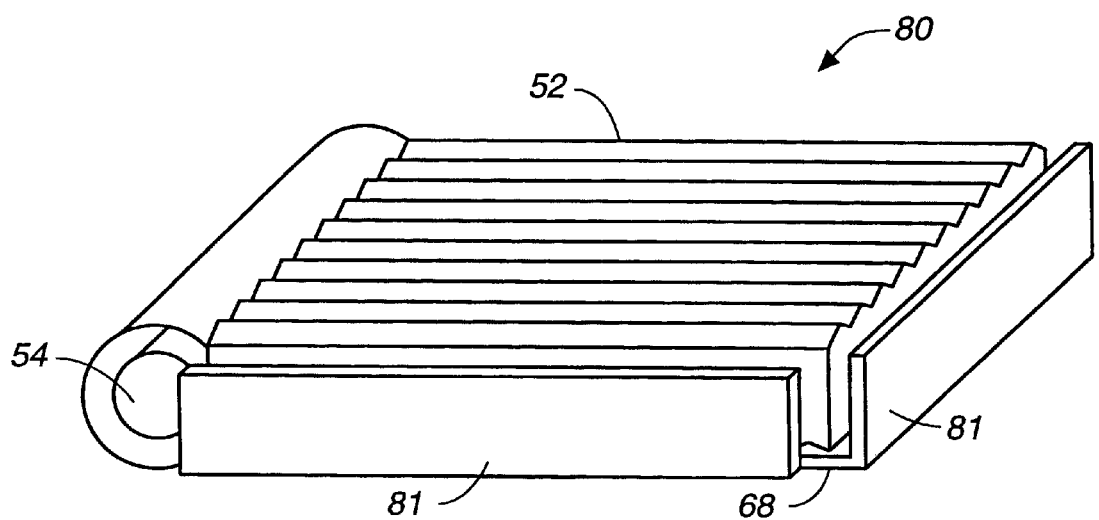
FIG._48

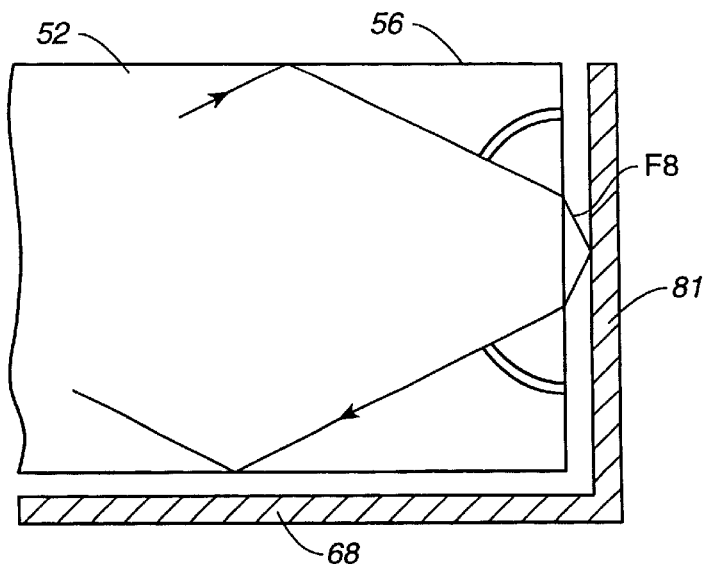
FIG._49
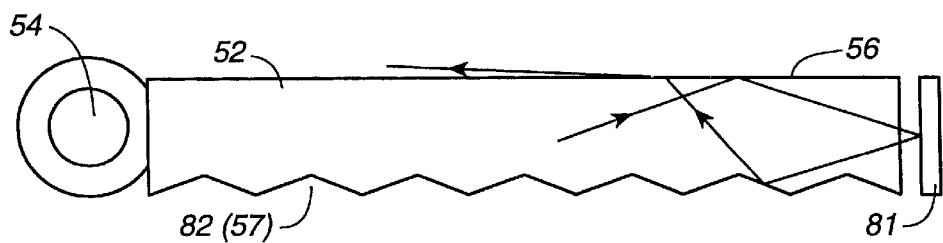
FIG._50
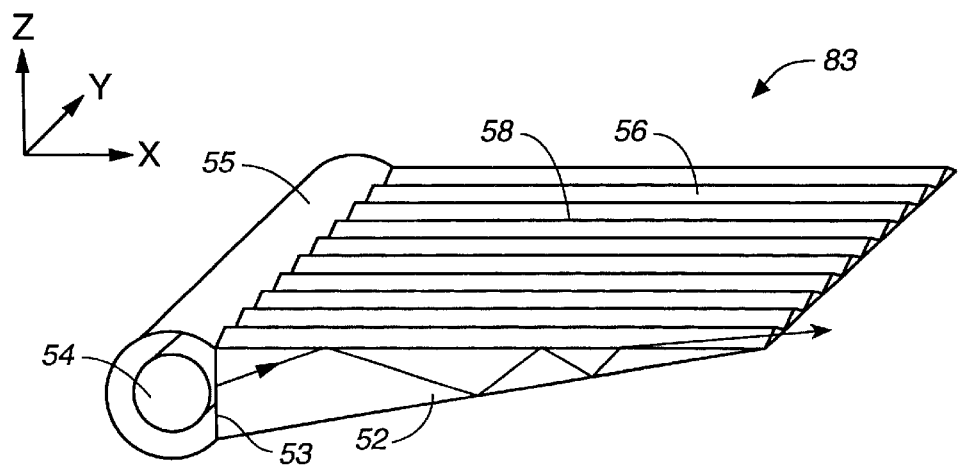
FIG._51

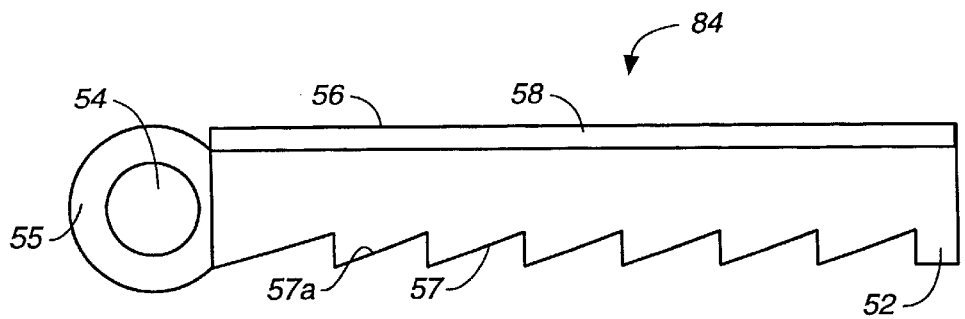
FIG._52
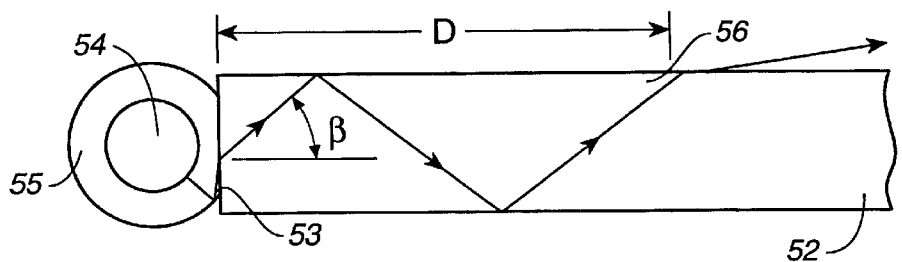
FIG._53
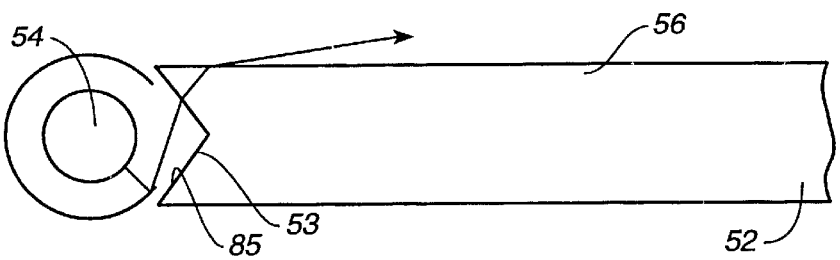
FIG._54
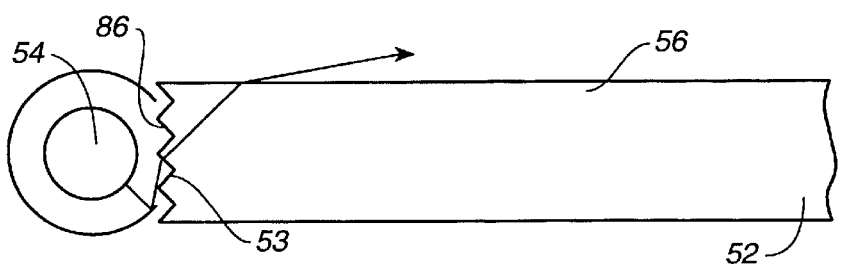
FIG._55

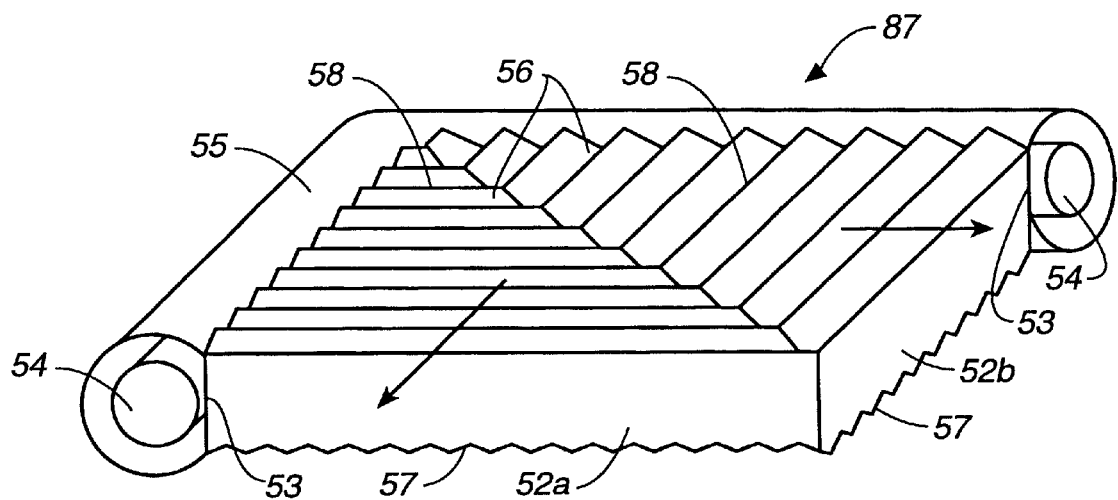
FIG._56
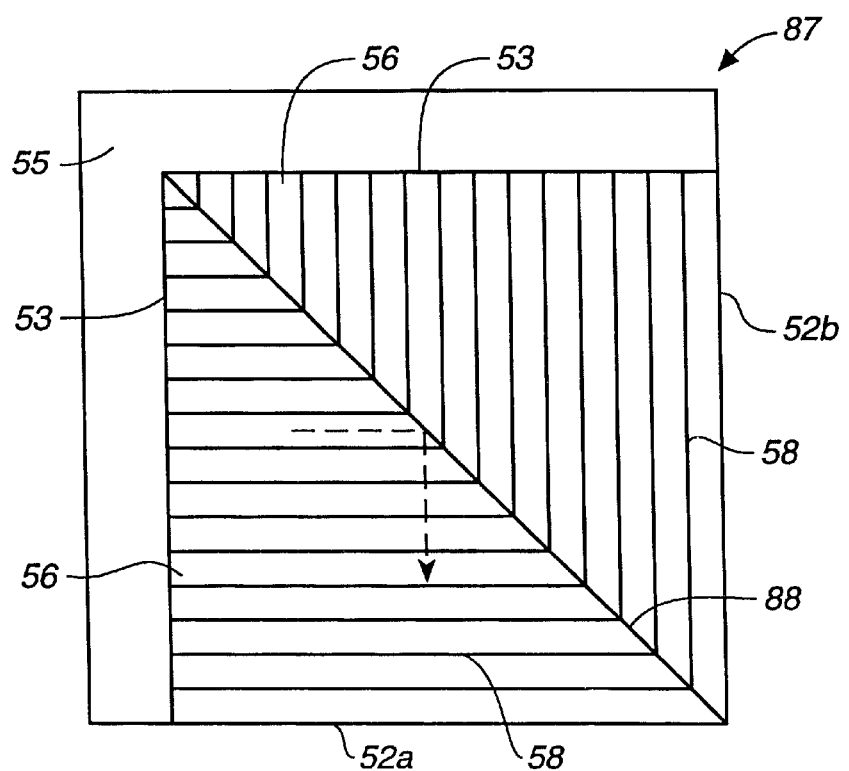
FIG._57

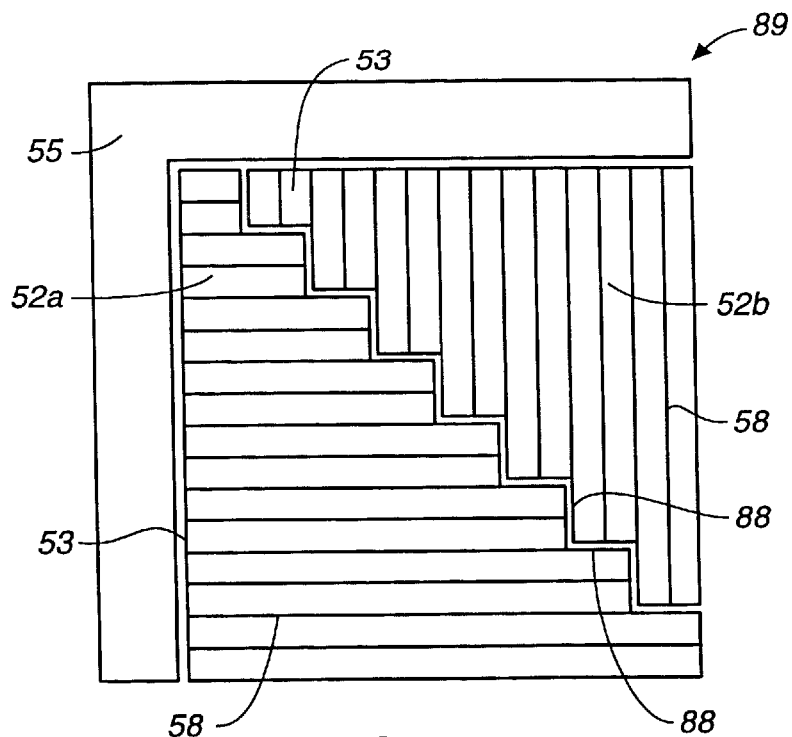
FIG._58
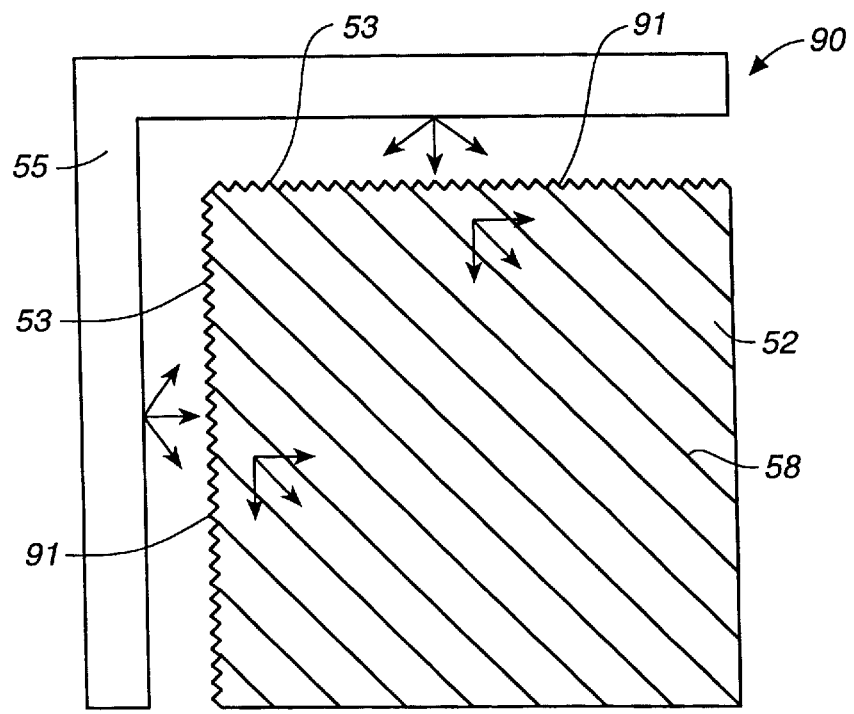
FIG._59

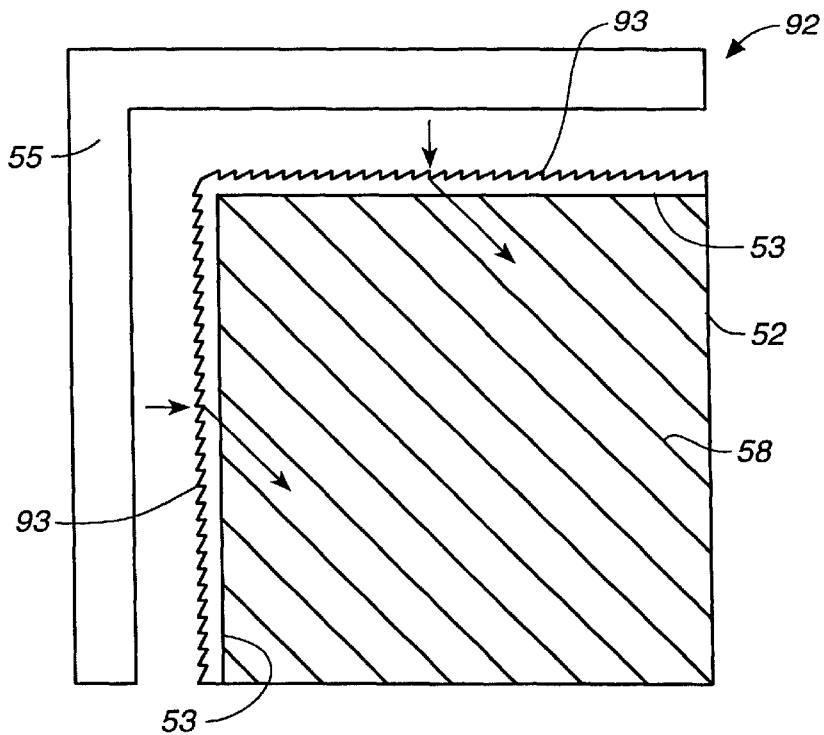
FIG._60
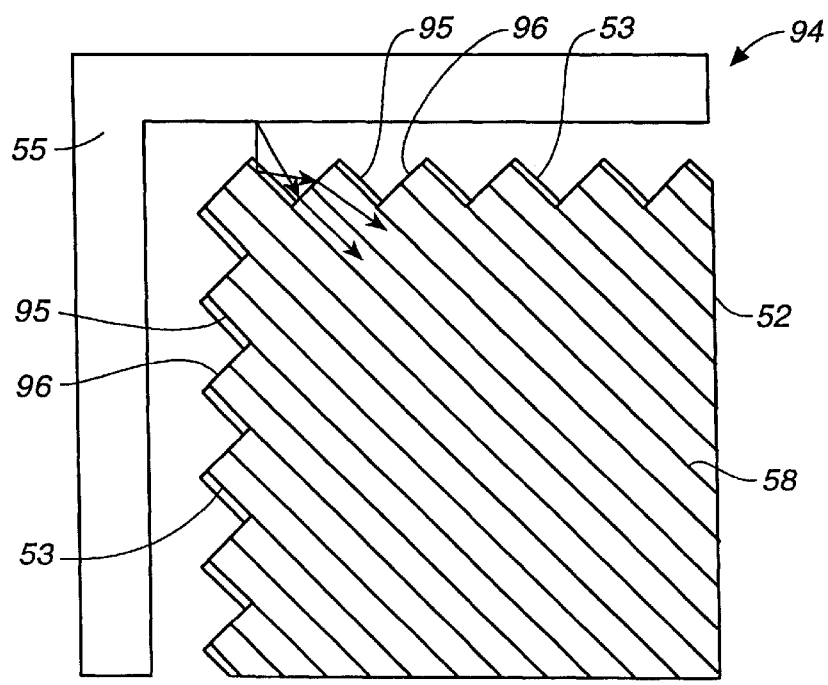
FIG._61

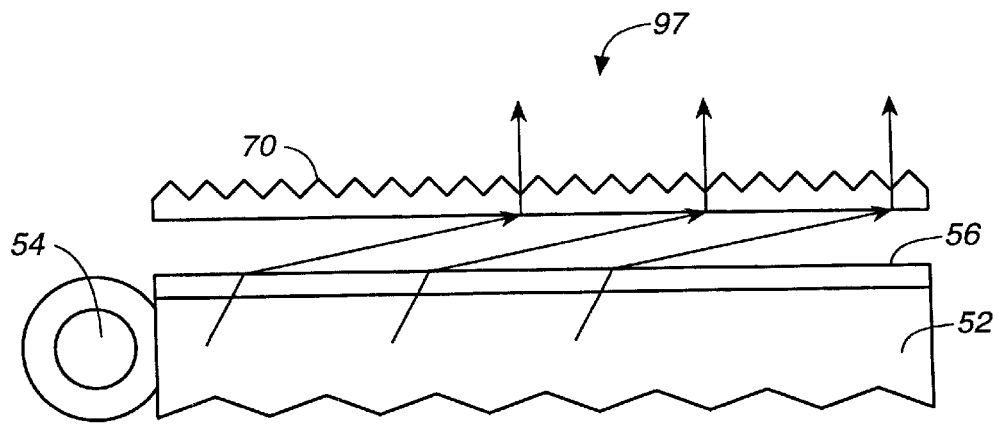
FIG._62
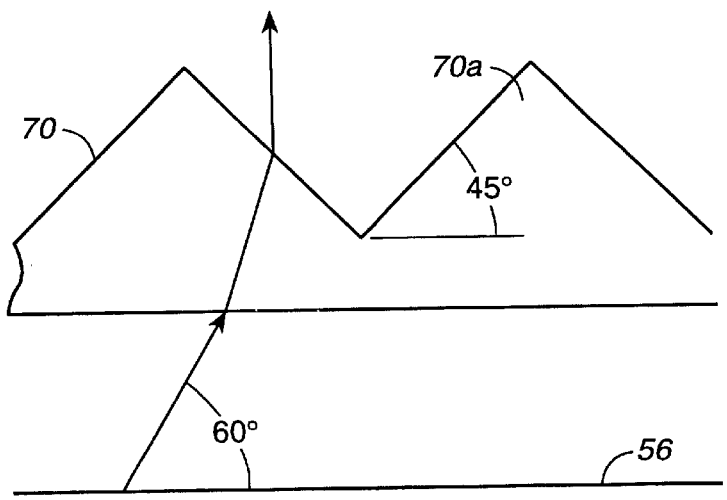
FIG._63
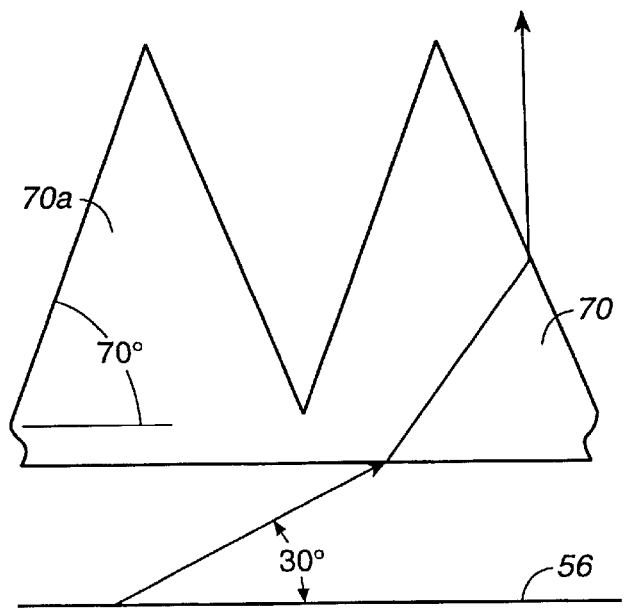
FIG._64

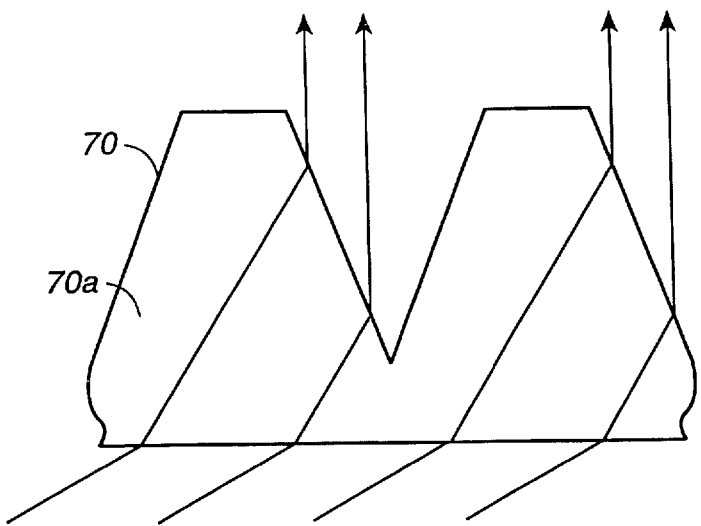
FIG._65
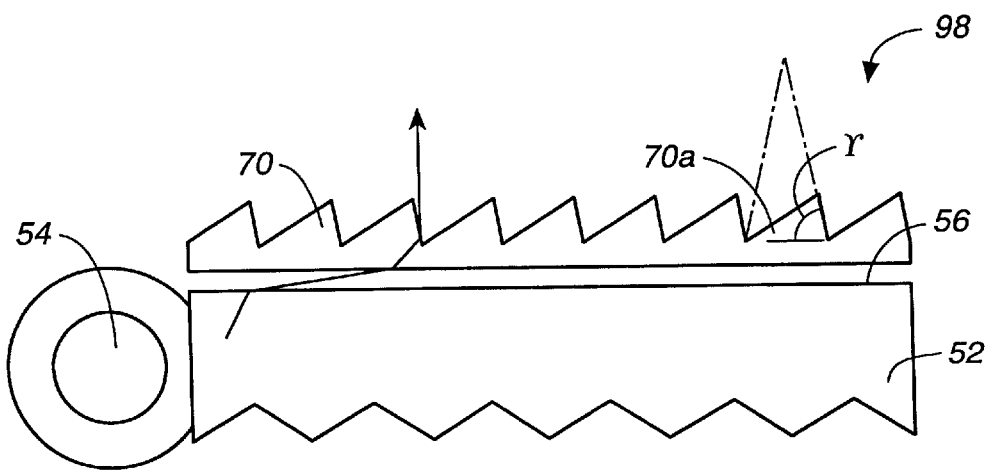
FIG._66
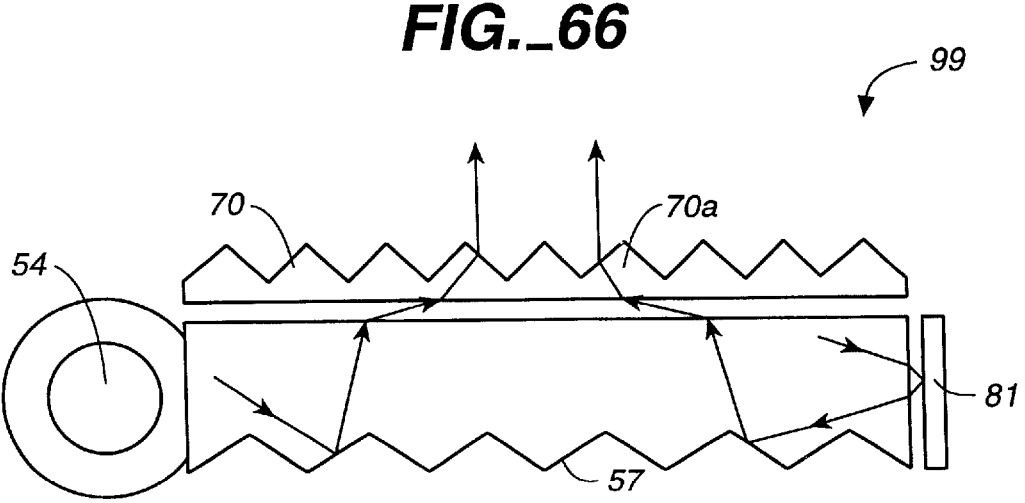
FIG._67

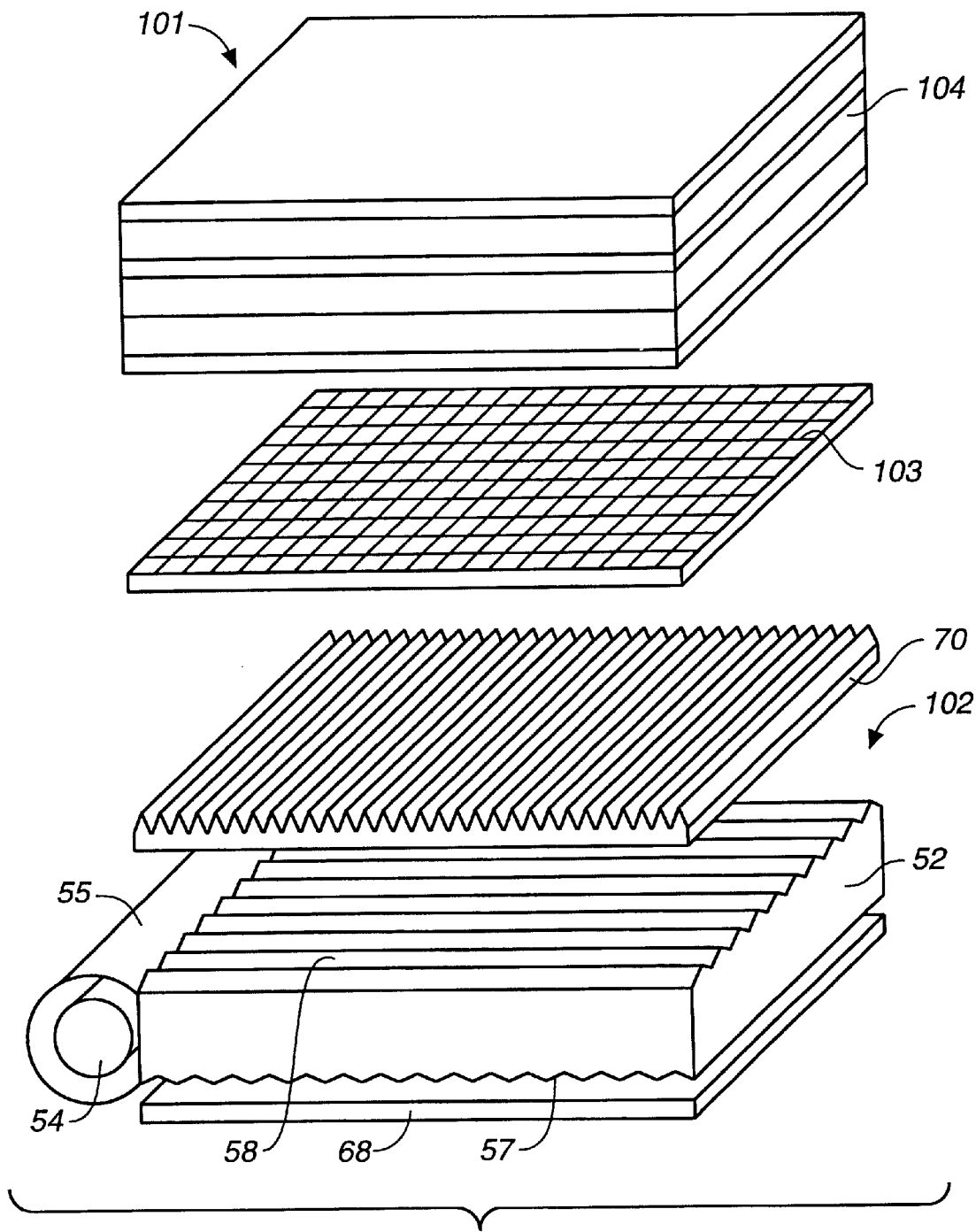
FIG._68

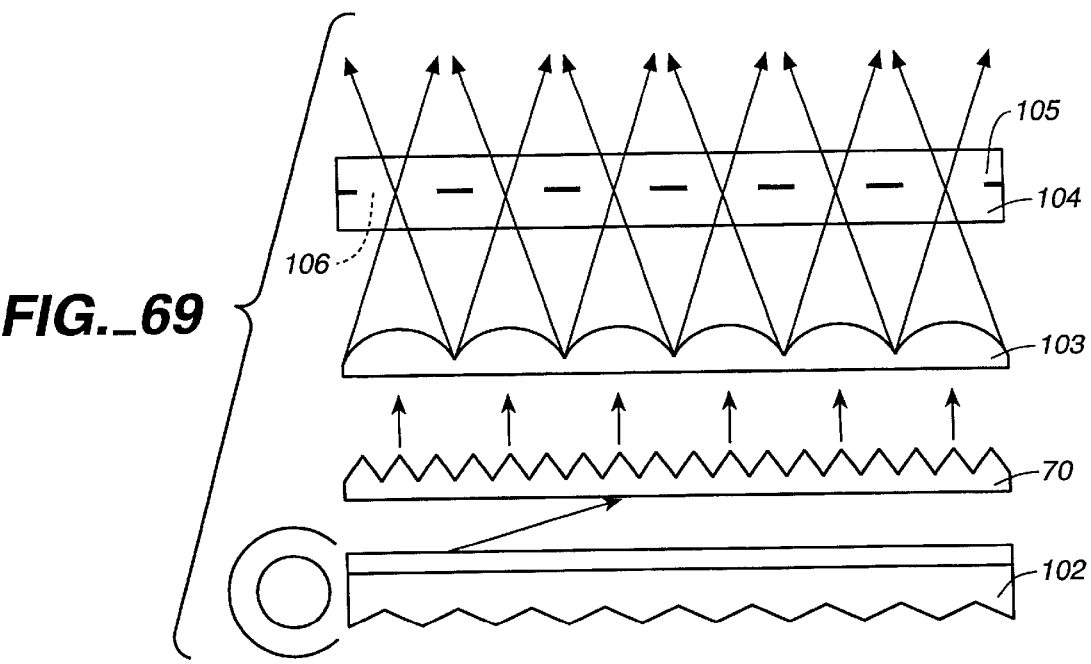
FIG._69
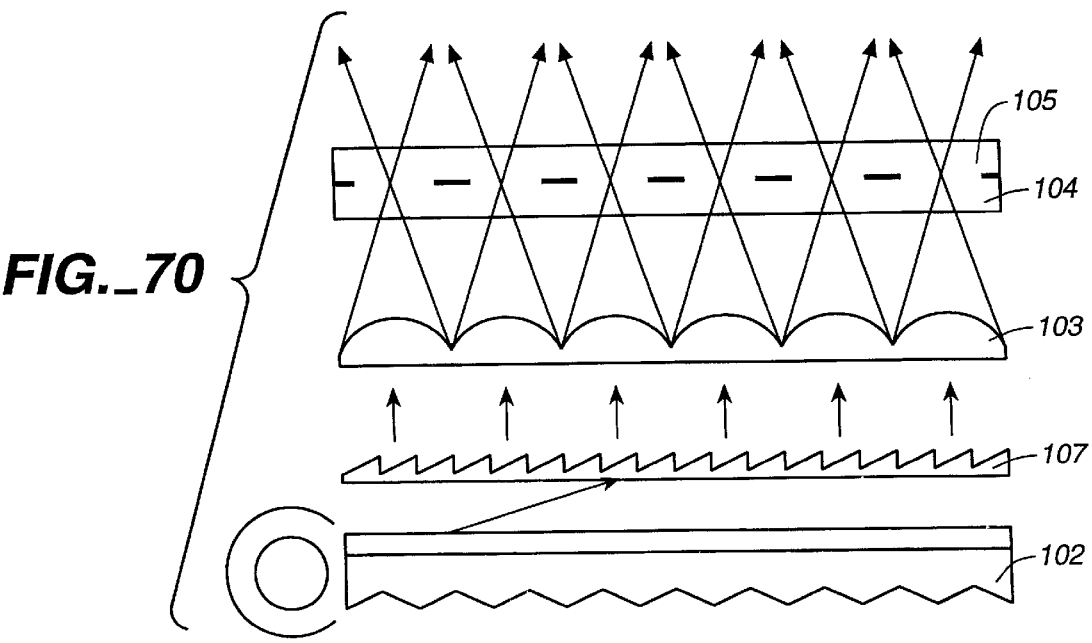
FIG._70

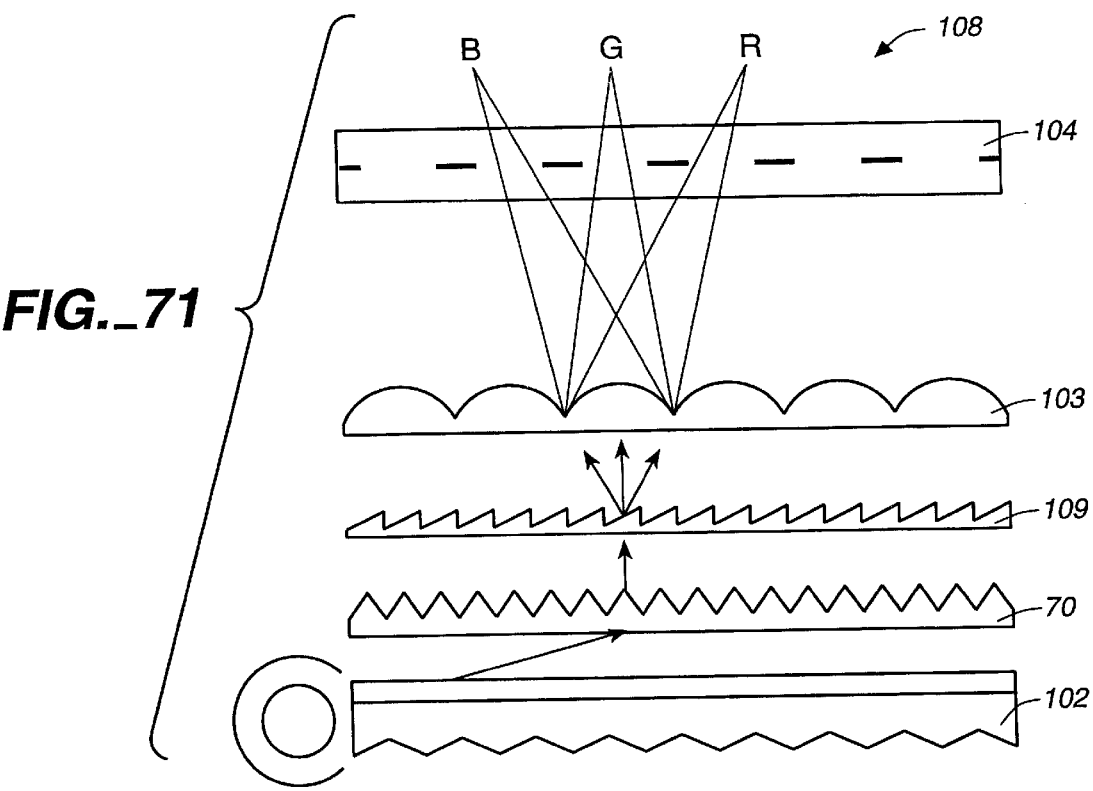
FIG._71
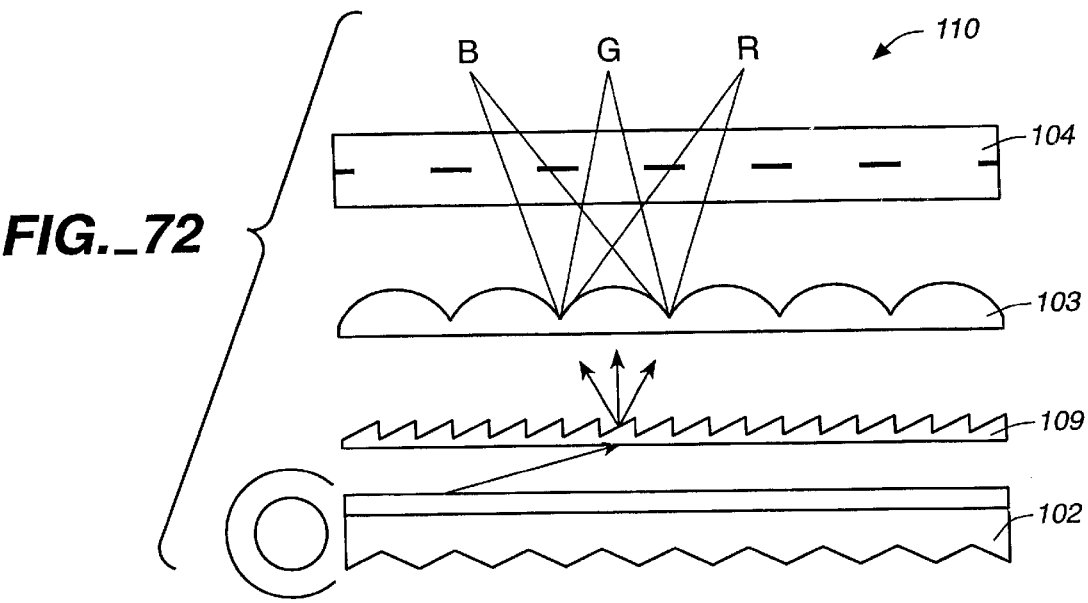
FIG._72

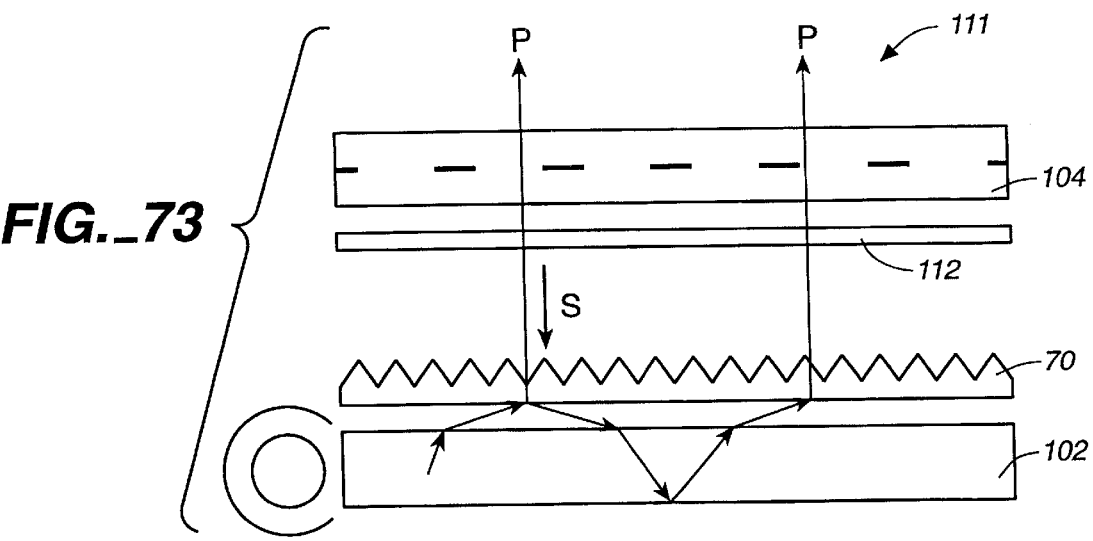
FIG._73
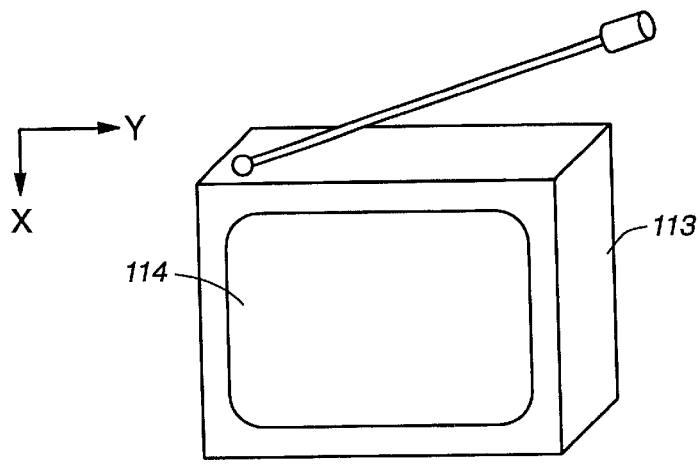
FIG._74
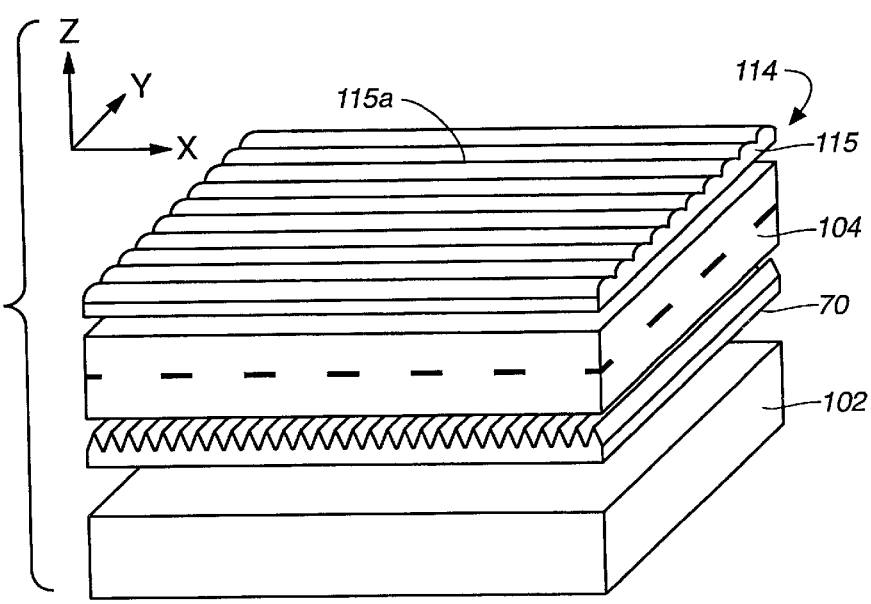
FIG._75

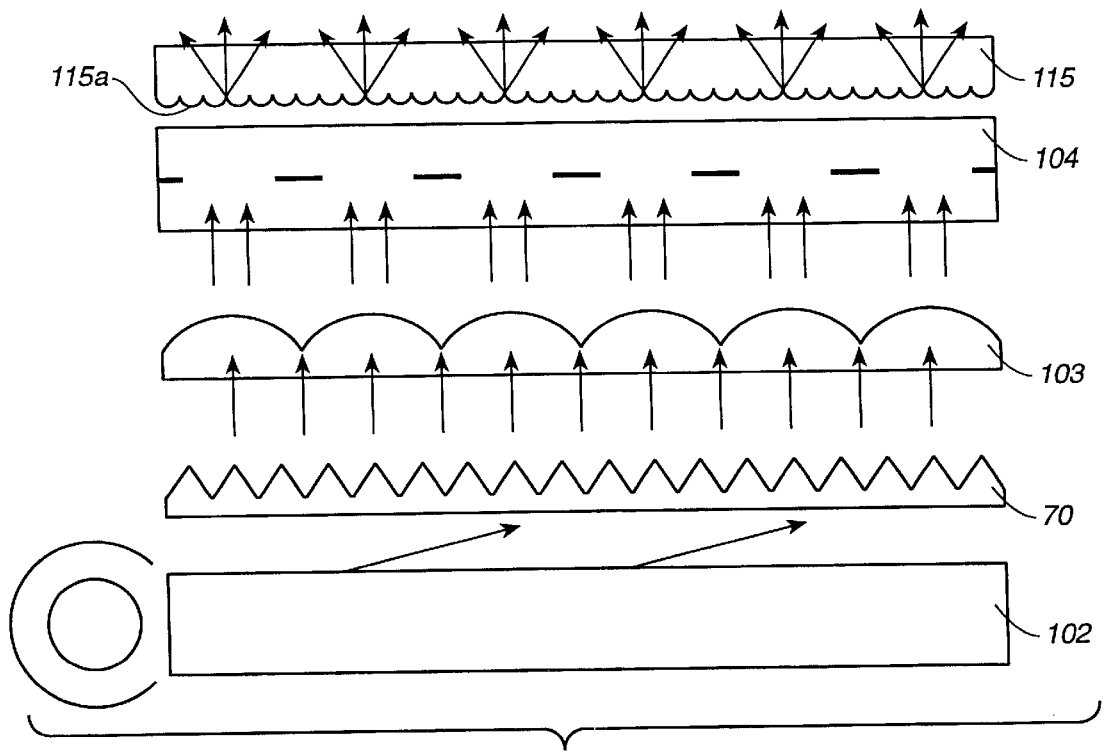
FIG._76
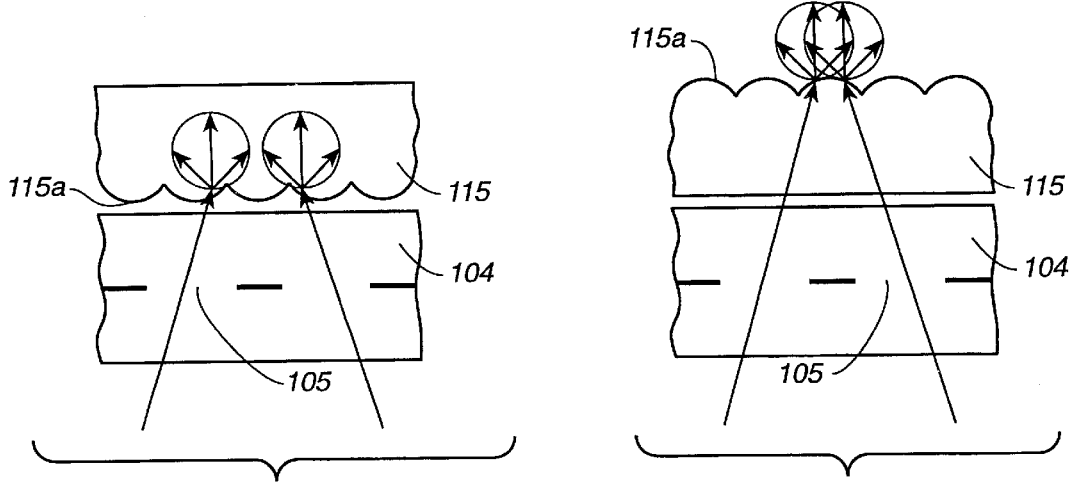
FIG._77A  FIG._77B

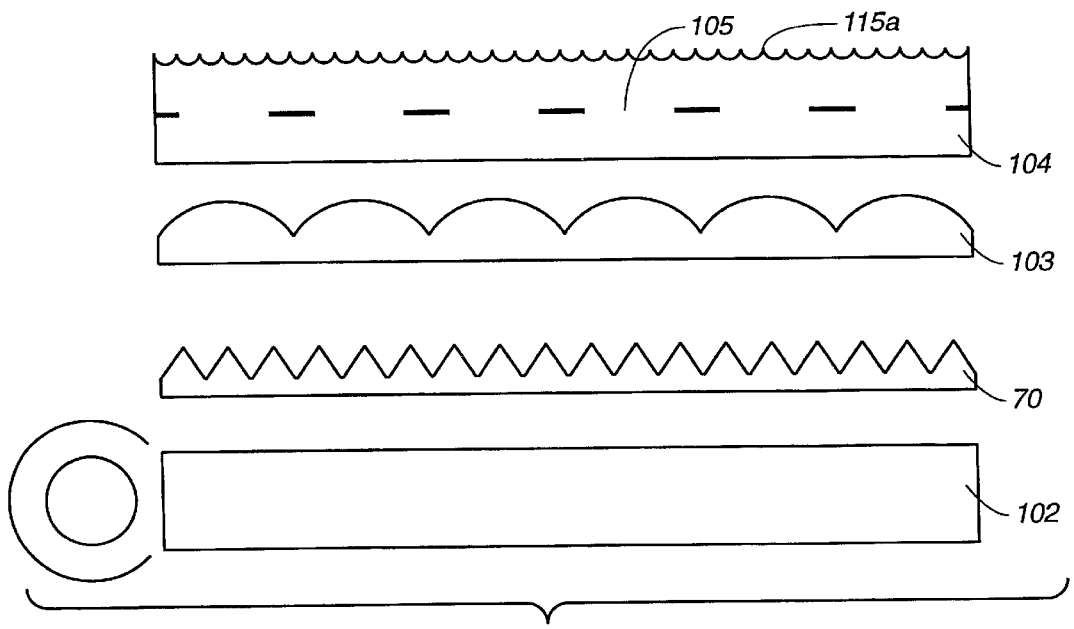
FIG._78
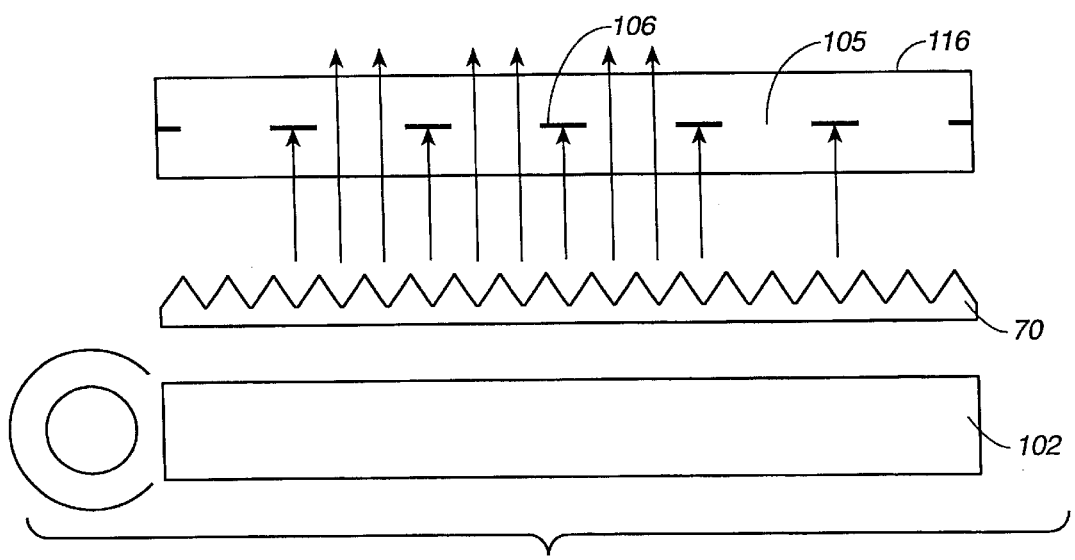
FIG._79
(PRIOR ART)

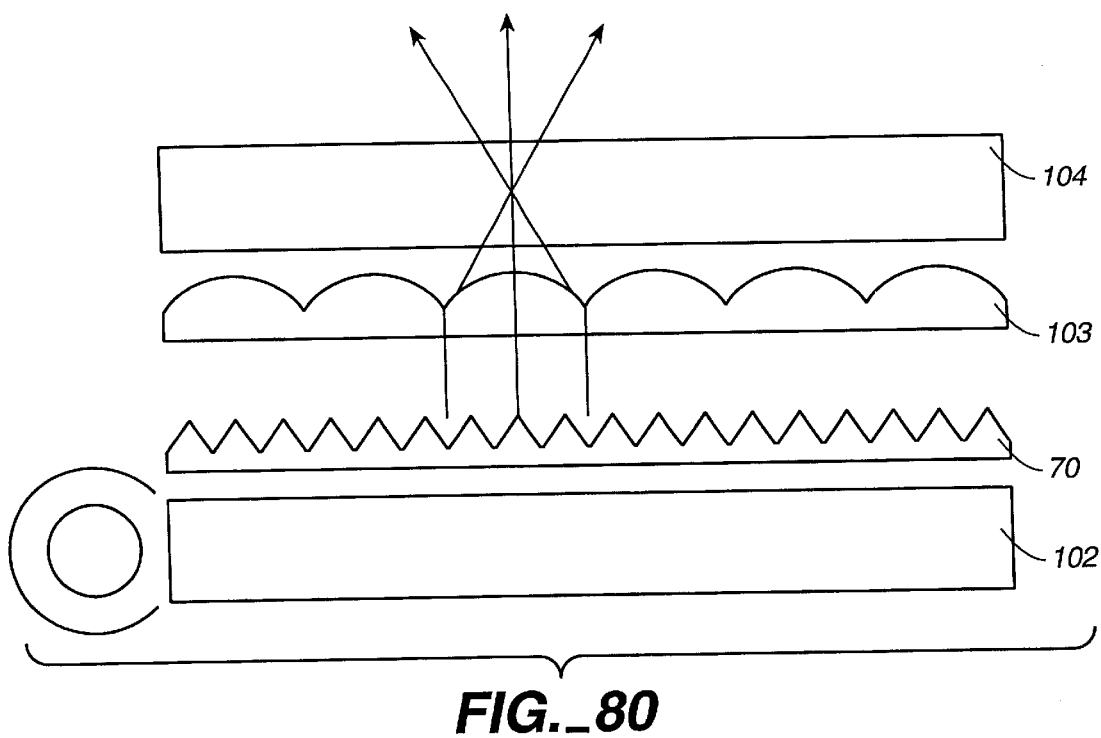
FIG._80
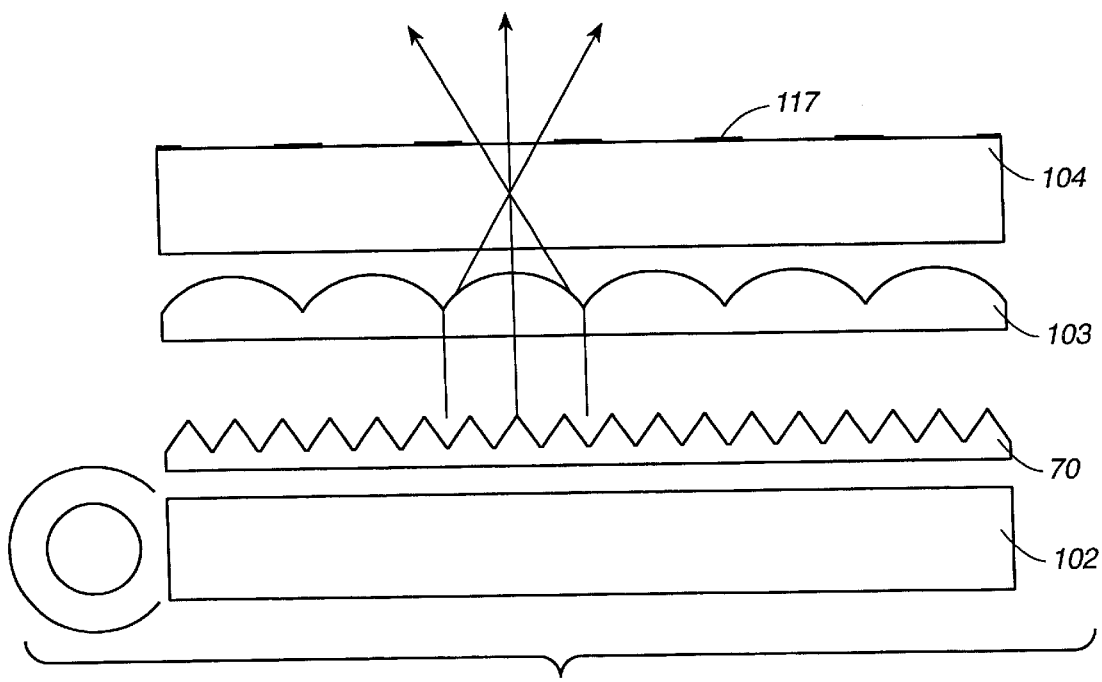
FIG._81

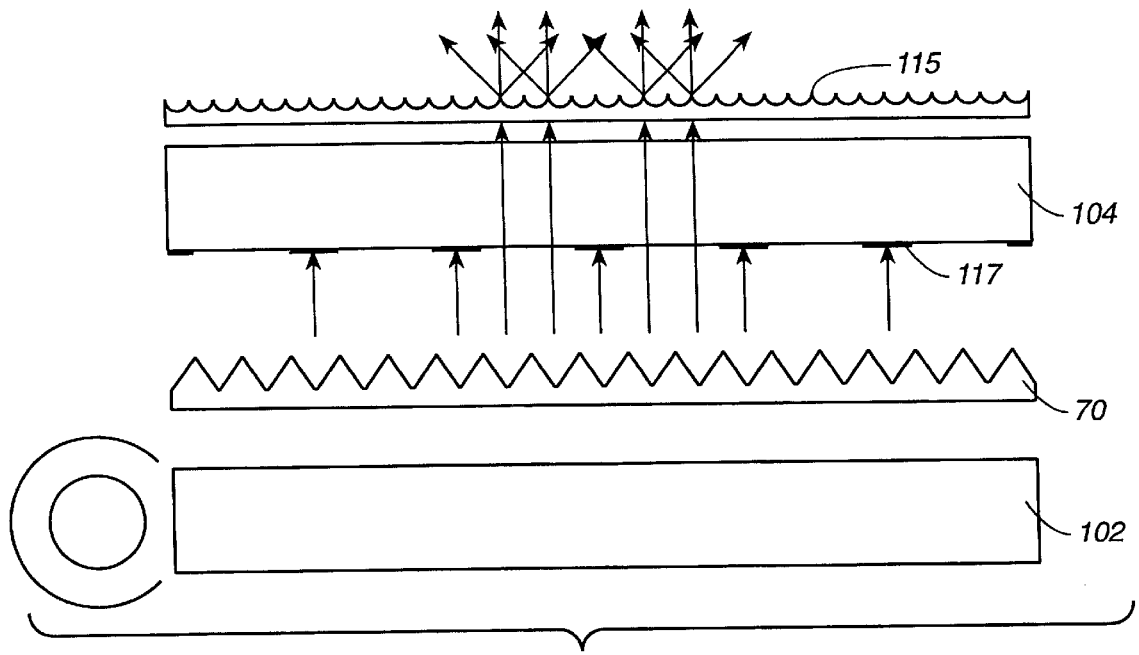
FIG._82
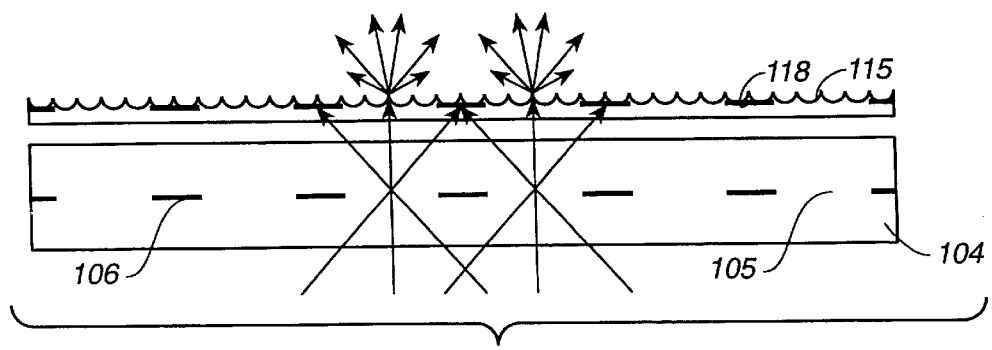
FIG._83

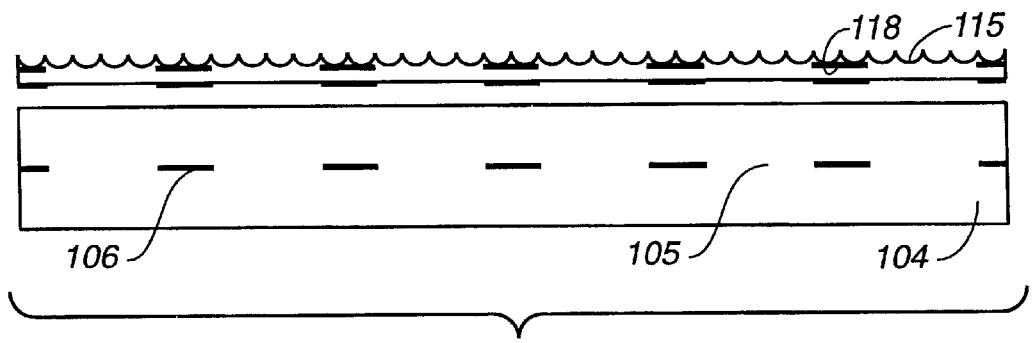
FIG._84
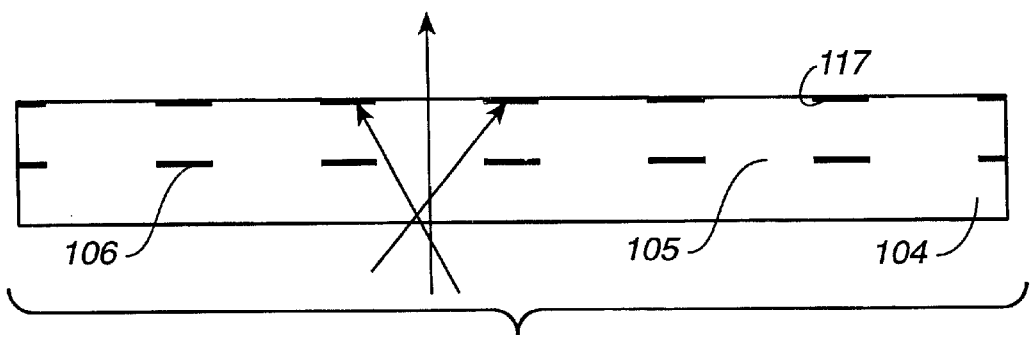
FIG._85
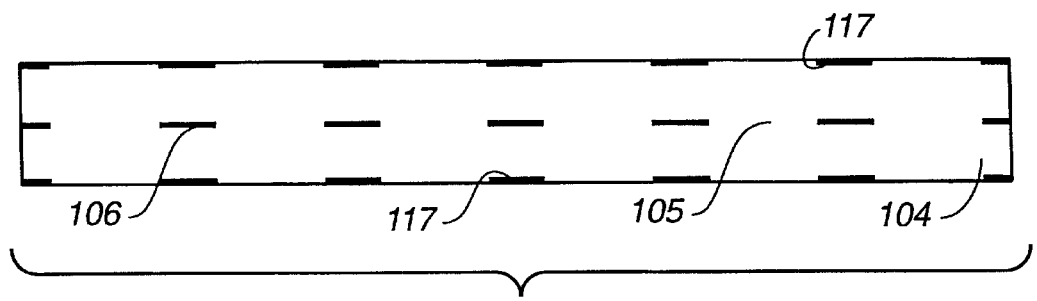
FIG._86

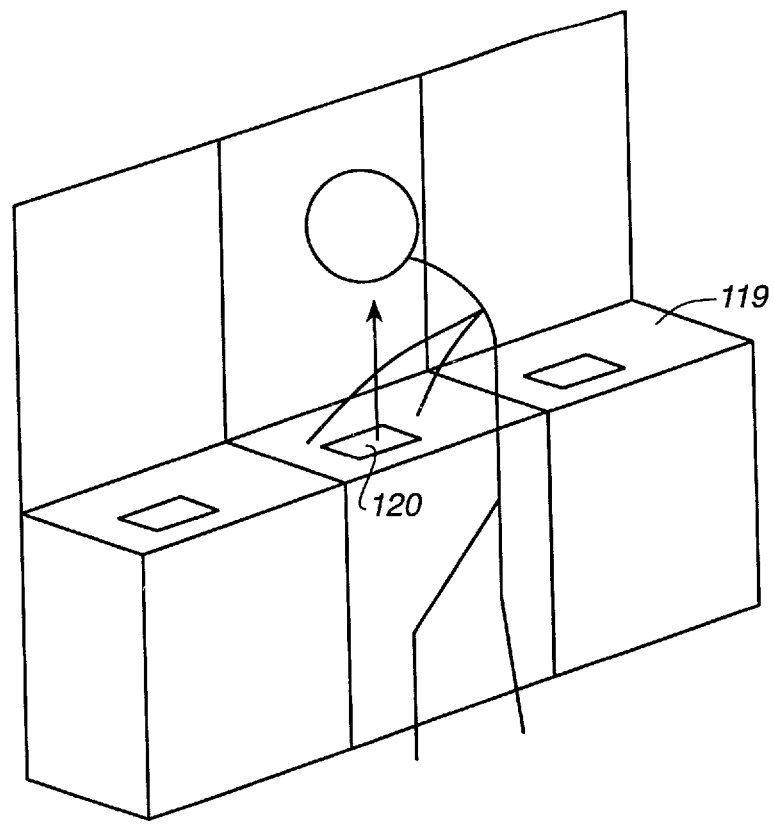
FIG._87
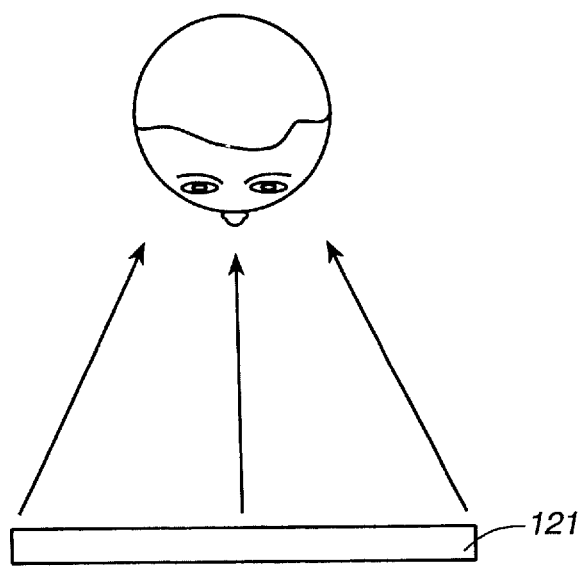
FIG._88

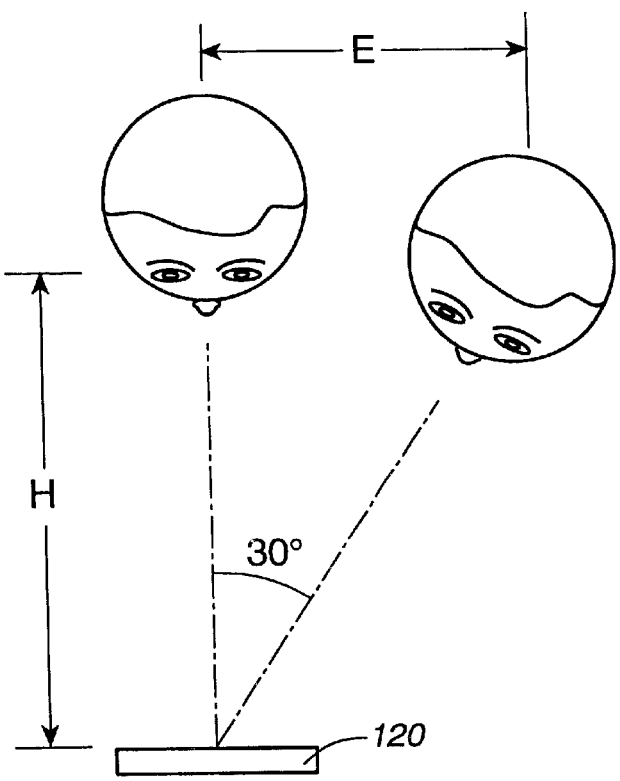
FIG._89
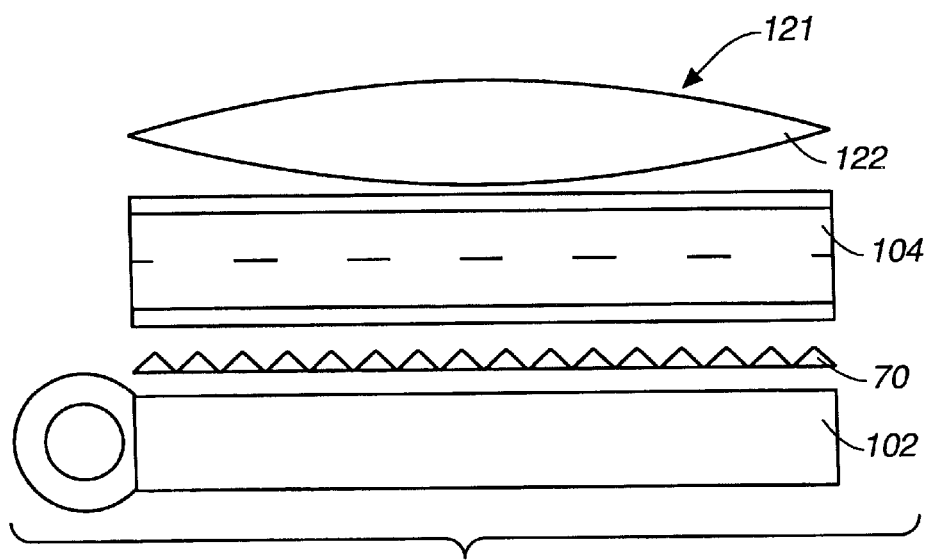
FIG._90

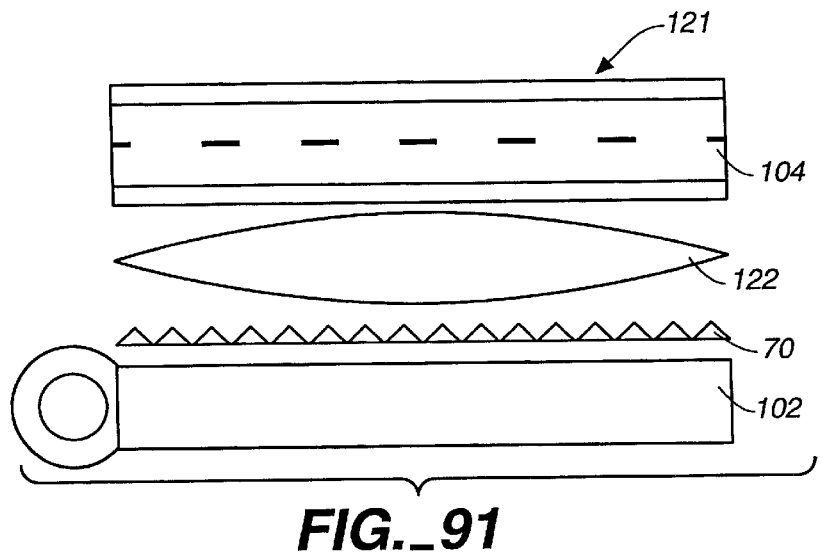
FIG._91
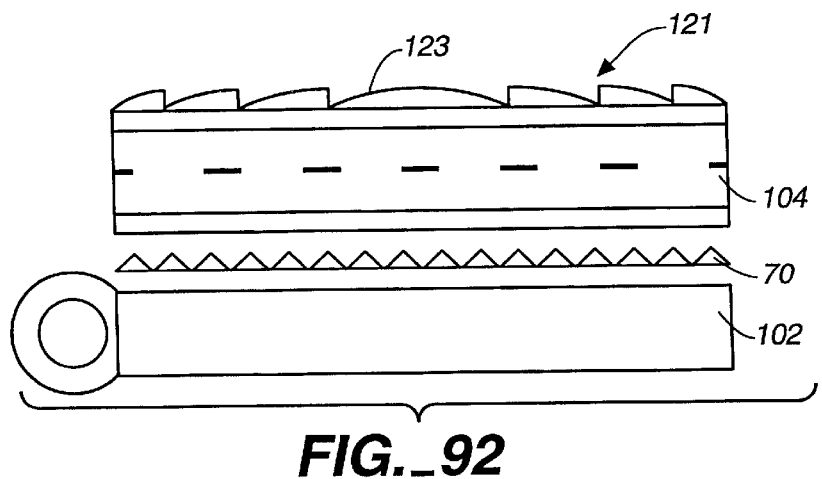
FIG._92
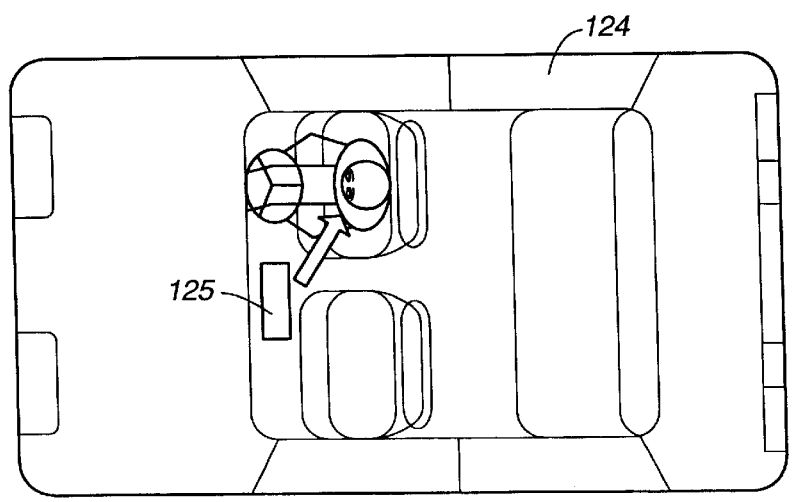
FIG._93

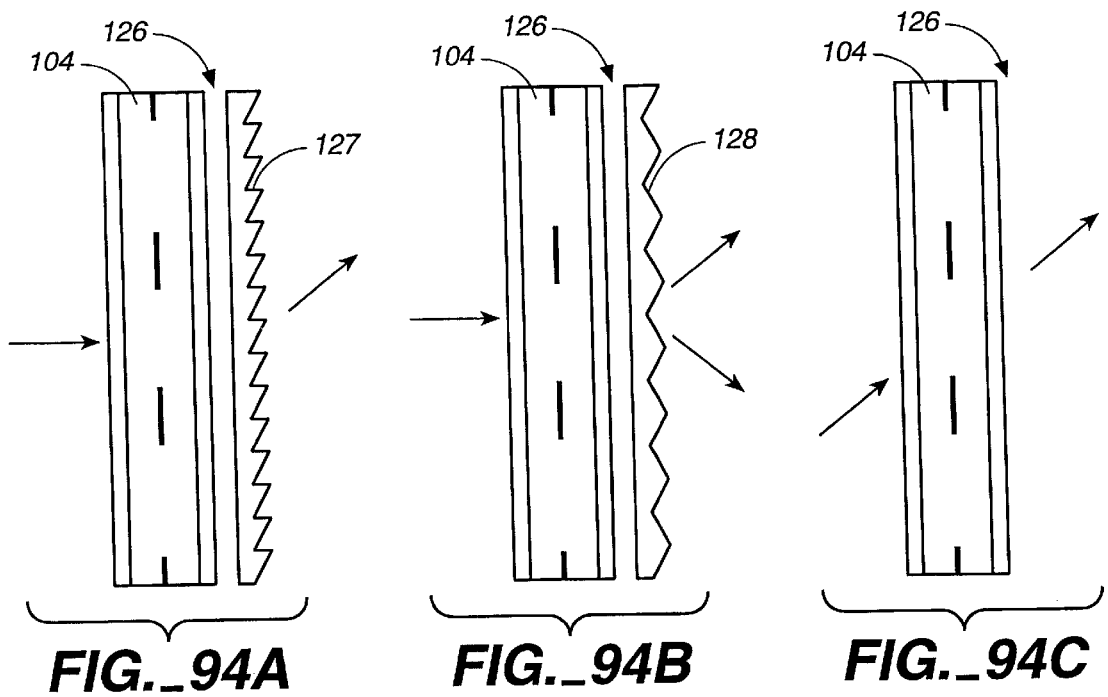
FIG._94A    FIG._94B    FIG._94C
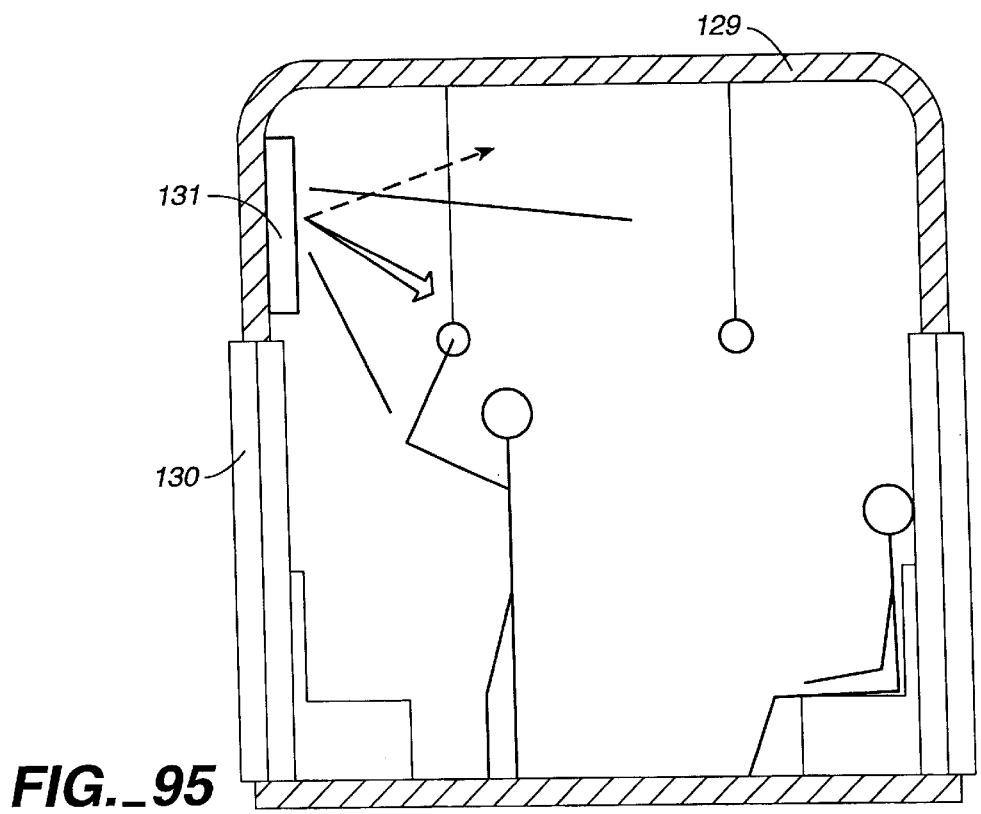
FIG._95

IMAGE DISPLAY APPARATUS

This is a divisional of application Ser. No. 08/729,145 filed Oct. 11, 1996, which is now U.S. Pat. No. 6,231,200.

BACKGROUND OF THE INVENTION

This invention relates to image display apparatus, including automatic teller machines and game tables, using a new surface light source device, in particular, of an edge light type.

Liquid crystal (LC) display apparatus, because they have the favorable characteristics of being light and thin, have been used as display devices not only for lap-top and book-type personal computers and word processors but also for electronic notebooks, portable telephones, LC television sets, various portable terminals and video cameras. More recently, they are also being used as display apparatus for measurement instruments such as time counters, overhead display of virtual reality and LC projectors.

Among these LC display apparatus, there are those having a vertically downward-facing surface light source device disposed on the back surface of a LC display panel (hereinafter referred to as the LCD panel), as well as those having an edge-light type surface light source device. FIGS. 1A and 1B show a surface light source device 1 of the former kind, having a linear light source 4 such as a cold cathode ray tube (a fluorescent tube) disposed on the back surface of diffusion plates 2 and 3 and a reflector 5 further behind the linear light source 4 such that the emitted light from the linear light source 4 can be diffused by the diffusion plates 2 and 3 and uniformly projected out from the projecting surface. Because a plurality of linear light sources can be disposed behind the diffusion plates, an LC display apparatus using such a vertically downward-facing surface light source device can provide a high degree of brightness. For obtaining a uniform brightness over the entire light-emitting surface, however, a certain distance must be maintained between the light source and the diffusion plates, causing the overall thickness of the surface light source device to increase. This makes it difficult to produce thin LC display apparatus.

Edge-light type surface light source devices have the advantage that the light source can be made thin because the linear light source is positioned at a side of a light conducting plate. Because of this advantage, more and more apparatus are coming to use edge-light type surface light source devices, as the demand to reduce the thickness of LC display apparatus is becoming greater.

FIG. 2 shows an edge-light type surface light source device 6, with a portion removed, including optical elements such as a linear light source 7, a reflector 8, a light conducting plate 9, a light-reflecting plate 10, a diffusion plate 11 and a pair of converging lens plates 12 and 13. The linear light source 7 and the reflector 8 are disposed by a (light-incident) side surface of the optically transparent light conducting plate 9 such that the light emitted from the linear light source 7 enters the light conducting plate 9 through this side surface either directly or after being reflected by the reflector 8. Side-surface reflecting plates (shown at 14 in FIG. 5) of a metallic dielectric material with a rough surface are provided on side surfaces of the light conducting plate 9 other than the light-incident. surface. A cold cathode ray tube (fluorescent tube) is shown as the linear light source 7. A straight single tube or an L-shaped tube may be used, depending on the brightness of display required of the LC display apparatus 6.

A diffusion layer 15 is formed on the lower surface of the light conducting plate 9, and the light-reflecting plate 10 is disposed therebelow. The diffusion layer 15 may be produced by depositing dots of light-diffusing paint or the like by a screen-printing method such that the area of the diffusion layer 15 increases gradually as the distance from the linear light source 7 increases, as shown by examples in FIGS. 3A and 3B. Alternatively, the diffusion layer 15 may take the form, as shown in FIGS. 4A and 4B, of indentations (or protrusions) provided on the lower surface of the light conducting plate 9. In this case, the diffusion layer 15 becomes wider as the distance from the linear light source 7 increases. The light which is passing through the light conducting plate 9 is diffused. by the diffusion layer 15 either after it is totally reflected at the upper surface of the light conducting plate 9, simply reflected by the light-reflecting plate 10 or at the upper surface of the light conducting plate 9 or directly by entering the diffusion layer 15. Only that small portion of the light which did not undergo total reflection at the top surface escapes. Since the area of the diffusion layer 15 increases as the distance from the linear light source 7 increases, diffused light is emitted out of the light conducting plate 9 at a uniform brightness over the whole of the light conducting plate 9.

The diffusion plate 11 and the pair of converging lens plates 12 and 13 are stacked on the upper surface of the light conducting plate 9. The diffusion plate 11 comprises a synthetic resin sheet or film with its surface processed to provide fine roughness. The portion of light which escaped through the upper surface of the light conducting plate 9 is diffused by the diffusion plate 11. The converging plates 12 and 13 each have a parallel array of sectionally triangular prisms such that the, arrays on the upper lens plate 13 and the lower lens plate 12 are perpendicular to each other. Thus, the light which has been diffused by the diffusion plate 11 is focused by the lens plates 12 and 13 in two directions and emitted out of the light conducting plate 9 nearly perpendicularly to its upper surface.

The efficiency, by which light from the linear light source 7 can be led to the upper surface, will be discussed next. Assume now that the diffusion layer 15 did not exist on the lower surface of the light conducting plate 9. Light beam F1 shown in FIG. 5 indicates a beam which made incidence onto the light incident side surface 16 of the light conducting plate 9 with an angle of incidence 90 degrees from its normal line, that is, its angle of refraction $\theta_1$ equals the critical angle for the total reflection inside the light conducting plate 9. If the index of refraction for air is $n_1$ and that of the light conducting plate 9 is $n_2$, it is known that $\theta_1=\sin^{-1}(n_1/n_2)$, and the angle of incidence $\theta_2$ of the beam F1 at the lower surface of the light conducting plate 9 is given by $\theta_2=90$ degrees$-\theta_1$. If the light conducting plate is of polycarbonate, $n_2=1.59$ and hence $\theta_1=38.97$ degrees and $\theta_2=51.03$ degrees. Since this angle of incidence $\theta_2$ is greater than the critical angle $\theta_1$ for total reflection, light beam F1 will undergo total reflection at the lower surface of the light conducting plate 9 if the diffusion layer 15 is not present on the lower surface of the light conducting, plate 9. Similarly, total reflection will take place also at the upper surface of the light conducting plate 9.

Consider another light beam F2 entering from the linear light source 7 into the light conducting plate 9. Since its angle of refraction $\theta_3$ is smaller than $\theta_1$, its angle of incidence $\theta_4$ at the upper and lower surfaces of the light conducting plate 9 is larger than $\theta_2$. Accordingly, light beam F2 from the linear light source 7 undergoes total reflections at both upper and lower surfaces of the light conducting plate 9 if there is no diffusion layer 15.

Since the reflecting plates 14 are provided on the other side surfaces of the light conducting plate 9 (that is, other than the light incident side surface 16), light which is reflected on them is nearly entirely reflected back into the interior of the light conducting plate 9. Since the angle of incidence at the upper and lower surfaces does not change by such reflections, light beam F2 continues to undergo total reflection. Loss of light may be considered negligible by reflection by the reflecting plates 14 made of a metallic dielectric material.

Next, consider the light source. If a cold cathode ray tube is used as the linear light source 7, the surface of the glass tube of such a cold cathode ray tube is covered with a fluorescent layer having a property of total diffusion against light from outside. In other words, light which is made incident onto the linear light source 7 is reflected therefrom without any loss.

Thus, the light conducting plate 9 without the diffusion layer 15 on its lower surface can seal in with a very high efficiency any light which enters from the linear light source 7, but a plate which seals in incident light cannot serve as a light source. The sealed light must be allowed to come out through a light emitting surface 17 (the upper surface of the light conducting plate 9). This is why the diffusion layer 15 is provided on the lower surface of the light conducting plate 9 such that light which is incident on the diffusion layer 15 is diffused and that portion of the light which does not satisfy the condition for total reflection is allowed to escape. This escaped portion of light is further diffused by the diffusion plate 11 on the upper surface of the light conducting plate 9.

In summary, light from the linear light source 7 is emitted with a very high efficiency towards the display surface of the LC display apparatus. Even light coming from the display surface is similarly re-emitted towards the display surface without any loss.

Diffusion of light from such an edge-light type surface light source device 6 is illustrated in FIG. 6. Light beam F3 reflected on the lower surface is diffused as Lambert beam, and the portion which does not satisfy the condition for total reflection is emitted out through the upper surface of the light conducting plate 9 as a semi-spherical beam F4. Light beam F4 is further diffused by the diffusion plate 11, becoming Lambert beam F5. This passes through the two converging lens plates 12 and 13 and is emitted upwards as beam F6.

When such a surface light source is used as a back-light source for an LC display apparatus, however, the brightness is not sufficient. In order to increase the front brightness of an LC display apparatus, it is generally required that the direction of light emission from the surface light source device 6 should be unidirectionally aligned. Another reason for low front brightness is the low opening ratio of the LCD panel. As shown generally at 21 in FIG. 7, the LCD panel has liquid crystal 29 sealed between a glass plate 25 having thin-film transistors (TFT) 22, wiring 23 and a black matrix 24 formed on its upper surface and another glass plate 28 having a color filter 26 and a transparent electrode 27 formed on its lower surface and polarization plates 30 and 31 thereabove and therebelow. The areas covered by the black matrix 24 serve to screen the light from the surface light source device 6, and only the open areas 32 surrounded by the black matrix 24 allow the light to pass through. Because the ratio of these openings is low, sufficient brightness cannot be obtained on the display surface of the LC display apparatus. If it is desired to make the image elements (pixels) very small in order to improve the image quality of the LCD panel 21, in particular, the open areas 32 become small because there is a limit to how small the black matrix 24 can be made.

One way to minimize the reduction in brightness due to the black matrix 24, as shown in FIG. 8, is to use a micro-lens array 33 to focus the light emitted from the surface light source device 6 at the open areas 32 of the LCD panel 21 such that all light beams will pass through the openings. If there are fluctuations in the direction of light from the surface light source device 6, however, the micro-lens array 33 cannot focus light at small open areas 32, and the brightness cannot be successfully made higher.

FIG. 9 shows the relationship between the angle of light emission (measured from a line perpendicular to the display surface of an LC display apparatus) and brightness, Curve A indicating the brightness of a pixel portion where the TFT is on and it is in the light-transmitting condition and Curve B indicating the brightness of a pixel portion where the TFT is off and it is in the light-non-transmitting condition. The angle of emission is defined negative on the side of the light source. FIG. 9 shows that the brightness-darkness contrast is great in the frontal directions of the LC display apparatus but the light transmissivity is low and the contrast is poor in diagonal directions. If the display surface is looked at diagonally at a very large angle, the brightness-darkness contrast may be inverted or the displayed color may appear differently.

When an LC display apparatus is used in a device to be looked at by many viewers such as a television set, it is necessary to make the display surface visible also from directions other than the frontal direction. Since LC display apparatus are not easily visible from diagonal directions, it may be considered feasible, as shown by broken line in FIG. 8, to place a diffusion plate 34 on top of the LCD panel 21 such that light emitted from the LCD panel 21 can be caused to propagate also sideways. If such a diffusion plate 34 is installed on the side of the surface of the LCD panel 21, however, light-emitting points come to be on the diffusion plate 34. Thus, if use is made of a surface light source device with fluctuations in the direction of light emission, beams of light which passed through mutually adjacent pixels may overlap each other on the diffusion plate 34, resulting in a poorly focused image.

If a color filter is used in a color LC display apparatus, the brightness of the display surface becomes lower because each pixel allows only light within a specified range of wavelength to pass and the amount of transmitted light becomes at most about one third of the amount of incident light.

FIG. 11 shows an attempt to solve this problem by dispersing the white light from the surface light source device 6 into red (R), green (G) and blue (B) colors by means of a diffraction grating 35 and focusing light of each color by means of a micro-lens array 36. This method can be successful, however, only if the beams of light emitted from the surface light source device 6 is unidirectionally aligned.

The polarization plates 30 and 31, which are disposed above and below, further serve to cut polarized light in one direction. Thus, the amount of transmitted light is further reduced by one half, further reducing the brightness of the display surface.

In view of the above, it has been suggested to make use of a polarization separator plate 37, as shown in FIG. 12, instead of the lower one of the polarization plates. Of the light beams emitted from the surface light source device 6, light beams polarized in a specified direction (referred to as the P-polarized light) can pass through both the separation plate 37 and the upper polarization plate 30, but light beams polarized in the perpendicular direction (referred to as the S-polarized light) are reflected by the separation plate 37 and return to the surface light source device 6. The returned S-polarized light is diffused inside the surface light source device 6 and emitted again as unpolarized light. As this process is repeated, all light emitted from the surface light source device 6 is taken out as P-polarized light from the LCD panel 21. This method, too, requires that the light emitted from the surface light source device 6 be unidirectionally aligned.

In summary, in order to solve the problems of prior art surface light source devices such as low front brightness, lower brightness in diagonal directions, lowering of brightness due to the black matrix used in the LCD panel and lowering of brightness due to a color filter of polarization plates, emitted light must be all in one direction.

In other words, light emitted from the surface light source device must be converged and collimated. As shown in FIG. 6, prior art edge-light type surface light source devices were provided with a pair of converging lens plates 12 and 13 to converge emitted light. With prior art edge-light type surface light source devices, however, light convergence cannot be effected satisfactorily because the light which is emitted in all directions from the light-emitting surface 17 of the light conducting plate 9 is once converted into Lambert beam by the diffusion plate 11 and this is then made convergent by means of the converging lens plates 12 and 13. With prior art edge-light type surface light source devices, furthermore, the diffusion plate and the converging lens plates are stacked on top of the light conducting plate 9 such that a loss of light occurs also through these plates, adversely affecting the overall brightness. Many attempts have been made to improve the brightness of LC display apparatus but none has so far been satisfactory.

SUMMARY OF THE INVENTION

It is therefore an object of this invention in view of the above to provide an image display apparatus using a surface light source device with high directionality in the emitted light, capable of limiting the direction of emitted light within a narrow range.

It is another object of this invention to make use of such a surface light source device to convert wasteful light into useful light to thereby improve the brightness of a LC display apparatus and to improve its visibility, depending on the purpose of its use.

A surface light source device embodying this invention, with which the above and other objects can be accomplished, may be characterized as comprising a light conducting plate with a light source disposed adjacent to one of its side surfaces. At least one pattern is formed on the upper light emitting surface of the light conducting plate and/or the lower surface. The pattern is provided such that the sum of average slope angles of the light emitting surface and the opposite surface on a first sectional surface which is perpendicular to both the light incident surface and the light emitting surface is greater than the sum of average slope angles of the light emitting surface and the opposite surface on a second sectional surface which is parallel to the light incident side surface. Image display apparatus incorporating such a surface light source device have improved brightness and other characteristics.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIGS. 1A and 1B are respectively a front view and a sectional view of a prior art surface light source device of a vertically downward-facing type;

FIG. 2 is a partially broken diagonal view of an edge light type surface light source device;

FIGS. 3A and 3B are examples of patterns on the diffusion layer;

FIG. 4A is a bottom view of a diffusion layer, and FIG. 4B is its sectional view taken along line 4B—4B of FIG. 4A;

FIG. 5 is a sectional view of the diffusion layer of FIG. 2 to show its functions;

FIG. 6 is a sketch for showing the direction characteristics of light emitted from the surface light device of FIG. 1;

FIG. 7 is an exploded diagonal view of a liquid crystal panel;

FIG. 8 is a schematic sectional view of a structure for reducing lowering of brightness due to black matrix in an image display apparatus;

FIG. 9 is a graph which shows the relationship between brightness and angle of light emitted from the display surface of an image display apparatus;

FIGS. 10, 11 and 12 are schematic drawings for explaining various prior art attempts to increase the brightness of the display surface of an image display apparatus;

FIG. 13 is a diagonal view of an edge-light type surface light source device according to one embodiment of this invention;

FIG. 14 is a drawing for showing the effect of the deflection pattern on the device of FIG. 13;

FIGS. 15A, 15B and 15C show directions of light deflected by the deflection pattern shown in FIG. 14 and converged by the light converging pattern of FIG. 13;

FIG. 16 is a diagonal view of another surface light source device embodying this invention with a different linear light source;

FIG. 17 is a diagonal view of a surface light source device with light converging and deflection patterns of specific designs;

FIG. 18 is a portion of a sectional view taken along line 18—18 of FIG. 17;

FIG. 19 is a diagonal view of another surface light source device with light converging and deflection patterns with different designs;

FIG. 20A is a portion of the lower surface of the light conducting plate of FIG. 19, and FIG. 20A is a portion of its sectional view taken along line 20B—20B;

FIG. 21 is a sectional view of FIG. 20B with light reflected by the deflection pattern;

FIGS. 22A and 22B are drawings for defining average slope angles;

FIGS. 23A, 23B, 23C and 23D are drawings for showing average slope angles of various patterns;

FIG. 24 is a drawing for showing directions of light passing through a light conducting plate;

FIG. 25 is a light direction trajectory diagram for FIG. 24;

FIG. 26 is a diagonal view of a surface light source device having patterns with the average slope angle 0 in the Y-direction;

FIG. 27 is a light direction trajectory diagram for the device of FIG. 26;

FIG. 28 is a diagonal view of a surface light source device having random patterns with approximately equal average slope angles in the X- and Y-directions;

FIG. 29 is a light direction trajectory diagram for the device of FIG. 28;

FIG. 30 is a diagonal view of a surface light source device of which the average slope angle in the Y-direction is larger than that in the X-direction;

FIG. 31 is a light direction trajectory diagram for the device of FIG. 30;

FIG. 32A is a sectional view of a portion of a light conducting plate having a pattern according to an undesirable design with a trajectory of light beam therethrough, and FIG. 32B is a light direction trajectory diagram therefor;

FIG. 33 is a sectional view of a portion of a light conducting plate having a pattern according to a preferred design with a trajectory of light beam therethrough;

FIG. 34 is a diagonal view of a surface light source device having a reflecting plate on the lower surface;

FIG. 35 is a diagonal view of another surface light source device embodying this invention;

FIG. 36 is a diagonal view of another surface light source device having a prism sheet;

FIGS. 37 and 38 are diagonal views of other surface light source devices embodying this invention;

FIGS. 39A and 39B are a diagonal view and a front view, respectively, of ranges of light directions when there is a light converging pattern on the upper surface of the light conducting plate;

FIG. 40 is a diagonal view of another surface light source device embodying this invention;

FIG. 41 is a sectional view of a portion of a light conducting plate for showing the function of a diffusion pattern;

FIG. 42 is a sectional side view of a portion of a light conducting plate with triangular deflection pattern on its lower surface;

FIG. 43 is a portion of FIG. 42 to show the effects of reflection;

FIG. 44 is a light direction trajectory diagram corresponding to the deflection pattern of FIG. 43;

FIG. 45 is a sectional side view of a portion of another light conducting plate with V-shaped grooves;

FIG. 46 is a light direction trajectory diagram corresponding to the pattern shown in FIG. 45;

FIG. 47 is a diagonal view of another surface light source device embodying this invention;

FIG. 48 is a diagonal view of still another surface light source device embodying this invention;

FIG. 49 is a sectional view for showing reflection of light by side surface reflecting plates of FIG. 48;

FIG. 50 is another sectional view for showing reflection and alignment of light in the device of FIG. 48;

FIG. 51 is a diagonal view of another surface light source device embodying this invention with a wedge-shaped light conducting plate;

FIG. 52 is a schematic sectional view of a light conducting plate embodying this invention;

FIG. 53 is a sectional view of a portion of a light conducting plate for showing how a dark area can occur;

FIGS. 54 and 55 are sectional views of light incident surfaces for reducing the dark area of a surface light source device;

FIG. 56 is a diagonal view of still another surface light source device embodying this invention having an L-shaped light source;

FIG. 57 is a plan view of the device of FIG. 56;

FIG. 58 is a plan view of another surface light source device with an L-shaped light source;

FIGS. 59, 60 and 61 are drawing of other surface light source devices with an L-shaped light source;

FIG. 62 is a sectional side view of a surface light source device with a prism sheet;

FIG. 63 is a sectional view of a prism sheet for showing deflection of light by such a prism sheet;

FIG. 64 is a sectional view of another prism sheet with a different prism pattern;

FIG. 65 is a sectional view of still another prism sheet with a still another prism pattern;

FIG. 66 is a side view of a surface light source device with a prism sheet with a different prism pattern;

FIG. 67 is a side view of a surface light source device having both a prism sheet and side surface reflecting plates;

FIG. 68 is an exploded diagonal view of an image display apparatus embodying this invention;

FIG. 69 is a drawing for explaining the principles of the image display apparatus of FIG. 68;

FIG. 70 is a drawing for explaining the principles of another image display apparatus embodying this invention;

FIG. 71 is a schematic drawing of a color image display apparatus embodying this invention;

FIG. 72 is a schematic drawing of another color image display apparatus embodying this invention;

FIG. 73 is a schematic drawing of still another image display apparatus embodying this invention using a polarization separation element;

FIG. 74 is an LC television set embodying this invention;

FIG. 75 is a diagonal view of the image display apparatus contained in the LC television set of FIG. 74;

FIG. 76 is a schematic drawing of another image display apparatus having a diffusion plate;

FIGS. 77A and 77B are drawings of diffusion plates having diffusion surface on the upper surface and lower surface, respectively;

FIG. 78 is a schematic drawing of an image display apparatus with a diffusion surface formed on its LCD panel;

FIG. 79 is a schematic drawing of an image display apparatus using a prior art LCD panel;

FIGS. 80, 81, 82 and 83 are schematic drawings of image display apparatus according to different embodiments of this invention;

FIGS. 84, 85 and 86 are schematic drawings of LCD panels for image display apparatus according to different embodiments of the invention;

FIG. 87 is a schematic diagonal view of an automatic teller machine (ATM) using an image displaying apparatus embodying this invention;

FIGS. 88 and 89 are schematic drawings of directions of light emitted from the image displaying apparatus of FIG. 87;

FIGS. 90, 91 and 92 are schematic drawings of image displaying apparatus for the ATM of FIG. 87 according to different embodiments of the invention;

FIG. 93 is a schematic plan view of a car with an automatic navigation system;

FIGS. 94A, 94B and 94C are schematic drawings of image display apparatus with different structures for the system of FIG. 93; and FIG. 95 is a schematic drawing of the interior of a train car with an LC display.

Throughout herein, components which are equivalent or substantially similar are indicated by the same numbers and not necessarily described or explained repetitiously. In all embodiments of the invention, an XYZ-coordinate system is defined in the same manner relative to each surface light source device embodying this invention and hence is not necessarily defined with respect to each drawing.

DETAILED DESCRIPTION OF THE INVENTION

FIG. 13 shows the principle of an edge-light type surface light source device 51 according to one embodiment of this invention, having a light conducting plate 52 of a rectangular planar shape made of a material which is optically transparent and has a large index of refraction (>1). A linear light source 54 such as a cold cathode ray tube and a reflector 55 surrounding the linear light source 54 are disposed on the light-incident side surface 53 of the light conducting plate 52, the upper surface of the light conducting plate 52 serving as the light emitting surface 56. A deflection pattern 57 is provided on the lower surface of the light conducting plate 52, and a light converging pattern 58 is provided on the (upper) light emitting surface 56. By the deflection pattern 57 is meant an optical pattern which serves, when light inside the light conducting plate 52 is reflected, to change the direction of at least a portion of the reflected light such that the angle made with that portion of light with the light emitting surface 56 or the opposite (lower) surface becomes slightly larger than before, or that the angle with the direction perpendicular to the light emitting surface 56 or the opposite (lower) surface becomes slightly smaller. It is particularly desirable that reflection takes place such that, when projected on a plane perpendicular to both the light-incident side surface 53 and the light emitting surface 56, the angle to the direction perpendicular to the light emitting surface 56 becomes slightly smaller. By the light converging pattern 58 is meant another optical pattern adapted to converge light emitted from the light conducting plate 52 into the direction of a plane which is perpendicular to both the light-incident side surface 53 and the light emitting surface 56. For the convenience of explanation which follows, the direction which is perpendicular to the light-incident side surface 53 will be defined as the X-axis, the direction which is perpendicular to the light emitting surface 56 of the light conducting plate 52 will be defined as the Z-direction, and a direction perpendicular to both the X-axis and the Z-axis will be defined as the Y-axis.

FIG. 14 shows how the deflection pattern 57 functions, as seen along the Y-axis. Light beam F emitted from the linear light source 54 enters the light conducting plate 52 through its light-incident side surface 53 either directly or after being reflected by the reflector 55. The light F which makes incidence on the lower surface of the light conducting plate 52 at the critical angle ø of total reflection is reflected by the deflection pattern 57 with an angle of reflection ø-δ, which is slightly smaller than the critical angle ø, to be made incidence on the upper surface of the light conducting plate 52. The light which is made incidence on the upper surface at the angle of incidence of ø-δ is emitted out of the light conducting plate 52 nearly parallel to the upper surface of the light conducting plate 52. Light which is reflected on the lower surface of the light conducting plate 52 at an angle of reflection greater than the critical angle ø is totally reflected on the upper surface of the light conducting plate 52 and directed again towards the lower surface of the light conducting plate 52. If it is then reflected by the deflection pattern 57 with an angle of reflection smaller than the critical angle ø, it will be emitted out through the upper surface nearly parallel thereto. With this process repeated, light is emitted from the entirety of the upper surface of the light conducting plate 52 within a narrow range (shown shaded in FIG. 14) nearly parallel to the upper surface. If the deflection angle δ is sufficiently small, the emitted light from the upper surface of the light conducting plate 52 becomes nearly parallel to the light emitting upper surface 56 of the light conducting plate 52.

Directions of light deflected by the deflection pattern 57 and emitted from the upper surface of the light conducting plate 52 are shown in FIGS. 15A and 15B as seen respectively on the ZX-plane and on the XY-plane. FIG. 15C shows the directions of emitted light as seen on the XY-plane after converged by the light converging pattern 58. As described above, light which is reflected by the deflection pattern 57 on the lower surface of the light conducting plate 52 is partly emitted out nearly parallel to the upper surface of the light conducting plate 52 as shown in FIG. 15A but, if seen on the XY-plane, it spreads over a range of 180 degrees, as shown in FIG. 15B. When light is emitted out from the upper surface of the light conducting plate 52, however, it passes through the light converging pattern 58 and is thereby converged on the ZX-plane (in the X-direction). As a result, light is emitted from the upper surface of the light conducting plate 52 only in the direction of the X-axis.

Although FIG. 13 shows an embodiment according to which the light converging pattern 58 is provided on the light emitting surface 56 of the light conducting plate 52 and the deflection pattern 57 on the opposite lower surface, the deflection pattern 57 may be provided on the light emitting surface 56 with the light converging pattern 58 provided on the opposite lower surface. Alternatively, both the light converging pattern 58 and the deflection pattern 57 may be provided together on the light emitting surface 56 of the light conducting plate 52 or on the opposite lower surface.

FIG. 16 shows another surface light source device 59 provided with a linear light source 54 of a different structure, having point light sources 54a such as light-emitting diodes arranged in a linear array. The point light sources 54a may be arranged in a plurality of rows.

FIG. 17 shows a surface light source device 60 having a light converging pattern 58 and a deflection pattern 57 with specific designs. The light converging pattern 58, according to this embodiment of the invention, is uniform in the direction of the X-axis and shaped like triangular prisms with triangular cross-sectional shapes covering the entire light emitting surface 56 of the light conducting plate 52. The deflection pattern 57 is uniform in the direction of the Y-axis with triangular cross-sectional shapes, covering the entire lower surface of the light conducting plate 52. This deflection pattern 57 serves to reflect light on the slopes facing the light source such that the emitted light will be nearly parallel to the light emitting surface 58. FIG. 18 shows how light is reflected by the deflection pattern 57 and is emitted out through the light emitting surface 56. (FIG. 14 should be referenced for a view along the Y-axis.) A portion of the light emitted thus from the light conducting plate 52 is refracted by the prism portion 58a of the light converging pattern 58 and converged in a plane parallel to the ZX-plane, providing a unidirectional beam approximately in the direction of the X-axis. A portion of light emitted from the prism portion 58a sideways is directed again by the neighboring prism portion 58a into the interior of the light conducting plate 52 and is totally reflected at the inner surface of this neighboring prism portion 58a, returning again to the lower surface of the light conducting plate 52. The light thus returning to the lower surface is repeatedly reflected and is emitted out through the light emitting surface 58. Thus, light which is emitted from the light emitting surface 58 nearly parallel to the XY-plane is converged to the ZX-plane, thereby becoming oriented in the direction of the X-axis. The portion of light which has not been converged returns back into the light conducting plate 52 and then emitted out. In other words, light is utilized with a high efficiency. As can be understood from this particular embodiment, the deflection pattern 57 need not be able to deflect all reflected light into a direction perpendicular to the light emitting surface 56. It is sufficient if it can deflect at least a portion of the light perpendicularly to the light emitting surface 56.

FIG. 19 shows another surface light source device 61 with light converging and deflection patterns 58 and 57 with still different patterns shown in FIGS. 20A and 20B. The light converging pattern 58 according to this embodiment of the invention is uniform in the X-direction and formed as a series of cylindrical lenses. The deflection pattern 57 comprises a plurality of rows of cylindrical lenses in the direction of the X-axis and matching the focus of the light converging pattern 58.

Since the light conducting plate 52 can seal in light very efficiently, as explained above, light inside the light conducting plate 52 is reflected repeatedly and emitted out when reflected by the deflection pattern 57 such that the angle of incidence becomes smaller than the critical angle ø for total reflection. In this situation, since light is reflected near a focus of a cylindrical lens in the light converging pattern 58, the emitted light is converged in the ZX-plane as shown in FIG. 21, and light is eventually emitted nearly in the direction of the X-axis.

The light converging pattern 58 and the deflection pattern 57 described above can be correlated as follows. The average slope angle $\theta x^*$ of the deflection pattern 57 is defined as follows:

$$\Sigma|(\theta xi)(\Delta Xi)|/\Sigma|(\Delta Xi)|$$

where ($\theta xi$) (i being a dummy index i=1, 2, ... ) is the angle of each part with respect to the X-axis, ($\Delta Xi$) is the length of the corresponding base, as shown in FIG. 22A, and $\Sigma$ indicates summation over all dummy indices "i".

Similarly, the average slope angle $\theta y^*$ of the deflection pattern 57 is defined as follows:

$$\Sigma|(\theta yj)(\Delta Yj)|/\Sigma|(\Delta Yj)|$$

where ($\theta yj$) (j being a dummy index j=1, 2, ... ) is the angle of each part with respect to the Y-axis, ($\Delta Yj$) is the length of the corresponding base, as shown in FIG. 22B, and $\Sigma$ indicates summation over all dummy indices "j".

FIGS. 23A, 23B, 23C and 23D show the average slope angles $\theta^*$ for various patterns serving as examples. FIG. 23A shows sawtooth pattern with slope of 5 degrees, FIG. 23B shows another sawtooth pattern with slope of 3 degrees, and their average slope angles are respectively $\theta^*=5$ degrees and $\theta^*=3$ degrees. FIG. 23C is a triangular wave pattern with a first slope portion with slope of 5 degrees (with the length of base=3Λ/8 where Λ is the pitch) and a second slope portion with slope of 3 degrees with the length of base=5Λ/8) and its average slope angle is $\theta^*=3.75$ degrees. FIG. 23D is a pattern with V-shaped grooves with average slope angle $\theta^*=3$ degrees. The average slope angle of a flat surface is 0 degrees.

In terms of the average slope angles $\theta x^*$ and $\theta y^*$ thus defined for the deflection pattern 57 and the light converging pattern 58, respectively, the required relationship between the deflection pattern 57 and the light converging pattern 58 may be described that the average slope angle of the light converging pattern $\theta y^*$ should be greater than the average slope angle of the deflection pattern $\theta x^*$.

This concept of average slope angle can be extended to patterns of other types. When a pattern curve is given, it may be approximated by a series of line segments, the average slope angle of these line segments is calculated, the length of each line segment is made to approach zero, and the limit to which the average slope angle approaches may be defined as the average slope angle of this pattern curve. In the case of a cylindrical lens pattern as shown in FIG. 19, it may be approximated by a triangular pattern obtained by tangents at both sides, and the average slope angle of this triangular pattern may be obtained. In the case of a fine random diffusion pattern, it is possible to correlate the roughness with the average slope angle.

The patterns which are provided to a light conducting plate of this invention can be generalized by using the concept of average slope angle. Since the deflection pattern 57 and the light converging pattern 58, in particular, look alike or are made on the same surface, they are sometimes difficult to distinguish. It is therefore meaningful to introduce the concept of average slope angle to generalize the description therefor. In other words, the surface light source device according to this invention can be characterized wherein the sum $\theta y^*$ (hereinafter sometimes referred to as the average slope angle in the Y-direction) of the average slope angle of the pattern on the light emitting surface 56 on a sectional surface parallel to the light incident side surface 53 (a sectional surface parallel to the YZ-plane) and the average slope angle of the pattern on the lower surface opposite thereto should be larger than the sum $\theta x^*$ (hereinafter sometime referred to as the average slope angle in the X-direction) of the average slope angle of the pattern on the light emitting surface 56 on a sectional surface perpendicular to the light incident side surface 53 (a sectional surface parallel to the ZX-plane) and the average slope angle of the pattern on the lower surface opposite thereto, that is, (the average slope angle in the Y-direction, or $\theta y^*$)>(average slope angle in the Y-direction, or $\theta x^*$).

Next will be explained why the patterns on the light conducting plate 52 can be generalized as described above. In other words, it will be shown next how the light entering from the linear light source 54 should change its direction inside the light conducting plate 52 such that the emitted light becomes unidirectional. In FIG. 24, it will be assumed that the linear light source 54 is on the left-hand side (the light incident side surface 53) of the light conducting plate 52. The direction of light emitted at any point P1 of the linear light source 54 is within a range given by the right-hand hemisphere R1. When a light beam in this range reaches a point P2 on the left-hand side surface of the light conducting plate 52, the range R2 of direction of the refracted light is determined by the Snell's law of refraction.

In FIG. 24, R3 indicates the range of direction of light which is reflected at any point Q1 on the lower surface of the light conducting plate 52 and can be emitted out of the light conducting plate 52. The direction in which any of such light can be emitted out from any point Q2 on the upper surface of the light conducting plate 52 is indicated by R4, determined again by the Snell's law of refraction.

In order that the light emitted from the light conducting plate 52 be all in one direction, the direction of light emitted from point Q2 must be within a range r4 smaller than R4. Let r3 be the corresponding range of direction of light from point Q1. In other words, the emitted light becomes unidirectional if the light with direction within range R2 is converted into light with direction within range r3. Now, in order to consider the relationship between ranges R2 and r3, points P1, P2 and Q1 are shifted to a common origin and ranges R1, R2 and R3 are superposed, as shown in FIG. 25. It will be sufficient if light beams inside the light conducting plate 52 with directions within range R2 (as shown in FIG. 25) move into range r3 after repeating reflections inside the light conducting plate 52. In what follows, diagrams like this (hereinafter referred to as light direction trajectory diagrams) will be used to study the relationship between average slope angles and directionality of emitted light.

FIG. 26 shows a surface light source device 62 of which the average slope angle $\theta x^*$ in the X-direction is finite and the average slope angle $\theta y^*$ in the Y-direction is zero. This may correspond, for example, to having on the lower surface of the light conducting plate 52 a pattern 65a which is uniform in the Y-direction, the upper surface being flat. The light direction trajectory diagram of this surface light source device 62 is shown in FIG. 27, wherein the change in the direction of a light beam is indicated by black circles. Any light beam which was initially in range R2 inside the light conducting plate 52 is not diffused or deflected in the Y-direction but moves in the X-direction every time it is reflected on the lower surface of the light conducting plate 52, eventually entering range R3 and then emitted out through the upper surface of the light conducting plate 52. Thus, light beams which are emitted out of the light conducting plate 52 are inside the shaded portion of range R3 and, since there is no convergence in the Y-direction, the emitted light will spread in Y-direction as shown by arrows in FIG. 26.

FIG. 28 shows a surface light source device 63 of which the average slope angle $\theta x^*$ in the X-direction is about equal to the average slope angle $\theta y^*$ in the Y-direction (that is, $\theta x^* \approx \theta y^* > 0$). This may correspond, for example, to having a random diffusion pattern 65b on the lower surface of the light conducting plate 52, the upper surface being flat. The light direction trajectory diagram of this surface light source device 63 is shown in FIG. 29. Light beams, which were initially in range R2 inside the light conducting plate 52, change directions at random and are emitted out of the light conducting plate 52 after entering range R3. Thus, light beams will spread both in the X- and Y-directions. If the diffusion due to the pattern is great, they will be spread all over range R3, as in the case of prior art diffusion layer As a result, the emitted light will spread at random at shown by the arrows in FIG. 28.

FIG. 30 shows a surface light source device 64 of which the average slope angle $\theta y^*$ in the Y-direction is larger than the average slope angle $\theta x^*$ in the X-direction (that is, $0 < \theta x^* \ll \theta y^*$). This may correspond, for example, to having formed on the lower surface of the light conducting plate 52 a pattern 65c with stronger diffusion in the Y-direction than in the X-direction, the upper surface being flat. The light direction trajectory diagram of this surface light source device 64 is shown in FIG. 31. As shown in FIG. 31, a light beam which was initially in range R2 inside the light conducting plate 52 changes its direction significantly more along the Y-axis while its direction changes only a little along the X-axis. In other words, the light beam moves many times in the Y-direction and finally enters range r3 while moving violently in the Y-direction, being emitted into range r4 (shown in FIG. 24). Thus, light beams emitted from the upper surface of the light conducting plate 52 are nearly completely aligned along the X-direction as shown by the arrows in FIG. 30.

As shown above by way of examples, light beams well aligned in the X-direction can be obtained if a pattern is formed on either the upper or lower surface (or both) of the light conducting plate 52 such that the average slope angle $\theta y^*$ on a sectional surface parallel to the YZ-plane is larger than the average slope angle $\theta x^*$ on a sectional surface parallel to the ZX-plane (especially if the latter is made small).

With reference to FIG. 32A, it is preferable that the pitch $\Lambda$ of the pattern 66 (as seen sectionally parallel to the light-incident side surface 53 of the light conducting plate 52) be less than 1/10 of the thickness (measured at the thickest position) T of the light conducting plate 52. If the pitch $\Lambda$ is too large, as shown in FIG. 32A, some light beams will continue to be reflected nearly at the same position, giving rise to unevenness in light intensity. As shown by its corresponding light direction trajectory diagram in FIG. 32B, light beams fail to oscillate in the Y-direction correctly, as indicated in FIG. 31, failing to be aligned. If the pitch is less than one tenth of the thickness, light beams spread in the Y-direction, as shown in FIG. 33, giving rise to no unevenness.

FIG. 34 shows a surface light source device 67 having a reflecting plate 68 on the lower surface of its light conducting plate 52 for reflecting a majority of light for improving efficiency in the use of light. If use is made of a diffusive reflecting plate instead, the angle of reflection is not always the same as the angle of incidence, and this gives rise to light beams which fail to fall into region r3. It is therefore preferred to make use of a reflecting plate capable of causing normal reflections.

The patterns on the light conducting plate 52 may be provided on both of its surfaces, only on its upper surface or only on its lower surface, as long as the average slope angle $\theta y^*$ in the Y-direction is greater than that in the X-direction $\theta x^*$. It is difficult, however, to provide both a pattern which is uniform in the X-direction (such as the light converging pattern 58) and a pattern which is uniform in the Y-direction (such as the deflection pattern 57) on the same surface because it would involve a two-dimensional fabrication processes (as shown in FIG. 38). In order to reduce the production cost, the light converging pattern 58 may be provided on the upper surface with the deflection pattern 57 formed on the lower surface, as shown in FIGS. 19 and 34. FIG. 35 shows another surface light source device 69 alternatively provided with its light converging pattern 58 on the lower surface and a deflection pattern 57 on the upper surface.

A prism sheet 70, which is uniform in the Y-direction, may be placed on the light conducting plate 52, as shown in FIG. 36, in order to change the direction of light beams from the X-direction to the Z-direction. If the pitch of the prism sheet 70 and that of the deflection pattern are nearly the same, Moire fringes may appear. It is known that Moire fringes become vague and small in such a situation if the distance between the deflection pattern 57 and the prism sheet 70 is increased. Thus, it is preferred that the deflection pattern 57 be formed on the lower surface and the light converging pattern 58 on the upper surface.

FIG. 37 shows a surface light source device 71 having a pattern 72, combining a deflection pattern 57 and a light converging pattern 58 together, formed on the lower surface of its light conducting plate 52. This pattern 72 is characterized wherein its section in the ZX-direction is a deflection pattern 57 with a small average slope angle θx* and its section in the YZ-direction is a light converging pattern 58 with a relatively large average slope angle θy*.

If a pattern as shown at 72 is to be formed on only one of the surfaces of the light conducting plate 52, it is preferred to form the pattern on the lower surface of the light conducting plate 52 in view of the possibility of placing a prism sheet as shown in FIG. 36.

Such a pattern 72 may be formed on the upper surface of the light conducting plate 52 as shown in FIG. 38 (illustrating another surface light source device 73). In this application, it is preferable to place a reflecting plate 68 for causing normal reflections on the lower surface of the light conducting plate 52 in order to prevent light from escaping therethrough.

The placing of a pattern in the direction of the X-axis (such as the deflection pattern 55) on the upper surface of the light conducting plate 52 does not significantly affect the characteristic of the surface light source device 73 because the average slope angle θx* in the direction of the X-axis. If a pattern in the direction of the Y-axis (such as the light converging pattern 58) is on the upper surface, on the other hand, the slope in the pattern causes the light in range r3 into two ranges r4 and r5 as shown in FIGS. 39A and 39B. The light in range r5 is returned back into the light conducting plate 52, and only the light in range r4 remains.

FIG. 40 shows still another surface light source device 74 embodying this invention, having a light converging pattern 58 uniform in the X-direction formed on the upper surface of its light conducting plate 52 and a small diffusion pattern 75 with nearly equal average slope angles in any sectional surface (θx*≈θy*) on the lower surface. This diffusion pattern 75 is a random pattern which may be produced by providing small indentations and protrusions or by coating with a paint which has light-diffusing property. It is different from prior art diffusion layers in that the average slope angle is much smaller. In summary, the lower surface of the light conducting plate 52 is random but more gently uneven.

An incident beam of light onto the lower surface of the light conducting plate 52 at the critical angle ø of total reflection is reflected by the diffusion pattern 75, as shown in FIG. 41, with a small angle of scattering around the critical angle ø. Light exceeding the critical angle ø is emitted out from the light emitting surface 56 nearly parallel to the upper surface of the light conducting plate 52. By a prior art diffusion layer, by contrast, light is emitted in all directions over a range of 180 degrees because the scattering takes place in a wider range of directions.

Explained in terms of average slope angles, since the average slope angle in the X-direction at the lower surface (θxd*) is equal to the average slope angle in the Y-direction at the upper surface (θyd*), and since the average slope angle in the X-direction at the upper surface (θxu*) is zero, the sum of the average slope angles in the X-direction at the upper surface and the lower surface (θx*) is equal to θxd*. The sum of the average slope angles in the Y-direction at the upper and lower surfaces (θy*=θyu*+θyd) is greater than θx*.

FIG. 42 shows a preferable pattern 76 in a sectional surface parallel to the ZX-plane (called the X-direction pattern). This is like the deflection pattern 57 shown in FIG. 19. The degree of diffusion by the X-direction pattern 76 may be considered equal to the average of changes in direction by each reflection. In other words, a certain level of degree of diffusion is necessary in order to cause as much light from the linear light source 54 as possible to be emitted from the upper light emitting surface 56 of the light conducting plate 52.

Consider, for example, an X-direction pattern (shown in FIG. 43 at 76) with triangular wave shape and another X-direction pattern (shown in FIG. 45 at 77) with V-shaped grooves or mesa-shaped hills, both having the same average slope angle θx* (=θx) Although these two patterns 76 and 77 have the same degree of diffusion, the first pattern 76 causes about ½ of light to change direction by 2θx (as shown in FIG. 43), while the second pattern 77 causes about ¼ of light to change direction by 4θx. In other words, both of these patterns 76 and 77 have the same degree of diffusion, causing the same amount of light to be emitted from the upper surface of the light conducting plate 52. As shown in the light direction trajectory diagram of FIG. 44 (wherein circled numbers show the sequence of shifts by light), however, the direction of light changes by the first pattern 76 at approximately equal intervals such that light is sure to move into region r3 and be emitted from the small range r4, while, as shown by the light direction trajectory diagram of FIG. 46, the second pattern of FIG. 45 causes light to move a great deal some times while light direction may not move at some other times, such that it may jump over the range r3. In other words, the triangular wave pattern 76 is more effective in aligning light emitted from the light conducting plate 52.

FIG. 47 shows still another surface light source device 78 having a reflecting plate 68 on the lower surface of its light conducting plate 52 and a diffusion pattern 79, uniform in the X-axis perpendicular to its light incident side surface 53, formed on the upper surface of this reflecting plate 68. The shape of the diffusion pattern 79 does not limit the scope of this invention. Light escaping from the lower surface of the light conducting plate 52 is reflected by the reflecting plate 68, and as it returns into the light conducting plate 52, it is diffused in the direction of the Y-axis due to the diffusion pattern 79 on the reflecting plate 68. This enhances the diffusion of light in the direction of Y-axis inside the light conducting plate 52, improving the efficiency of bringing the light beams into region r4 (shown in FIG. 31).

FIG. 48 shows still another surface light source device 80 embodying this invention, having side surface reflecting plates 81 on all side surfaces of its light conducting plate 52 except the light incident side surface 53 adjacent to the linear light source 54. As shown in FIG. 49, light beams reflecting inside the light conducting plate 52 and escaping through its side surfaces are reflected by these side surface reflecting plates 81 and return into the light conducting plate 52. Accordingly, the loss of light can be reduced by this embodiment and more light can be emitted from the light emitting surface 56. Since these side surface reflecting plates 81 are intended to cause normal reflections, they can be designed easily. With the side surface reflecting plates 81 thus provided, it is preferable that the X-direction pattern 82 (or the deflection pattern 57) be symmetric in the X-direction, as shown in FIG. 50, such that not only can light from the linear light source 54 be unidirectionally emitted from the light emitting surface 56, but light reflected by the side surface reflecting plates 81 and returned back into the light conducting plate 52 can also be aligned and emitted from the light emitting surface 56, thereby improving the emission efficiency.

FIG. 51 shows still another surface light source device 83 embodying this invention, using a wedge-shaped light conducting plate 52. A light converging pattern 58, uniform in the direction of the X-axis, is formed on the upper surface of the light conducting plate 52, and the sloped lower surface is smooth and flat. With such a wedge-shaped light conducting plate 52, the wedge angle, or the angle between the upper and lower surfaces of the light conducting plate 52, may be considered the average slope angle. With this surface light source device 83, as light continues to undergo total reflections on the sloped lower surface, its angle with the line perpendicular to the light emitting surface 56 becomes gradually smaller. As soon as it becomes smaller than the critical angle of total reflection, it is emitted out of the light emitting surface 56 with a small upward angle with the upper surface of the light conducting plate 52, and aligned in the Y-direction by means of the light converging pattern 58. In summary, aligned light in the direction of the X-axis is emitted from the light emitting surface 56. Since the light conducting plate 52 according to this embodiment does not have any side surface opposite to the light incident side surface 53, light which enters the light conducting plate 52 can be emitted through the light emitting surface 56 at a high emission efficiency. Reflecting plates may be installed on the lower and/or side surfaces of the light conducting plate 52 for normal reflection.

FIG. 52 shows still another surface light source device embodying this invention, having a sawtooth deflection pattern on the lower surface of the light conducting plate 52, the slopes 57a of the sawtooth pattern facing in the direction of the linear light source 54. With a deflection pattern thus designed, the area of surface for reflection is increased such that more light can be emitted from the light emitting surface 56. This design is particularly useful when no side surface reflecting plates are used.

If the light incident side surface 53 of the light conducting plate 52 is perpendicular to the light emitting surface 56 and flat, as shown in FIG. 53, there is a portion of the light emitting surface 56 which cannot be reached even by light which enters the light conducting plate with a largest possible angle of refraction β. This portion is hereinafter referred to as the dark area D. One method of reducing the dark area D is to provide a V-shaped groove 85 on the light incident side surface 53 of the light conducting plate as shown in FIG. 54 such that the light incident side surface 53 is effectively no longer perpendicular to the light emitting surface 56. Another method is, as shown in FIG. 55, to provide an optical pattern 86 on the light incident side surface 53 such,that light can enter through the light incident side surface 53 at a larger angle.

FIGS. 56 and 57 show another surface light source device 87 embodying this invention having a linear light source 54 which is L-shaped. For this reason, a single light conducting plate cannot provide the kinds of patterns required by the present invention. Thus, a quadrangular planar plate is formed by combining two right-triangular planar light conducting plates 52a and 52b together. The light incident side surface 53 for each corresponding one of the light conducting plates 52a and 52b is opposite to one of the arms of the L-shaped linear light source 54. The light converging pattern 58 on the upper surface is uniform in the direction perpendicular to each light incident; side surface 53. The deflection pattern 57 on the lower surface is uniform in the direction parallel to each light incident side surface 53. Each of the light conducting plates 52a and 52b emits light unidirectionally such that, as the device 87 as a whole, light is emitted in two mutually perpendicular directions as shown by the arrows in FIG. 56. With these two triangular plates 52a and 52b, however, the boundary surface 88 is oblique to both light incident side surfaces 53. As shown by a broken line in FIG. 57, light reflected by the boundary surface 88 changes its direction significantly and such reflected light will not reach the range r3 to be emitted outside. Because this will adversely affect the directionality of the device, it is preferable to apply a light absorbing material at the boundary surface 88.

FIG. 58 shows another surface light source device 89 using an L-shaped linear light source 54, characterized wherein the two triangular light conducting plates 52a and 52b are combined together such that their boundary surface 88 is step-wise. Thus, all side surfaces are either parallel or perpendicular to the corresponding light incident side surface 53. Thus, light reflected by the boundary surface 88 does not change the direction and the emission efficiency can be improved. It is preferred to provide mirror surfaces at the boundary or to apply a light-absorbing paint on the boundary surface 88 so as to prevent light traveling from one to the other of the light conducting plates 52a and 52b.

FIG. 59 shows still another surface light source device 90 using an L-shaped linear light source 54, having a quadrangular planar light conducting plate with a light converging pattern 58 and a deflection pattern provided in diagonal directions. (FIG. 59 does not show the deflection pattern but it is diagonal, perpendicular to the light converging pattern.) An optical pattern 91 is formed on the light incident side surfaces 53 opposite the linear light source 54. Light beams made incident into the light conducting plate 52 through the two light incident side surfaces 53 are superposed inside the light conducting plate 52 by the optical pattern 91, becoming a beam in the diagonal direction as shown in FIG. 59. In other words, although the linear line source 54 is L-shaped, it is possible to align the emitted light in one direction, as in the case of using a straight-shaped linear light source.

FIG. 60 shows still another surface light source device 92 using an L-shaped linear light source 54, having a quadrangular light conducting plate 52 with a light converging pattern 58 and a deflection pattern formed thereon in diagonal directions. A diffraction grating 93 is attached to the light incident side surfaces 53 of the light conducting plate opposite to the L-shaped linear light source 54 such that light entering the light conducting plate 52 through the light incident side surfaces 53 and diffracted by the diffraction grading 93 will be in the diagonal direction of the light conducting plate 52.

FIG. 61 shows still another surface light source device 94 using an L-shaped linear light source 54, having a quadrangular light conducting plate 52 with its light incident side surfaces 53 formed in a triangular wave-like design. Reflective mirrors 95 are attached to portions of the light incident side surfaces 53 facing in one direction and the other portions facing in the other direction are left as mutually parallel transparent surfaces 96. Thus, light emitted from the light source 54 enters the light conducting plate 52, either directly or after being reflected by one of the reflective mirrors 95, through one of the transparent surfaces 96. Incident beams of light are thus aligned in the diagonal direction of the light conducting plate 52 and emitted out from the upper surface of the light conducting plate 52.

FIG. 62 shows another surface light source device 97 having a prism sheet 70 disposed opposite to the light emitting surface 56 of its light conducting plate 52. Light is emitted from the light emitting surface 56 nearly parallel to the light emitting surface 56 in the X-direction. The prism sheet 70 has a uniform pattern in the Y-direction which is perpendicular to the X-direction. With the prism sheet 70 thus disposed, the emitted light in the X-direction is deflected to the Z-direction perpendicular to the device 97.

The bottom angle of the prism pattern 70a (as shown in FIG. 63) of a commonly used prism sheet 70 is about 45 degrees to 50 degrees. In order that the light, after passing through the prism sheet 70, should travel perpendicular to the sheet 70, the light should make an angle of about 60 degrees with the light emitting surface 56 of the light conducting plate 52. If the light conducting plate 52 is designed such that light will be emitted from its light emitting surface 56 in such a direction, ranges r3 and r4, as defined above, become too large, adversely affecting directionality.

If the base angle of the prism pattern 70a of the prism sheet 70 is increased to about 70 degrees, as shown in FIG. 64, however, the required angle of emission of light from the light emitting surface 56 becomes about 30 degrees, and the light conducting plate 52 can be designed accordingly without requiring the ranges r3 and r4 to become too large and hence without adversely affecting directionality.

According to analyses, it can be ascertained that the base angle of the prism pattern 70a should be greater than 60 degrees. In other words, if the direction of light entering the back surface of the prism sheet 70 is closer to being parallel than perpendicular thereto (such as when the angle of the emitted light from the light emitting surface 56 is less than 45 degrees from the light emitting surface 56 as shown, for example, in FIG. 64) and if it is desired to deflect the light to the perpendicular direction with respect to the prism sheet 70, Snell's law requires that the base angle of the prism pattern 70a should be about 60 degrees. If the index of refraction of the prism sheet 70 is smaller, Snell's law also requires that the base angle should be larger. Since the index of refraction of the prism sheet 70 cannot be much greater than 1.5, even if it is assumed to be 1.59, the required base angle of the prism patterns 70a becomes 60 degrees.

FIG. 65 shows a prism sheet 70 having another structure which may be used for a surface light source device embodying the invention. As the base angle of the prism pattern 70a is made as large as 70 degrees, the top angle becomes about 40 degrees, and a prism sheet 70 with such sharp tops are easily damaged. The prism sheet 70 of FIG. 65 has flattened tops such that the sheet 70 will not be damaged easily. Only those portions of the pattern 70a where light does not pass through are flattened, as shown by light paths in FIG. 65.

FIG. 66 shows another surface light source device 98 embodying this invention with a prism sheet 70 with a different design. Since light is emitted from the light conducting plate 52 in a direction away from the linear light source 54, it is the slopes on the prism sheet 70 on the side away from the light source that are used for deflecting the light into the perpendicular direction. Accordingly, the base angle γ on the side away from the light source is made larger than 45 degrees, or preferably larger than 60 degrees, the base angle on the side closer to the light source being made smaller.

With the prism pattern 70a thus designed, even beams of light emitted with a very small angle with the light emitting surface 56 can be effectively deflected into a perpendicular direction because the base angle γ of the effective portions of the deflecting surface is sufficiently large. If this design is compared with the symmetric shape drawn by dotted lines in FIG. 66, it can be easily understood that the prism sheet 70 shown in FIG. 66 is much less likely to be damaged.

FIG. 67 shows another surface light source device 99 having not only a prism sheet 70 but also side surface reflecting plates 81. Not only is light emitted from the light source but reflected light by these reflecting plates 81 travels backwards towards the light source. Thus, use is made of a prism sheet having symmetric prism pattern 70a such that reflected light can be emitted equally effectively from the light emitting surface 56 of the light conducting plate 52.

The pitch of the prism sheet 70 should preferably so selected that it will not be an integral multiple of that of either the X-direction pattern of the light conducting plate 52 or that of the deflection pattern, or the other way around, such that generation of Moire fringers can be prevented.

FIG. 68 shows an image display apparatus 101 using a surface light source device 102 embodying this invention, comprising a surface light source device 102 which includes a linear light source 54, a reflector 55, a light conducting plate 52, a reflecting plate 68 and a prism sheet 70. A micro-lens array 103 comprising micro-lenses is disposed above the surface light source device 102, and an LCD panel 104, structured similarly to the LCD panel shown in FIG. 7, is disposed thereabove. The micro-lenses of the array 103 are arranged so as to be in one-to-one correspondence with the openings 105 (shown in FIG. 69) between the pixels of the LCD panel 104.

As shown in FIG. 69, light beams emitted perpendicularly from the surface light source device 102 can be converged to the openings 105 of the pixels by means of the micro-lens array 103 such that the black matrix 106 of the LCD panel 104 is prevented from screening the light from the surface light source device 102. Since the surface light source device 102 is according to an embodiment of this invention, in particular, the emitted light therefrom is unidirectionally aligned, and the micro-lens array 103 can function effectively in focusing the light at the openings 105 with high accuracy. In other words, light is utilized more efficiently and the front brightness of the image display apparatus 101 is greater than that of a prior art image display apparatus. Alternatively, however, use may be made of a surface light source device without a prism sheet, as shown in FIG. 70, by using a diffraction grating 107 to deflect the light emitted from the surface light source device 102 and then focusing the deflected light at the openings 105.

FIG. 71 shows a color image display apparatus 108 using a surface light source device embodying this invention, using an LCD panel 104 having color filters and comprising pixels of red (R), green (G) and blue (B). A diffraction grating 109 is provided between the surface light source device 102 and a micro-lens-array 103. Beams of light emitted perpendicularly from the surface light source device 102 are diffracted by the diffraction grating 109 into different directions, depending on the color, and the micro-lens array 103 serves to focus them at corresponding pixels. The lowering of brightness due to the color filter can be effectively prevented since use is made of a surface light source device embodying this invention capable of aligning beams of light to the diffraction grating 109.

FIG. 72 shows another color image display apparatus 110 characterized as using a surface light source device 102 without a prism sheet. Because there is no prism sheet, light beams emitted from the surface light source device 102 are made incidence onto the diffraction grating 109 at a larger angle. The difference in diffraction angle by the diffraction grating 109 due to difference in frequency increases as the diffraction angle becomes larger. Thus, color separation becomes easier if the emitted light from the surface light source device 102 is projected diagonally onto the diffraction grating 109. This embodiment is further advantageous because the number of component is smaller.

FIG. 73 shows another image display apparatus 111 embodying this invention characterized as having a polarization separation element 112 disposed between the surface light source device 102 and the LCD panel 104 such that the portion of light emitted from the surface light source device 102 perpendicularly to the polarization separation element 112 and polarized thereby in one direction (P-polarization) is allowed to pass while the portion polarized in the other direction (S-polarization) is reflected. The reflected light is returned into the light conducting plate and emitted again therefrom. Thus, the image display apparatus 111 according to this embodiment can prevent lowering of brightness due to a polarization plate. Since the surface light source device 102 according to this invention emits light unidirectionally, the effect of preventing lowering of brightness is further improved.

As explained above, image display apparatus using a surface light source device according to this invention can effectively prevent lowering of brightness due to the black matrix, color filter or polarization plate.

FIG. 74 shows an LC television set 113 using a surface light source device embodying this invention and containing an image display apparatus 114 shown in FIG. 75 with an LCD panel 104 disposed above a surface light source device 102 having a prism sheet 70 and a diffusion plate 115 disposed above the LCD panel 104. The degree of diffusion of the diffusion plate 115 changes, depending on the direction, being high in the Y-direction and lower in the X-direction. The image display apparatus 114 is disposed inside the LC television set 113 such that the Y-axis is horizontal. The diffusion plate 115 need not be as described in FIG. 75. Its average slope angles in sectional surfaces in the X-direction and the Y-direction may be different. The LC television set 113 is so set that light is diffused horizontally by the diffusion plate 115 in front but diffusion does not take place much in the up-down directions. With the television set 113 thus structured, therefore, the display is not difficult to see from diagonal directions. The television set 113 thus structured can be enjoyed by a large number of viewers.

Image display apparatus thus structured, because their displays can be seen from different directions thanks to the diffusion plate 115, can be used not only in television sets but also in many other kinds of apparatus such as video camera monitors and displays for personal computers. Depending on the purpose of use, a different diffusion plate may be used with ability to diffuse light both horizontally and vertically.

Although the diffusion plate 115 shown in FIG. 75 uses its upper surface as its diffusion surface 115a, it may be placed on the LCD panel 104 with the diffusion surface 115a facing downward, as shown in FIG. 76. If the diffusion surface 115a faces downward, it becomes closer to the openings 105 between the pixels of the LCD panel 104, as shown in FIG. 77A, as compared to FIG. 77B. Thus, the image becomes sharper and resolution improves.

As a further variation, a diffusion surface 115a may be formed directly on the upper surface of the glass plate of the LCD panel 104, as shown in FIG. 78, instead of using a diffusion plate. This variation is advantageous in that the number of components is reduced and hence the production cost can be also reduced. Moreover, a sharper image is obtainable since the diffusion surface 115a becomes even closer to the openings 105 of the pixels.

If a prior art LCD panel 116 is used, as shown in FIG. 79, there is a black matrix 106 between two glass sheets, serving to prevent light from reaching elements with poor on-off characteristics such as LC layer and TFT and to thereby maintain optical characteristics of the LCD panel 116. According to this invention, since the surface light source device 102 makes use of a micro-lens array 103 to focus light with accuracy at the openings 105 of the pixels, the black matrix 106 of prior art LCD panel 116 may be dispensed with, as shown in FIG. 80 by contrast.

If light happens to pass through outside the opening part of the pixels because the black matrix of the prior art LCD panel has been removed, a black matrix 117 may be provided as shown in FIG. 81 on the upper surface of the glass plate of the LCD panel 104. If a black matrix is thus provided externally to the LCD panel, rather than inside the LCD panel 104, the production of the black matrix becomes much simpler because there is no need for patterning. A black matrix 117 may be provided on the lower surface of the glass plate of the LCD panel 104, as shown in FIG. 82, especially when unidirectionally aligned light is directly passed to the LCD panel 104.

FIG. 83 shows an embodiment wherein another black matrix 118 is provided to the diffusion plate 115 corresponding to the black matrix in the LCD panel 104. With such a structure, the added black matrix 118 serves to cover the parts where light from adjacent pixels is generated. Thus, pixel images can be made sharper. Such additional black matrix 118 may be provided both on the upper and lower surfaces of the diffusion plate 115, as shown in FIG. 84. FIG. 85 shows still another embodiment wherein a black matrix 117 is provided on the glass panel of the LCD panel 104 corresponding to the black matrix 106 formed between the glass plates of the LCD panel 104. With such a structure, light with large angles of emission can be cut off by the added black matrix 117 such that the LCD 104 is capable of improving the directionality of emitted light from the surface light source device 102. If use is made of a diffusion plate 115, pixel images can be made sharper for the same reason described above with reference to FIG. 83. Such an additional black matrix 117 may be provided on both the upper and lower surfaces of the LCD panel as shown in FIG. 86. If a black matrix is provided on two or more planes, the directionality is improved and overlapping of pixels is reduced.

FIGS. 87 and 88 show an automatic teller machine (ATM) 119 using an image display apparatus 121 according to this invention. The screen 120 of such an ATM 119 is preferably designed so as not to be visible to persons who may be standing next to the user. For this reason, the image display apparatus 121 is designed such that emitted light therefrom is focused at the user, as shown in FIG. 88. A person standing next to the user will be looking at the screen at least at an angle of about 30 degrees, as shown in FIG. 89. If it is assumed that the distance H between the screen 120 and the user is 55 cm and the separation E between the user and the person of an ordinary size standing next to the user is 30–35 cm, such a person standing next to the user will be looking at the screen 120 at an angle of over 30 degrees. Thus, if light intensity for emitted light at angles outside the range of −30 to +30 degrees is dropped to less than ⅕ of the forwardly emitted light, the screen will be practically invisible to anybody besides the user.

FIG. 90 shows a structure for focusing the light from the screen as shown in FIG. 88 by disposing a converging lens 122 above the LCD panel 104. As shown in FIG. 91, however, the lens 122 may be disposed below the LCD panel 104. As shown in FIG. 92, furthermore, a Fresnel lens 123 may be used as the converging lens such that the overall thickness can be reduced. with a structure as shown in FIGS. 90–92, the peak in brightness on the image display surface varies, focused at the position of the user's head with an image display apparatus 121 according to this invention, since light is emitted in one direction, a lens can be used together to easily vary the direction of emission. Such image display apparatus can be used not only in ATMs but in many other kinds of apparatus such as game tables.

FIG. 93 shows an automobile provided with an automatic navigation system. Since such an automatic navigation system is usually set on the dash board between the driver and the front-seat passenger, the driver will look at it from a diagonal direction. Prior art LC displays are difficult to see from diagonal directions. In automatic navigation systems according to the present invention, the display 125 is adjusted to be easily visible from diagonal directions.

Image display apparatus 126 for this purpose are shown in FIGS. 94A, 94B and 94C. The apparatus 126 shown in FIG. 94A is characterized in that a diffraction grating 127 is installed on the front surface of the LCD panel 104 such that light is emitted from the screen diagonally towards the driver (not shown). The apparatus 126 shown in FIG. 94B has a prism plate 128 disposed in front of the LCD panel 104 such that light from the screen is emitted both to the right and to the left such that it can be easily seen both by the driver and the front-seat passenger. The apparatus 126 shown in FIG. 94C does not use a prism sheet but causes the light from the surface light source device to pass the LCD panel diagonally.

LC display apparatus 131 are sometimes found inside a train, say, above the door 130 of a passenger car 129, as shown in FIG. 95. Passengers usually look at such a display diagonally from below. Since the LC display apparatus 131 is usually not installed so as to point downward, the display is sometimes very difficult to see. In such a situation, an optical sheet such as a diffraction grating or prism sheet may be placed in front of the LCD panel 104 as shown in FIG. 94A such that light is not emitted upward so much but mostly in downward directions. Intensity of light going downward may be about 1.5 times greater than that going upward.

What is claimed is:

1. An image display apparatus comprising:
   a surface light source device;
   a diffraction grating disposed above said surface light source device;
   micro-lenses forming a micro-lens array disposed above said diffraction grating; and
   a liquid crystal display panel having pixels and being disposed above said micro-lens array, a plurality of said pixels optically corresponding to each of said micro-lenses;
   light from said surface light source device making incidence obliquely onto said diffraction grating, being diffracted by said diffraction grating into different directions according to colors, and being converged by said micro-lenses on those of said pixels corresponding to the colors;
   wherein said surface light source device comprises:
   a single light conducting plate having a light incident side surface which is perpendicular to an incident direction, a light emitting surface and an opposite surface which is opposite to said light emitting surface;
   a light source disposed adjacent to said light incident side surface of said light conducting plate, at least one surface of said light conducting plate being shaped with a deflection pattern serving to deflect light from said light source inside said light conducting plate gradually toward a perpendicular direction to said light emitting surface and to diffuse light from said light source inside said light conducting plate more strongly in a transverse direction, which is parallel to both said light incident side surface and said light emitting surface, than in said incident direction; and
   a converging pattern serving to cause emitted light from said light emitting surface to be converged in said transverse direction and to thereby improve directionality of said emitted light;
   said deflection pattern being on at least either of said light emitting surface and said opposite surface, and said converging pattern being on at least either of said light emitting surface and said opposite surface.

2. The image display apparatus of claim 1 wherein said surface light source device emits approximately parallel light and said liquid crystal display panel has two transparent plates with no black matrix therebetween.

3. The image display apparatus of claim 1 wherein said liquid crystal display panel has two transparent plates with no black matrix therebetween and a viewer-facing surface which faces a viewer of images on said panel; said image display apparatus further comprising diffusing means disposed proximally to said viewer-facing surface for diffusing light which has passed through said liquid crystal display panel.

4. The image display apparatus of claim 1 wherein said liquid crystal display panel has a viewer-facing surface which faces a viewer of images on said panel; said image display apparatus further comprising:
   diffusing means disposed proximally to said viewer-facing surface for diffusing light which has passed through said liquid crystal display panel; and
   a black matrix on at least two different surfaces selected from the group consisting of surfaces through said diffusing means and a surface of said liquid crystal display panel.

5. The image display apparatus of claim 1 wherein said surface light source device emits approximately parallel light and comprises:
   a light conducting plate having a light incident side surface, a light emitting surface and an opposite surface which is opposite to said light emitting surface;
   a light source disposed adjacent to said light incident side surface of said light conducting plate; and
   at least one pattern on at least either of said light emitting surface and said opposite surface, the sum of average slope angles of said light emitting surface and said opposite surface on a first sectional surface which is perpendicular to both said light incident side surface and said light emitting surface being greater than the sum of average slope angles of said light emitting surface and said opposite surface on a second sectional surface which is parallel to said light incident side surface;
   wherein said liquid crystal display panel is over said light emitting surface; and
   wherein light emitted from said display panel has a peak intensity at a peak-intensity direction and a weaker intensity less than ⅓ of said peak intensity at 30 degrees or more from said peak-intensity direction.

6. The image display apparatus of claim 1 wherein said surface light source device emits approximately parallel light and comprises:
   a light conducting plate having a light incident side surface, a light emitting surface and an opposite surface which is opposite to said light emitting surface;

a light source disposed adjacent to said light incident side surface of said light conducting plate; and at least one pattern on at least either of said light emitting surface and said opposite surface, the sum of average slope angles of said light emitting surface and said opposite surface on a first sectional surface which is perpendicular to both said light incident side surface and said light emitting surface being greater than the sum of average slope angles of said light emitting surface and said opposite surface on a second sectional surface which is parallel to said light incident side surface;

wherein said liquid crystal display panel is over said light emitting surface; and wherein beams of light emitted with peak intensity from different parts of said display panel have different directions, being all directed to a specified point separated from said display panel by a specified distance.

7. The image display apparatus of claim 1 wherein said surface light source device emits approximately parallel light and comprises:

a light conducting plate having a light incident side surface, a light emitting surface and an opposite surface which is opposite to said light emitting surface;

a light source disposed adjacent to said light incident side surface of said light conducting plate; and at least one pattern on at least either of said light emitting surface and said opposite surface, the sum of average slope angles of said light emitting surface and said opposite surface on a first sectional surface which is perpendicular to both said light incident side surface and said light emitting surface being greater than the sum of average slope angles of said light emitting surface and said opposite surface on a second sectional surface which is parallel to said light incident side surface;

wherein said liquid crystal display panel is over said light emitting surface;

wherein patterned means is placed over said display panel for passing light from said display panel therethrough, light which makes incidence onto said patterned means having a peak intensity at a first direction, light which emits from said patterned means having a peak intensity at a second direction which is different from said first direction.

8. The image display apparatus of claim 7, wherein said second direction is a specified direction not perpendicular to said liquid crystal display panel.

9. An image display apparatus comprising:

a surface light source device;

a diffraction grating disposed above said surface light source device;

micro-lenses forming a micro-lens array disposed above said diffraction grating; and a liquid crystal display panel having pixels and being disposed above said micro-lens array, a plurality of said pixels optically corresponding to each of said micro-lenses;

light from said surface light source device making incidence obliquely onto said diffraction grating, being diffracted by said diffraction grating into different directions according to colors, and being converged by said micro-lenses on those of said pixels corresponding to the colors;

wherein said surface light source device comprises:

a single light conducting plate having a light incident side surface which is perpendicular to x-direction, a light emitting surface and an opposite surface which is opposite to said light emitting surface, y-direction being parallel to said light emitting surface and perpendicular to said x-direction; and a light source disposed adjacent to said light incident side surface of said light conducting plate;

at least either of said light emitting surface and said opposite surface being shaped with a deflection pattern consisting of sectional surfaces, sum of average slope angles of said sectional surfaces in said x-direction being greater than sum of average slope angles of said sectional surfaces in said y-direction.

10. The image display apparatus of claim 9, wherein said surface light source device emits approximately parallel light and said liquid crystal display panel has two transparent plates with no black matrix therebetween.

11. The image display apparatus of claim 9, wherein said liquid crystal display panel has two transparent plates with no black matrix therebetween and a viewer-facing surface which faces a viewer of images on said panel; said image display apparatus further comprising diffusing means disposed proximally to said viewer-facing surface for diffusing light which has passed through said liquid crystal display panel.

12. The image display apparatus of claim 9, wherein said liquid crystal display panel has a viewer-facing surface which faces a viewer of images on said panel; said image display apparatus further comprising:

diffusing means disposed proximally to said viewer-facing surface for diffusing light, which has passed through said liquid crystal display panel; and a black matrix on at least two different surfaces selected from the group consisting of surfaces through said diffusing means and a surface of said liquid crystal display panel.

13. The image display apparatus of claim 9 wherein said surface light source device emits approximately parallel light and comprises:

a light conducting plate having a light incident side surface, a light emitting surface and an opposite surface which is opposite to said light emitting surface;

a light source disposed adjacent to said light incident side surface of said light conducting plate; and at least one pattern on at least either of said light emitting surface and said opposite surface, the sum of average slope angles of said light emitting surface and said opposite surface on a first sectional surface which is perpendicular to both said light incident side surface and said light emitting surface being greater than the sum of average slope angles of said light emitting surface and said opposite surface on a second sectional surface which is parallel to said light incident side surface;

wherein said liquid crystal display panel is over said light emitting surface; and wherein light emitted from said display panel has a peak intensity at a peak-intensity direction and a weaker intensity less than ⅕ of said peak intensity at 30 degrees or more from said peak-intensity direction.

14. The image display apparatus of claim 9 wherein said surface light source device emits approximately parallel light and comprises:

a light conducting plate having a light incident side surface, a light emitting surface and an opposite surface which is opposite to said light emitting surface;

a light source disposed adjacent to said light incident side surface of said light conducting plate; and at least one pattern on at least either of said light emitting surface and said opposite surface, the sum of average slope angles of said light emitting surface and said opposite surface on a first sectional surface which is perpendicular to both said light incident side surface and said light emitting surface being greater than the sum of average slope angles of said light emitting surface and said opposite surface on a second sectional surface which is parallel to said light incident side surface;

wherein said liquid crystal display panel is over said light emitting surface; and wherein beams of light emitted with peak intensity from different parts of said display panel have different directions, being all directed to a specified point separated from said display panel by a specified distance.

15. The image display apparatus of claim 9 wherein said surface light source device emits approximately parallel light and comprises:

a light conducting plate having a light incident side surface, a light emitting surface and an opposite surface which is opposite to said light emitting surface;

a light source disposed adjacent to said light incident side surface of said light conducting plate; and at least one pattern on at least either of said light emitting surface and said opposite surface, the sum of average slope angles of said light emitting surface and said opposite surface on a first sectional surface which is perpendicular to both said light incident side surface and said light emitting surface being greater than the sum of average slope angles of said light emitting surface and said opposite surface on a second sectional surface which is parallel to said light incident side surface;

wherein said liquid crystal display panel is over said light emitting surface;

wherein patterned means is placed over said display panel for passing light from said display panel therethrough, light which makes incidence onto said patterned means having a peak intensity at a first direction, light which emits from said patterned means having a peak intensity at a second direction which is different from said first direction.

16. The image display apparatus of claim 15 wherein said second direction is a specified direction not perpendicular to said liquid crystal display panel.

* * * * *